(12) United States Patent
Swain et al.

(10) Patent No.: US 11,173,808 B2
(45) Date of Patent: Nov. 16, 2021

(54) VEHICLE

(71) Applicant: Polaris Industries Inc., Medina, MN (US)

(72) Inventors: Philip B. Swain, Woodbury, MN (US); Andrew C. Schleif, Stacy, MN (US); Dennis J. Lutz, Lino Lakes, MN (US); David J. Hicke, Hugo, MN (US); Eric D. Bjerketvedt, North Branch, MN (US); Aaron D. Deckard, Zionsville, IN (US); Corrie S. Roytek, Osceola, WI (US); Donovan L. Fredrickson, Independence, MN (US); Owen J. Dickinson, Saint Paul, MN (US); Jason L. Sherrett, White Bear Lake, MN (US); James J. Endrizzi, Plymouth, MN (US)

(73) Assignee: Polaris Industies Inc., Medina, MN (US)

( * ) Notice: Subject to any disclaimer, the term of this patent is extended or adjusted under 35 U.S.C. 154(b) by 0 days.

(21) Appl. No.: 15/388,436

(22) Filed: Dec. 22, 2016

(65) Prior Publication Data
US 2018/0178677 A1    Jun. 28, 2018

(51) Int. Cl.
*B60K 11/00* (2006.01)
*B60N 2/01* (2006.01)
(Continued)

(52) U.S. Cl.
CPC ............ *B60N 2/01* (2013.01); *B60G 3/02* (2013.01); *B60K 11/04* (2013.01); *B60K 11/06* (2013.01);
(Continued)

(58) Field of Classification Search
CPC .......... B60N 2/005; B60N 2/01; B60K 11/06; B60K 13/02; B60K 11/04; B60K 5/01; B60K 17/34
See application file for complete search history.

(56) References Cited

U.S. PATENT DOCUMENTS

| | | |
|---|---|---|
| 1,521,976 A | 1/1925 | Swain |
| 2,624,592 A | 1/1953 | MacPherson |
| (Continued) | | |

FOREIGN PATENT DOCUMENTS

| | | |
|---|---|---|
| CA | 1163510 | 3/1984 |
| EP | 047128 | 2/1992 |
| (Continued) | | |

OTHER PUBLICATIONS

Polaris RZR XP 1000 Radiator Relocation Kit, https://abffabrication.com/shop/polaris-rzr-xp-1000-radiator-relocation-kit/.
(Continued)

*Primary Examiner* — Hau V Phan
(74) *Attorney, Agent, or Firm* — Faegre Drinker Biddle & Reath LLP

(57) ABSTRACT

A utility vehicle includes a plurality of ground-engaging members, a frame supported by the ground-engaging members, and a plurality of body panels supported by the frame. The utility vehicle also includes a radiator supported on a rear portion of the frame. Additionally, the utility vehicle includes an air intake assembly partially supported by an upper portion of the frame.

39 Claims, 57 Drawing Sheets

(51) Int. Cl.
| | |
|---|---|
| *B60K 13/02* | (2006.01) |
| *B60K 11/04* | (2006.01) |
| *B60K 11/08* | (2006.01) |
| *B60K 11/06* | (2006.01) |
| *B62D 23/00* | (2006.01) |
| *B60R 21/13* | (2006.01) |
| *B62D 21/18* | (2006.01) |
| *B60R 9/06* | (2006.01) |
| *B60G 3/02* | (2006.01) |
| *B60R 16/04* | (2006.01) |
| *B62D 1/04* | (2006.01) |
| *F02M 35/10* | (2006.01) |
| *F02M 35/02* | (2006.01) |
| *F02M 35/024* | (2006.01) |
| *F01P 3/20* | (2006.01) |
| *F01P 5/02* | (2006.01) |
| *B60T 7/06* | (2006.01) |
| *F02M 35/16* | (2006.01) |
| *F16H 57/04* | (2010.01) |
| *F02M 35/04* | (2006.01) |

(52) U.S. Cl.
CPC ............. *B60K 11/08* (2013.01); *B60K 13/02* (2013.01); *B60R 9/06* (2013.01); *B60R 16/04* (2013.01); *B60R 21/13* (2013.01); *B60T 7/06* (2013.01); *B62D 1/04* (2013.01); *B62D 21/183* (2013.01); *B62D 23/005* (2013.01); *F01P 3/20* (2013.01); *F01P 5/02* (2013.01); *F02M 35/0201* (2013.01); *F02M 35/024* (2013.01); *F02M 35/02416* (2013.01); *F02M 35/048* (2013.01); *F02M 35/10104* (2013.01); *F02M 35/10144* (2013.01); *F02M 35/162* (2013.01); *F16H 57/0415* (2013.01); *B60Y 2200/124* (2013.01); *B60Y 2400/112* (2013.01); *B60Y 2410/121* (2013.01); *B60Y 2410/124* (2013.01)

(56) References Cited

U.S. PATENT DOCUMENTS

| | | | |
|---|---|---|---|
| 2,660,449 A | 11/1953 | MacPherson | |
| 3,400,607 A | 9/1968 | Smith | |
| 4,159,835 A | 7/1979 | Leja | |
| D286,760 S | 11/1986 | Ooba | |
| 4,699,234 A | 10/1987 | Shinozaki | |
| 4,714,126 A | 12/1987 | Shinozaki | |
| 4,798,399 A | 1/1989 | Cameron | |
| 4,828,017 A | 5/1989 | Watanabe | |
| 4,924,959 A | 5/1990 | Handa | |
| D312,989 S | 12/1990 | Murata | |
| 5,063,811 A | 11/1991 | Smith | |
| 5,078,223 A | 1/1992 | Ishiwatari | |
| 5,086,858 A * | 2/1992 | Mizuta | B60K 11/06 123/41.56 |
| D327,237 S | 6/1992 | Miyamoto | |
| 5,129,700 A | 7/1992 | Trevisan | |
| 5,251,713 A | 10/1993 | Enokimoto | |
| 5,327,989 A | 7/1994 | Furuhashi | |
| 5,401,056 A | 3/1995 | Eastman | |
| 5,855,386 A | 1/1999 | Atkins | |
| 5,975,573 A | 11/1999 | Belleau | |
| 6,041,744 A | 3/2000 | Oota | |
| 6,203,043 B1 | 3/2001 | Lehman | |
| 6,260,609 B1 | 7/2001 | Takahashi | |
| 6,301,993 B1 | 10/2001 | Orr | |
| 6,334,269 B1 | 1/2002 | Dilks | |
| 6,510,891 B2 | 1/2003 | Anderson | |
| 6,523,634 B1 | 2/2003 | Gagnon | |
| 6,543,523 B2 | 4/2003 | Hasumi | |
| 6,691,767 B2 | 2/2004 | Southwick | |
| 6,725,905 B2 | 4/2004 | Hirano | |
| 6,732,830 B2 | 5/2004 | Gagnon | |
| 6,772,824 B1 | 8/2004 | Tsuruta | |
| 6,799,781 B2 | 10/2004 | Rasidescu | |
| 6,820,708 B2 * | 11/2004 | Nakamura | F16H 57/0489 180/296 |
| D500,707 S | 1/2005 | Lu | |
| D503,658 S | 4/2005 | Lu | |
| 6,892,842 B2 * | 5/2005 | Bouffard | B60K 11/04 180/68.3 |
| 6,901,992 B2 | 6/2005 | Kent | |
| 6,907,916 B2 | 6/2005 | Koyama | |
| 6,908,108 B1 | 6/2005 | Scarla | |
| 6,951,240 B2 | 10/2005 | Kolb | |
| 6,997,239 B2 | 2/2006 | Kato | |
| 7,040,260 B2 | 5/2006 | Yoshimatsu | |
| 7,044,203 B2 | 5/2006 | Yagi | |
| 7,117,927 B2 | 10/2006 | Kent | |
| D549,133 S | 8/2007 | Francis | |
| 7,287,619 B2 * | 10/2007 | Tanaka | B60K 13/02 180/291 |
| 7,347,296 B2 | 3/2008 | Nakamura | |
| 7,363,961 B2 | 4/2008 | Mori | |
| 7,438,147 B2 * | 10/2008 | Kato | B60K 17/34 180/68.1 |
| 7,481,287 B2 | 1/2009 | Madson | |
| 7,506,712 B2 | 3/2009 | Kato | |
| 7,506,714 B2 | 3/2009 | Davis | |
| 7,510,199 B2 | 3/2009 | Nash | |
| 7,546,892 B2 * | 6/2009 | Lan | B62K 5/01 180/68.1 |
| 7,575,211 B2 | 8/2009 | Andritter | |
| 7,607,368 B2 | 10/2009 | Takahashi | |
| 7,650,959 B2 | 1/2010 | Kato | |
| 7,658,258 B2 | 2/2010 | Denney | |
| 7,703,566 B2 | 4/2010 | Wilson | |
| 7,703,730 B2 | 4/2010 | Best, Jr. | |
| 7,712,562 B2 * | 5/2010 | Nozaki | B60K 13/02 180/68.3 |
| 7,753,427 B2 * | 7/2010 | Yamamura | B60K 13/04 180/309 |
| D622,631 S | 8/2010 | Lai et al. | |
| 7,802,816 B2 | 9/2010 | McGuire | |
| 7,819,220 B2 | 10/2010 | Sunsdahl | |
| 7,828,098 B2 | 11/2010 | Yamamoto | |
| 7,874,391 B2 | 1/2011 | Dahl | |
| D636,787 S | 4/2011 | Luxon | |
| D636,788 S | 4/2011 | Luxon | |
| 7,931,106 B1 * | 4/2011 | Suzuki | B62D 23/005 180/311 |
| D637,623 S | 5/2011 | Luxon | |
| D638,446 S | 5/2011 | Luxon | |
| 7,942,447 B2 | 5/2011 | Davis | |
| 7,954,853 B2 | 6/2011 | Davis | |
| 7,967,100 B2 * | 6/2011 | Cover | B60N 2/005 180/312 |
| 7,984,780 B2 | 7/2011 | Hirukawa | |
| 8,002,061 B2 * | 8/2011 | Yamamura | B60K 11/00 180/68.1 |
| 8,011,420 B2 | 9/2011 | Mazzocco | |
| 8,037,959 B2 | 10/2011 | Yamamura | |
| D648,745 S | 11/2011 | Luxon | |
| D649,162 S | 11/2011 | Luxon | |
| D650,311 S | 12/2011 | Bracy | |
| 8,122,988 B2 | 2/2012 | Obayashi | |
| 8,162,086 B2 | 4/2012 | Robinson | |
| D660,746 S | 5/2012 | Bracy | |
| 8,191,930 B2 | 6/2012 | Davis | |
| 8,235,155 B2 | 8/2012 | Seegert | |
| 8,381,855 B2 * | 2/2013 | Suzuki | B60K 11/04 180/296 |
| 8,382,125 B2 | 2/2013 | Sunsdahl | |
| D682,739 S | 5/2013 | Patterson et al. | |
| 8,485,303 B2 | 7/2013 | Yamamoto | |
| 8,567,847 B1 * | 10/2013 | King | B60K 13/02 180/68.3 |
| D693,370 S | 11/2013 | Randhawa | |
| 8,579,060 B2 | 11/2013 | George | |

(56) References Cited

U.S. PATENT DOCUMENTS

| | | | |
|---|---|---|---|
| 8,596,405 B2 | 12/2013 | Sunsdahl | |
| 8,613,335 B2* | 12/2013 | Deckard | F16H 57/0416 |
| | | | 180/68.1 |
| 8,613,337 B2 | 12/2013 | Kinsman | |
| 8,646,555 B2 | 2/2014 | Reed | |
| D701,469 S | 3/2014 | Lai et al. | |
| D703,102 S | 4/2014 | Eck et al. | |
| 8,708,359 B2 | 4/2014 | Murray | |
| D705,127 S | 5/2014 | Patterson | |
| 8,746,719 B2* | 6/2014 | Safranski | B60G 3/14 |
| | | | 280/124.148 |
| 8,763,739 B2 | 7/2014 | Belzile | |
| 8,783,400 B2 | 7/2014 | Hirukawa | |
| D712,311 S | 9/2014 | Morgan et al. | |
| 8,840,076 B2 | 9/2014 | Zuber | |
| D719,061 S | 12/2014 | Tandrup et al. | |
| 8,960,348 B2* | 2/2015 | Shomura | F02M 35/162 |
| | | | 180/68.3 |
| 9,091,468 B2 | 7/2015 | Colpan | |
| D737,724 S | 9/2015 | Schroeder et al. | |
| D739,304 S | 9/2015 | Brown | |
| 9,146,061 B2 | 9/2015 | Farlow | |
| 9,162,561 B2 | 10/2015 | Marois | |
| 9,221,508 B1 | 12/2015 | De Haan | |
| 9,327,587 B2 | 5/2016 | Spindler | |
| D762,522 S | 8/2016 | Shogo | |
| D772,755 S | 11/2016 | Tandrup | |
| 9,499,044 B2* | 11/2016 | Osaki | B62D 21/183 |
| 9,512,809 B2* | 12/2016 | Tsumiyama | F02M 35/162 |
| 9,776,481 B2 | 10/2017 | Deckard | |
| D804,993 S | 12/2017 | Eck et al. | |
| D805,009 S | 12/2017 | Eck | |
| D805,015 S | 12/2017 | Eck | |
| 2002/0056969 A1 | 5/2002 | Sawai | |
| 2002/0088661 A1 | 7/2002 | Gagnon | |
| 2004/0129489 A1 | 7/2004 | Brasseal | |
| 2004/0195018 A1* | 10/2004 | Inui | B62D 3/12 |
| | | | 180/68.1 |
| 2004/0195034 A1 | 10/2004 | Kato | |
| 2004/0206567 A1* | 10/2004 | Kato | B60G 7/02 |
| | | | 180/291 |
| 2006/0006623 A1 | 1/2006 | Leclair | |
| 2006/0151970 A1 | 7/2006 | Kaminski | |
| 2006/0197331 A1 | 9/2006 | Davis | |
| 2006/0220330 A1 | 10/2006 | Urquidi | |
| 2006/0278451 A1 | 12/2006 | Takahashi | |
| 2007/0000715 A1 | 1/2007 | Denney | |
| 2007/0169989 A1 | 7/2007 | Eavenson | |
| 2007/0215404 A1 | 9/2007 | Lan | |
| 2007/0257479 A1 | 11/2007 | Davis | |
| 2008/0023240 A1 | 1/2008 | Sunsdahl | |
| 2008/0023249 A1 | 1/2008 | Sunsdahl | |
| 2008/0048423 A1 | 2/2008 | Eriksson | |
| 2008/0053738 A1 | 3/2008 | Kosuge | |
| 2008/0240847 A1 | 10/2008 | Crouse | |
| 2008/0289796 A1 | 11/2008 | Sasano | |
| 2008/0289896 A1* | 11/2008 | Kosuge | B60K 11/06 |
| | | | 180/312 |
| 2008/0303234 A1 | 12/2008 | McCann | |
| 2009/0071739 A1 | 3/2009 | Leonard | |
| 2009/0078491 A1 | 3/2009 | Tsutsumikoshi | |
| 2009/0146119 A1 | 6/2009 | Bailey | |
| 2009/0183939 A1 | 7/2009 | Smith | |
| 2010/0012412 A1 | 1/2010 | Deckard | |
| 2010/0019539 A1 | 1/2010 | Nakamura | |
| 2011/0298189 A1 | 12/2011 | Schneider | |
| 2012/0031693 A1 | 2/2012 | Deckard | |
| 2012/0152632 A1 | 6/2012 | Azuma | |
| 2012/0193163 A1 | 8/2012 | Wimpfheimer | |
| 2013/0033070 A1* | 2/2013 | Kinsman | B62D 21/183 |
| | | | 296/190.03 |
| 2013/0307243 A1 | 11/2013 | Ham | |
| 2013/0319784 A1 | 12/2013 | Kennedy | |
| 2014/0008136 A1 | 1/2014 | Bennett | |
| 2014/0288763 A1 | 9/2014 | Bennett | |
| 2015/0047917 A1 | 2/2015 | Burt, II | |
| 2015/0210319 A1 | 7/2015 | Tiramani | |
| 2019/0078679 A1 | 3/2019 | LeClair | |

FOREIGN PATENT DOCUMENTS

| | | |
|---|---|---|
| EP | 0471128 | 2/1992 |
| EP | 1481834 | 12/2004 |
| EP | 1520978 A2 | 4/2005 |
| EP | 1520978 A3 | 3/2006 |
| EP | 1697646 | 9/2006 |
| EP | 1980741 A2 | 10/2008 |
| EP | 2055520 | 5/2009 |
| EP | 1980741 A3 | 7/2009 |
| EP | 1520978 B1 | 4/2010 |
| EP | 1980741 B1 | 9/2011 |
| EP | 2589785 | 5/2013 |
| EP | 2923926 | 9/2015 |
| JP | 2004243992 | 9/2004 |
| JP | 2005186911 | 7/2005 |
| JP | 2007532814 | 11/2007 |
| JP | 2008013149 | 1/2008 |
| JP | 2009241872 | 10/2009 |
| WO | WO 2013/174662 | 11/2013 |
| WO | WO 2015/036984 | 3/2015 |
| WO | WO 2015/036985 | 3/2015 |
| WO | WO 2015/159571 | 10/2015 |
| WO | WO 2016/038591 | 3/2016 |

OTHER PUBLICATIONS

RZR XP 100 EPS, High Lifter Velocity Blue, http://www.polaris.com/en-us/rzr-side-by-side/rzr-xp-1000-eps-high-lifter-edition.

Sal & Barbara at S&B's, Particle Separator for 2014-16 Polaris RZR 100, http://www.sbfilters.com/particle-separator-2014-17-polaris-rzr-1000.

Wild Boar ATV Parts, Airaid Intake XP 900 Polaris, Snorkel Kit, https://www.wildboaratvparts.com/airaid-intake-xp-900-polaris-snorkel-kit-free-shipping-529-00/.

International Search Report issued by the International Searching Authority, dated Jun. 18, 2018, for related International Patent Application No. PCT/US2017/065724; 7 pages.

Written Opinion issued by the International Searching Authority, dated Jun. 18, 2018, for related International Patent Application No. PCT/US2017/065724; 9 pages.

International Preliminary Report on Patentability issued by the International Preliminary Examining Authority, dated Jan. 7, 2019, for International Patent Application No. PCT/US2017/065724; 18 pages.

"Modified RedLine Revolt," RDC Race-deZert.com, https://www.race-dezert.com/forum/threads/modified-redline-revolt.92038/, dated Mar. 10, 2011; 5 pages.

"Sporty New Artic Cat Side-by-Side," Lucas Cooney, https://www.atv.com/blog/2011/03/sporty-new-arctic-cat-side-by-side-video.html, dated Mar. 10, 2011; 4 pages.

"Artic Cat Breaks Silence on New Side-by-Side," Lucas Cooney, https://www.atv.com/blog/2011/03/arctic-cat-breaks-silence-on-new-side-by-side.html, dated Mar. 24, 2011; 5 pages.

"2012 Arctic Cat Wildcat 1000i H.O. Preview," ATV.com, https://www.atv.com/manufacturers/arctic-cat/2Q12-arctic-cat-wildcat-1000i-ho-preview-2014.html, dated Jul. 26, 2011; 10 pages.

"National Guard/Coastal Racing Polaris RZR XP 900 UTV Race Test," Jeff M. Vanasdal, ATVriders.com, http://www.atvriders.com/atvreviews/polaris-2012-coastal-racing-rzr-xp-900-sxs-utv-worcs-race-review-p4.html; Feb. 25, 2012; 8 pages.

2012 Coastal Racing Polaris XP 900 UTV, photograph, http://www.atvriders.com/images/polaris/2012-coastal-racing-polaris-xp-900-utv-race-review/2012-polaris-rzr-xp-900-utv-sxs-ieff-vanasdal.jpg; 1 page.

Images for rear radiator, https://www.google.com/search?q=rear+radiator+site%3Arzrforums.net&lr=&h1=en&as_qdr=all&source=Int&tbs=cdr%3A1%2Ccd_min%3A%2Ccd_max%3A2012&tbm; available before Dec. 31, 2012; 2 page.

(56) References Cited

OTHER PUBLICATIONS

"RZR Radiator Relocation?", RZRForums.net, https://www.rzrforums.net/general-rzr-discussion/13963-rzr-radiator-relocation.html, Jul. 3, 2009; 5 pages.
"Relocated Radiator?", RZRForums.net, https://www.rzrforums.net/muddin/75562-relocated-radiator.html, Apr. 6, 2012; 7 pages.
"Radiator in the back", RZRForums.net, https://www.rzrforums.net/rzr-xp-900/63047-radiator-back.html, Nov. 14, 2011; 4 pages.
"Rad Relocation Kit", RZRForums.net, https://www.rzrforums.net/engine-drivetrain/93153-rad-relocation-kit.html, Nov. 9, 2012; 8 pages.
"Radiator Relocate", RZRForums.net, https://www.rzrforums.net/muddin/14716-radiator-relocate.html, Jul. 23, 2009; 7 pages.
"Radiator relocation", RZRForums.net, https://www.rzrforums.net/general-rzr-discussion/8440-radiator-relocation.html, Feb. 4, 2009; 7 pages.
Photo, Facebook.com, Jake Brattain, https://www.facebook.com/photo.php?fbid=412474765198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474695198&set=pb.512920198.-2207520000.1541691407.&type=3&theater, post dated Mar. 30, 2010; 1 page.
Photo, Facebook.com, Jake Brattain, https://www.facebook.com/photo.php?fbid=412474575198&set=pb.512920198.-2207520000.1541691407.&type=3&theater, post dated Mar. 30, 2010; 1 page.
Photo, Facebook.com, Jake Brattain, https://www.facebook.com/photo.php?fbid=12474325198&set=pb.512920198.-2207520000.1541691407.&type=3&theater, post dated Mar. 30, 2010; 1 page.
Photo, Facebook.com, Jake Brattain, https://www.facebook.com/photo.php=fbid=412473865198&set=pb.512920198.-2207520000.1541691407.&type=3&theater, post dated Mar. 30, 2010; 1 page.
Photo, Facebook.com, Jake Brattain, https://www.facebook.com/photo.php?fbid=412473845198&set=pb.512920198.-2207520000.1541691407.&type=3&theater, post dated Mar. 30, 2010;1 page.
Photo, Facebook.com, Jake Brattain, https://www.facebook.com/photo.php?fbid=412475960198&set=pb.512920198.-2207520000.1541691407.&type=3&theater, post dated Mar. 30, 2010; 1 page.
"Commander Performance Modifications: Radiator Relocate for Mud", commanderforums.org, https://www.commanderforums.org/forums/commander-performance-modifications/7059-radiator-relocate-mud-3.html, Aug. 28, 2012; 7 pages.
"Rhino Radiator Relocation", HighLifter Forum, http://forum.highlifter.com/Rhino-Radiator-Relocation-m2180231.aspx, Aug. 30, 2007; 5 pages.
2012 Arctic Cat Wildcat with 95-hp & 16-in. Travel, ArcticInsider.com, http://www.arcticinsider.com/Article/2012-Arctic-Cat-Wildcat-with-95-hp--16-in-Travel; 4 pages.
1989 Honda Pilot fl400, Powersports Log, http://powersportslog.com/asp/Item.asp?soldid=29871&make=Honda&theday=4%2F16%2F2011, posted Apr. 16, 2011; 2 page.
Excerpts from Honda Service Manual 89 FL400R Pilot, Honda Motor Co., Ltd., copyright 1988; 24 pages.
XR Bull Spider 500CC 4×4 360°.AVI, youtube.com, https://www.youtube.com/watch?v=-jSzDvute8Q, posted Feb. 8, 2010; 1 page.
XR Bull Spaider 500 MOD 2011, anuncios ya, https://mexicali.anunciosya.com.mx/xr-bull-spaider-500-mod-2011-en-mexicali-SWqi, May 24, 2011; 4 pages.
"Custom Weber Intercooler Bed Mount with Dual 5.2" Spal Fans", RZRForums.net, https://www.rzrforums.net/forced-induction/19182-custom-weber-intercooler-bed-mount-w-dual-5-2-spal-fans.html, Oct. 30, 2009; 10 pages.
"Arctic Cat Unleashes a Wildcat at Recent Dealer Show", Dirt Toys, https://www.dirttoysmag.com/2011/05/arctic-cat-unleashes-a-wildcat, May 2011 Issue; 4 pages.
"Arctic Cat Unleashes a Wild Cat at Recent Dealer Show", UTVGuide.net, https://www.utvguide.net/arctic-cat-unleashes-a-wild-cat-at-recent-dealer-show/, posted Mar. 29, 2011; 5 pages.
New Arctic Cat Side by Side, youtube.com, https://www.youtube.com/watch?v=gQGAYSz1bME&fs=1&h1=en_US, posted Mar. 9, 2011; 1 page.
2015 Polaris Owner's Manual for Maintenance and Safety, RZR® XP 1000 EPS High Lifter Edition, © 2015; 151 pages.
RZR XP 1000 High Lifter Edition-Polaris RZR Sport Side by Side ATV, Youtube.com, https://www.youtube.com/watch?v=RKRVuIG1zuo, published Jul. 27, 2014; 1 page.
Ranger XP 900 High Lifter Ground Clearance Demo-Polaris RANGER, Youtube.com, https://www.youtube.com/watch?v=jfGho4ESvyY, published Jul. 27, 2015; 1 page.
RZR XP® 1000 High Lifter Edition Stealth Black, https://rzr.polaris.com/en-us/2015/high-performance/rzr-xp-1 000-eps-high-lifter-edition-stealth-black-2015-rzr/; 4 pages.

\* cited by examiner

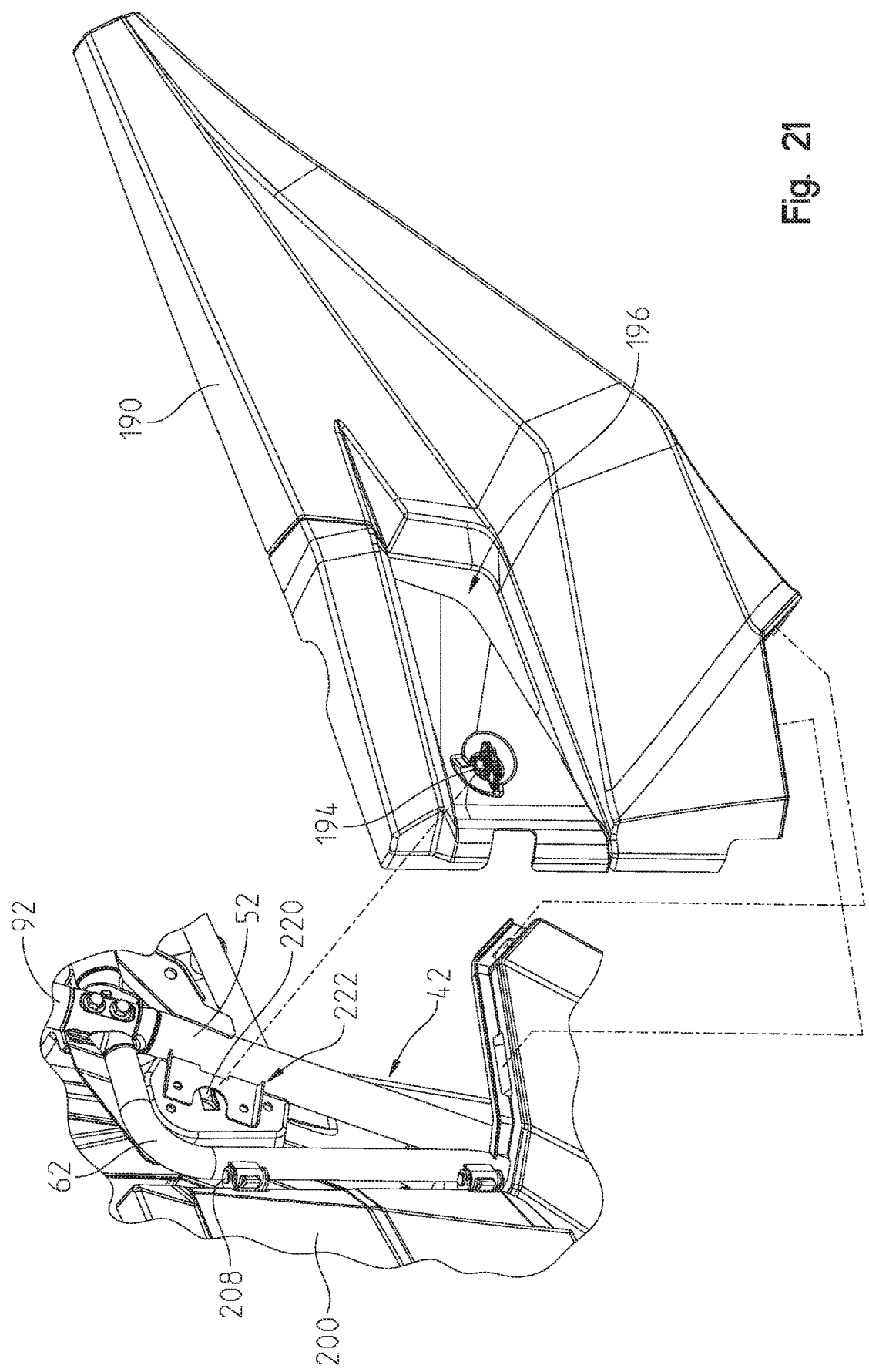

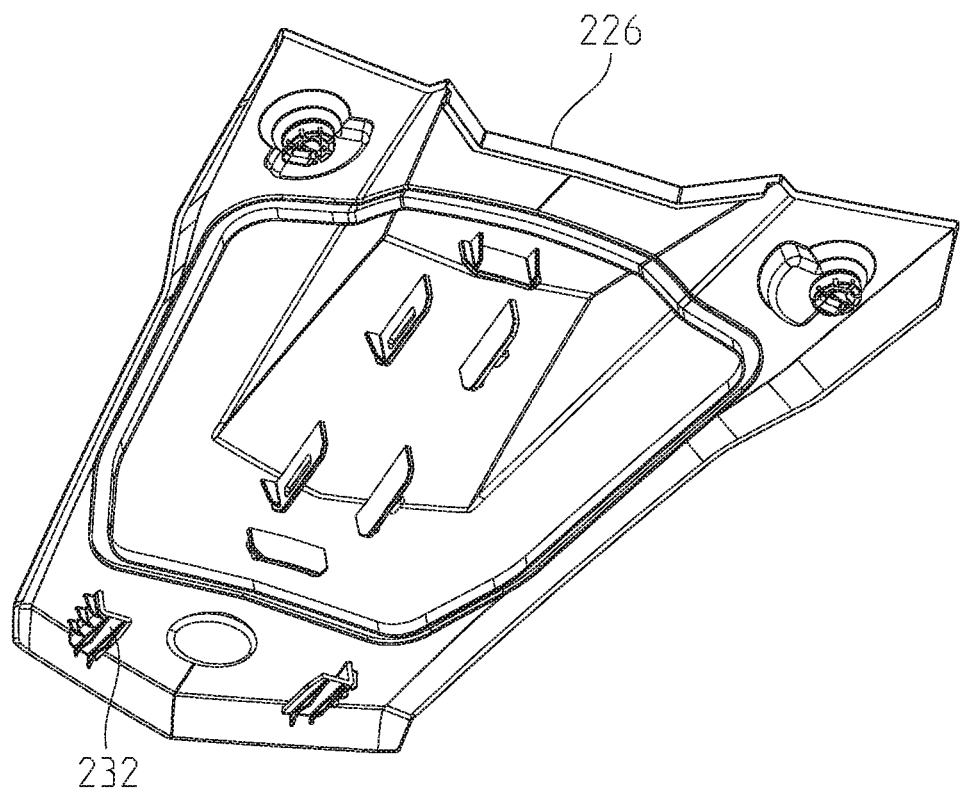
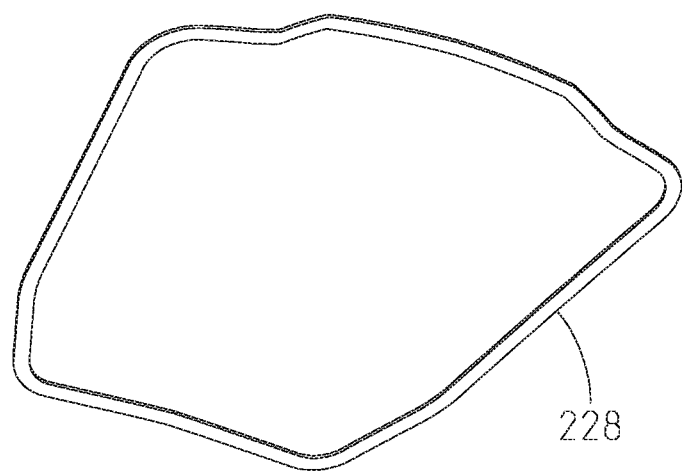
Fig. 26

VEHICLE

BACKGROUND OF THE DISCLOSURE

The present disclosure generally relates to all-terrain and utility vehicles and, more particularly, to a single-seat utility vehicle configured to carry at least an operator and cargo.

Generally, all-terrain vehicles ("ATVs") and utility vehicles ("UVs") are configured to carry at least the operator and cargo over a variety of terrains. Side-by-side vehicles, in which a driver and passenger are seated beside each other on laterally spaced apart seats, have become popular because of the ability to allow the passenger to share the driver's viewpoint and riding experience instead of being positioned behind the driver. However, single-seat vehicles also are available which support only the driver and cargo but include a bucket seat and steering wheel which make these vehicles give the driver a different experience compared to driving an ATV with a straddle-type seat and handlebars.

SUMMARY OF THE DISCLOSURE

In one embodiment of the present disclosure, a utility vehicle comprises a plurality of front ground engaging members, a plurality of rear ground engaging members positioned rearward of the front ground engaging members, a frame assembly supported by the front and rear ground engaging members, a plurality of body panels couple to the frame assembly, and an operator area including seating for a driver. The seating includes a seat bottom and a seat back. The vehicle further comprises a powertrain assembly operably coupled to the front and rear ground engaging members and including a throttle pedal and a brake pedal. The brake pedal includes a first portion positioned to receive the driver's right foot and a second portion spaced apart from the first portion and positioned to receive the driver's left foot.

A further embodiment of the present disclosure includes a utility vehicle comprising a plurality of front ground engaging members, a plurality of rear ground engaging members, and a frame supported by the front and rear ground engaging members. The frame includes a front frame portion and a rear frame portion. The vehicle also comprises a body assembly comprising a plurality of body panels supported by the frame, a powertrain assembly operably coupled to the front and rear ground engaging members, and a cooling assembly operably coupled to the powertrain assembly and including a radiator supported by the rear frame portion. An air intake volume for the radiator is positioned forward of the radiator and is partially defined by the rear frame portion.

Another illustrative embodiment of the present disclosure includes a utility vehicle comprising a plurality of front ground engaging members, a plurality of rear ground engaging members, and a frame supported by the front and rear ground engaging members. The frame including a front frame portion and a rear frame portion. The vehicle also comprises a powertrain assembly operably coupled to the front and rear ground engaging members, a cooling assembly operably coupled to the powertrain assembly and including a radiator supported by the rear frame portion, and a cargo area of the vehicle positioned above the radiator.

In one embodiment of the present disclosure, a utility vehicle comprises a plurality of ground-engaging members, a frame assembly supported by the ground-engaging members and including a lower frame portion coupled to an upper frame portion, and an operator area supported by the frame and including seating for a driver. The upper frame portion extends above the seating. The vehicle also comprises a powertrain assembly supported by the frame and including an engine and a drive system operably coupled to the engine and an air intake assembly fluidly coupled to the engine and the drive system and including a first air inlet configured to provide air to the engine and a second air inlet configured to provide air to the drive system. The first and second air inlets are supported by the upper frame assembly.

Another illustrative embodiment of the present disclosure includes a utility vehicle comprising a plurality of ground-engaging members, a frame assembly supported by the ground-engaging members and extending along a longitudinal axis, and an operator area supported by the frame and including a seat for an operator having a seat bottom and a seat back. At least a portion of the seat bottom is positioned to a first side of the longitudinal axis. The vehicle further comprises a plurality of operator controls configured to control operation of the utility vehicle. The plurality of operator controls is positioned to a second side of the longitudinal axis and includes a shifter configured to input a driving gear.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 21 is an exploded view of the door assembly and body panel of FIG. 20A;

FIG. 26 is an exploded view of a center portion and a gasket of the hood assembly of FIG. 25;

DETAILED DESCRIPTION OF THE DRAWINGS

Figure 1:
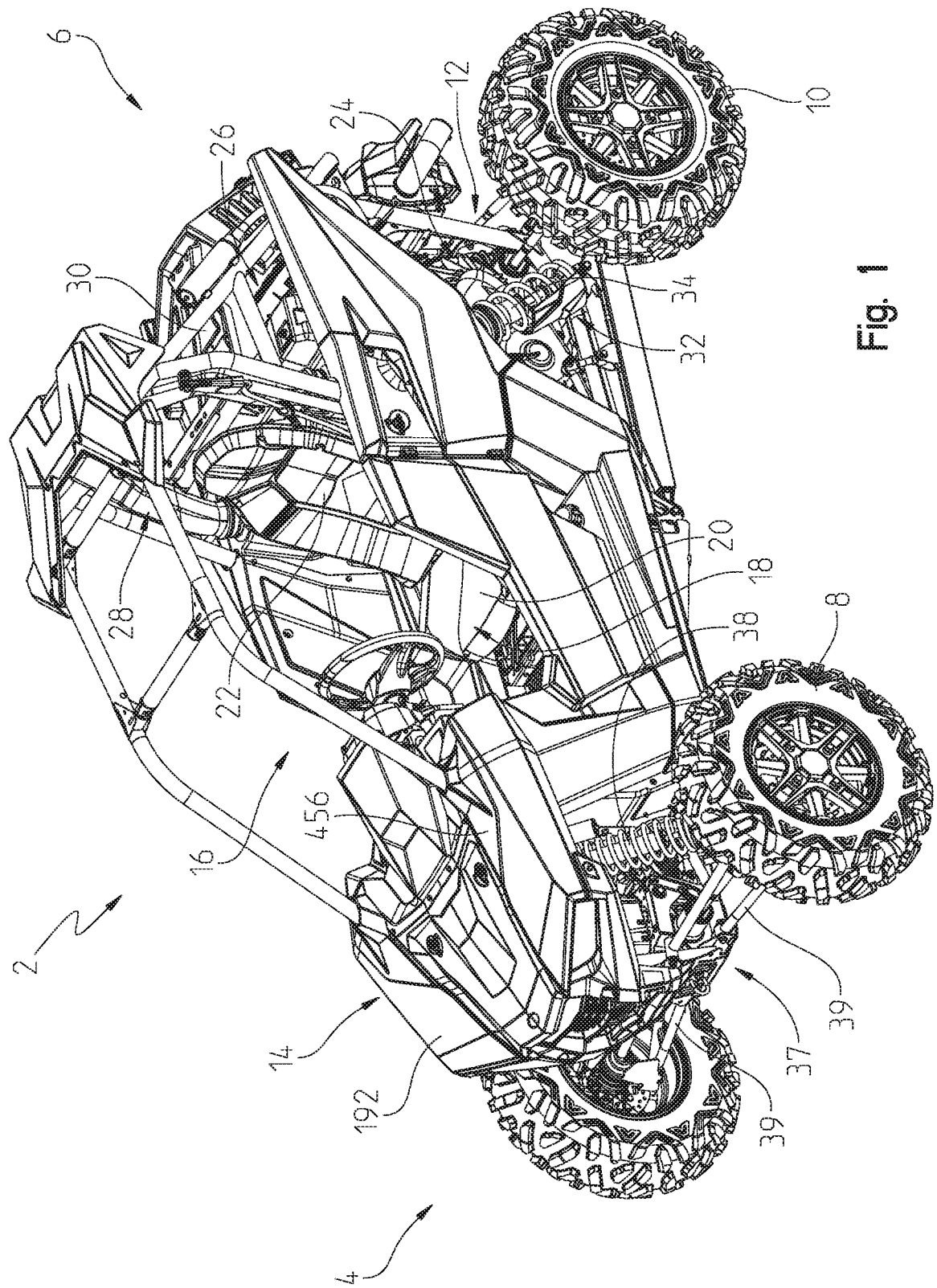
FIG. 1 is a front left perspective view of a utility vehicle of the present disclosure.
Figure 2:
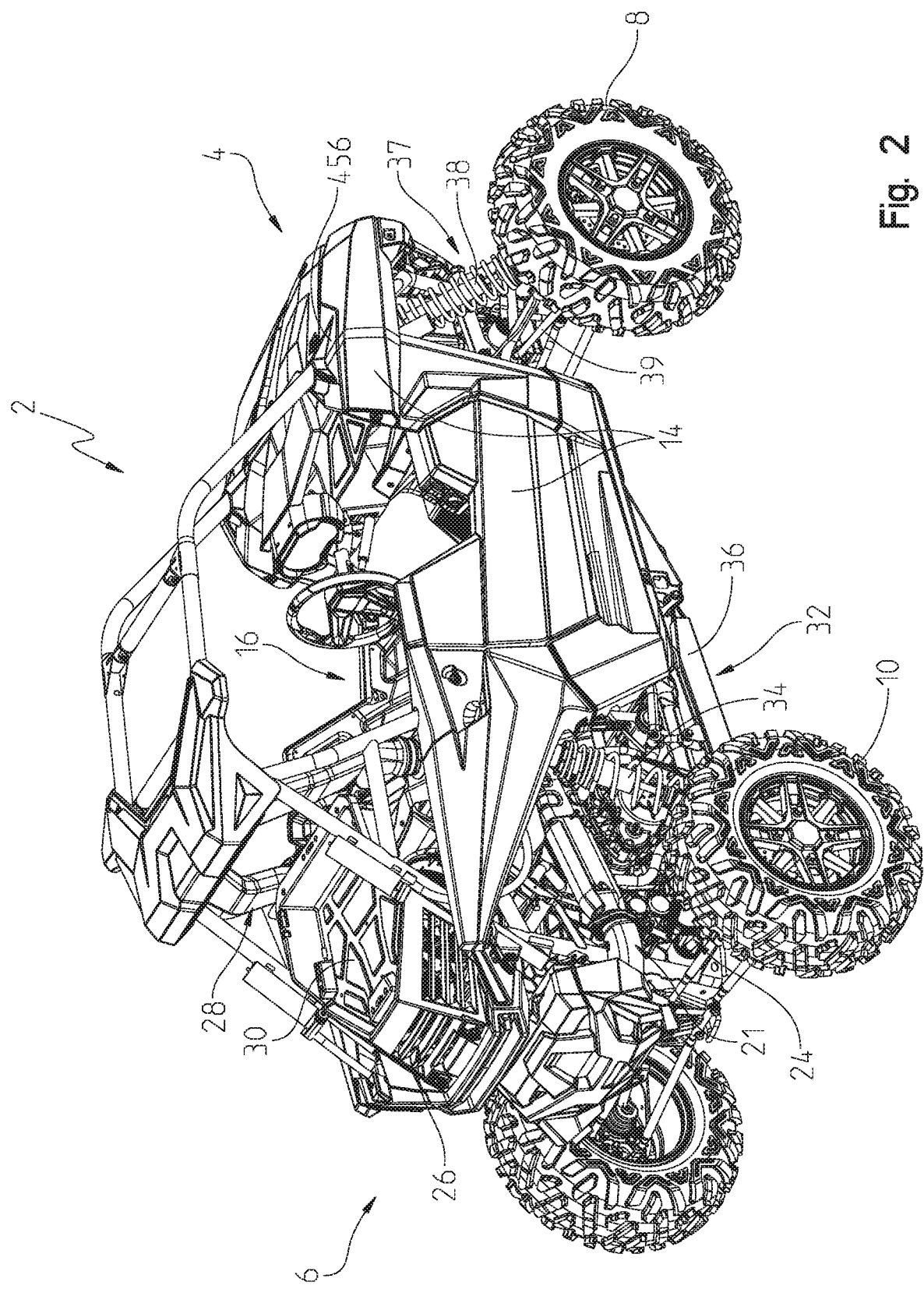
FIG. 2 is a rear right perspective view of the utility vehicle of FIG. 1.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIGS. 1-4, a utility vehicle 2 is shown. Vehicle 2 includes a front end 4 and a rear end 6. A plurality of ground engaging members, including front wheels 8 and rear wheels 10, support utility vehicle 2 on a ground surface. In one embodiment, one or more of front wheels 8 and/or rear wheels 10 may be replaced with tracks, such as the Prospector II Tracks available from Polaris Industries, Inc., located at 2100 Highway 55 in Medina, Minn. 55340 or non-pneumatic tires, such as those shown in U.S. Pat. Nos. 8,176,957 and 8,104,524, the complete disclosures of which are expressly incorporated herein by reference. Additionally, because vehicle 2 is configured to traverse a variety of terrain and may be operated on various trails, in one embodiment, the width of vehicle 2 at ride height and without any payload (e.g., cargo, driver, and/or passenger) may be approximately 64 inches.

Referring still to FIGS. 1-4, vehicle 2 includes a frame assembly 12 supported by front and rear wheels 8, 10 and which is generally concealed by a body assembly 14. Body assembly 14 includes a plurality of body panels supported by frame assembly 12 which couple together to define a continuous outer body of vehicle 2.

As shown in FIGS. 1-4, frame assembly 12 also supports an operator area 16 of vehicle 2 which includes seating 18 for at least an operator of vehicle 2. Illustratively seating 18 includes only a single seat having a seat bottom 20 and a seat back 22, however, in alternative embodiments, seating 18 may include side-by-side seating for at least the operator and a passenger. As shown, operator area 16 is an open-air operator area 16, however, in other embodiments, vehicle 2 may include a cab assembly, including any or all of a front windshield, a rear windshield, full doors, and a roof, to enclose operator area 16.

Referring to FIGS. 1-4, rear end 6 of utility vehicle 2 supports at least portions of a powertrain assembly 24, a cooling assembly 26, and an air intake assembly 28, as detailed further herein. Additionally, rear end 6 of utility vehicle 2 may support a cargo area or cargo box 30 positioned generally rearward of operator area 16 and generally above powertrain assembly 24 and cooling assembly 26. Cargo area 30 is removable from vehicle 2 to access portions of cooling assembly 26 and other components supported at rear end 6 of vehicle 2, as disclosed further herein.

As shown in FIGS. 1-4, rear end 6 of vehicle 2 also includes a rear suspension assembly 32 including at least shock absorbers 34 and trailing arms 36. Rear suspension assembly 32 generally extends around a portion of powertrain assembly 24, including an engine 380 and a drive system comprising at least a continuously variable transmission ("CVT") 386 and a shiftable transmission or gear train (not explicitly labeled). Front end 4 of vehicle 2 includes a front suspension assembly 37 including at least shock absorbers 38 and control arms 39.

Figure 8:
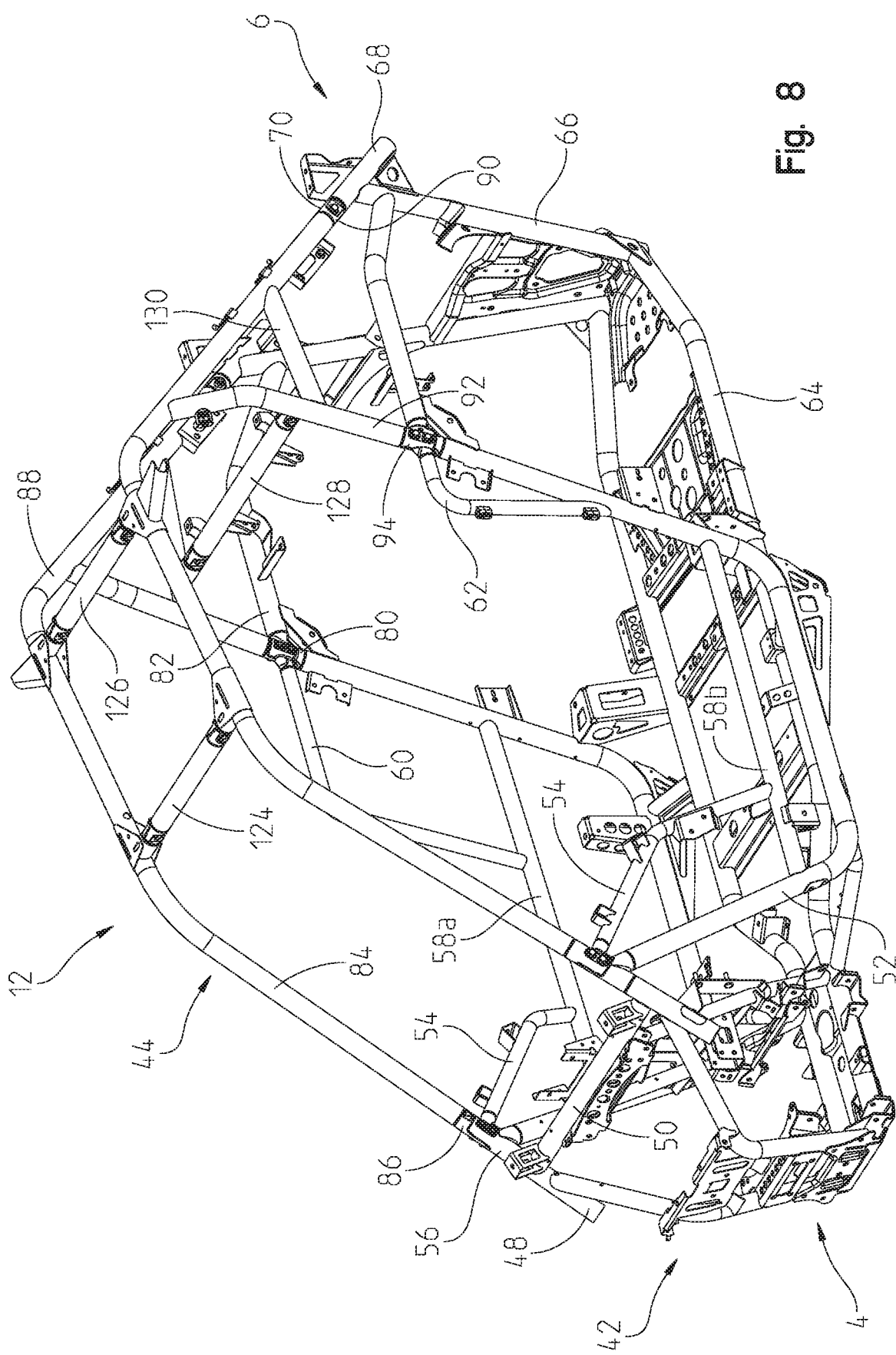
FIG. 8 is a front left perspective view of the lower frame assembly of FIG. 5 coupled to an upper frame assembly.
Figure 9:
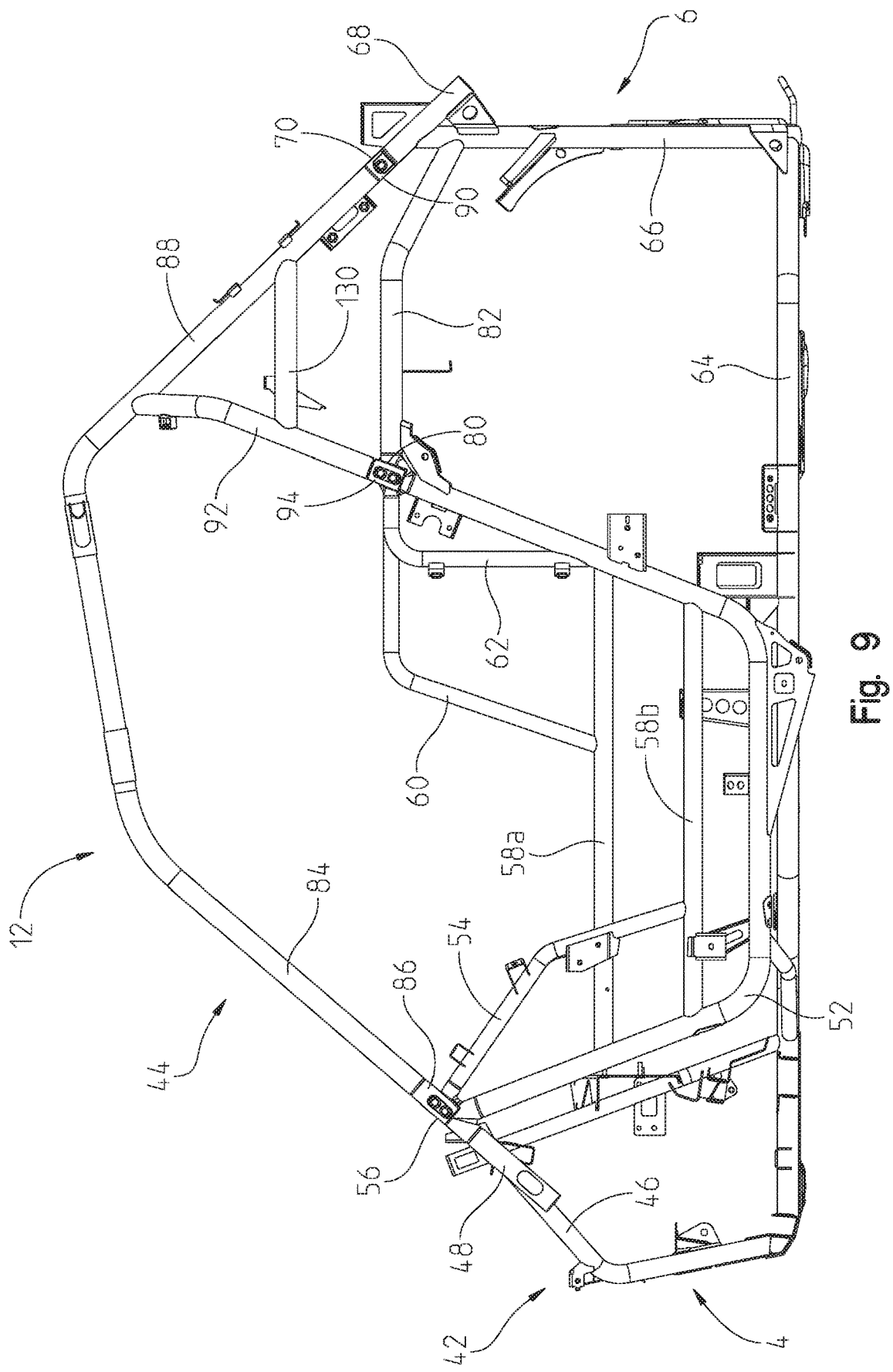
FIG. 9 is a left side view of the lower and upper frame assemblies of FIG. 8.

Referring to FIGS. 5-18, frame assembly 12 extends between front end 4 and rear end 6 of utility vehicle 2 along a longitudinal axis L of vehicle 2 (FIG. 7) and is supported on front wheels 8 and rear wheels 10. Frame assembly 12 includes a lower frame assembly 42, as shown in FIGS. 6-7, and an upper frame assembly 44, as shown in FIGS. 8 and 9. Lower frame assembly 42 includes first upstanding members 46 and second upstanding members 49 positioned rearward of first upstanding members 46. First upstanding members 46 extend generally vertically and rearwardly to couple with diagonal members 48. Diagonal members 48 also are coupled together with a cross-member 50 extending therebetween and are further coupled to upstanding members 52 and frame tubes 54. Rearward ends of upstanding members 52 each includes a coupling member 80 and are coupled to frame members 82. Diagonal members 48 also include coupling members 56 for coupling with upper frame assembly 44, as disclosed herein.

Figure 5:
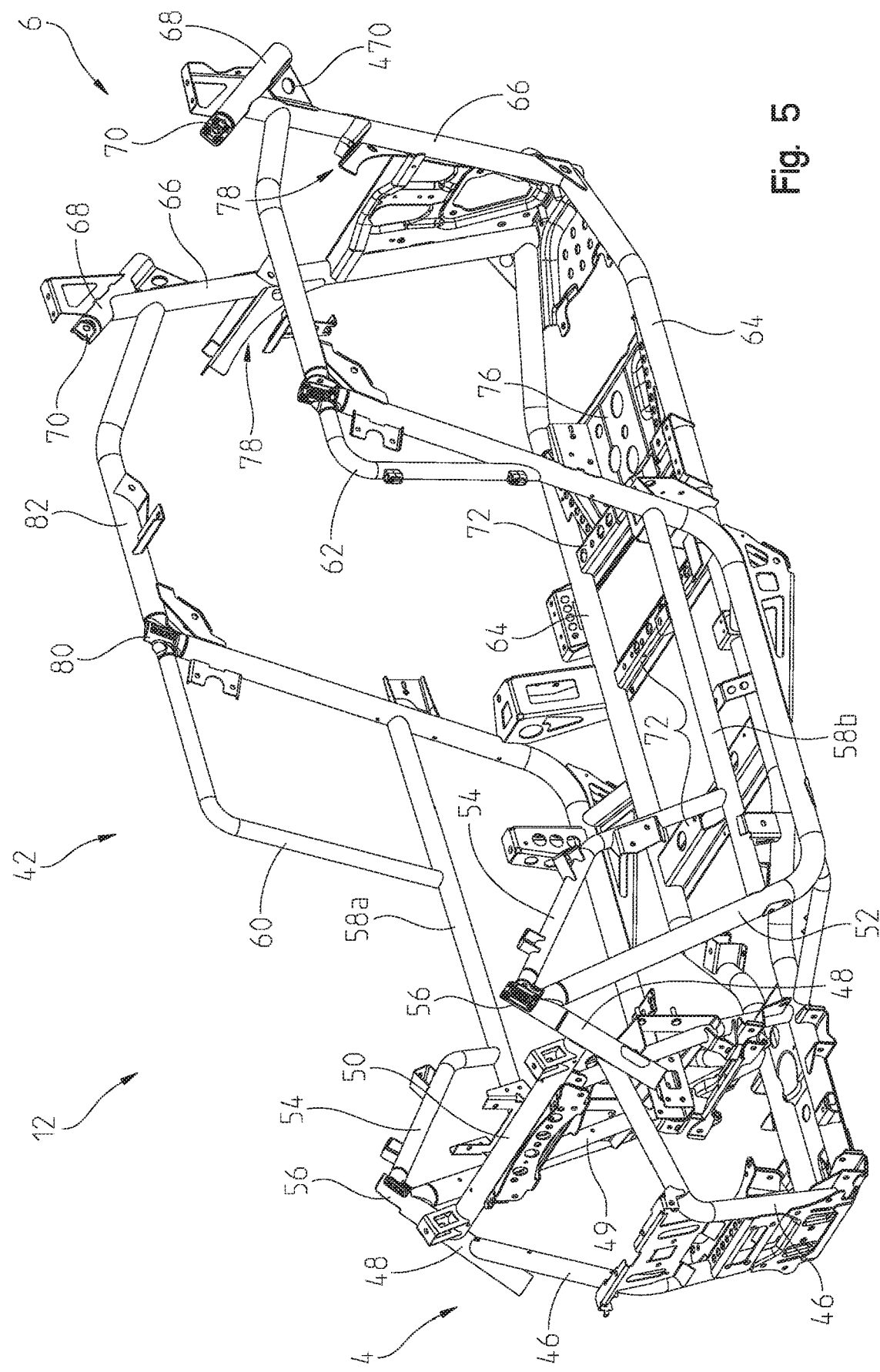
FIG. 5 is a front left perspective view of a lower frame assembly of the utility vehicle of FIG. 1.
Figure 6:
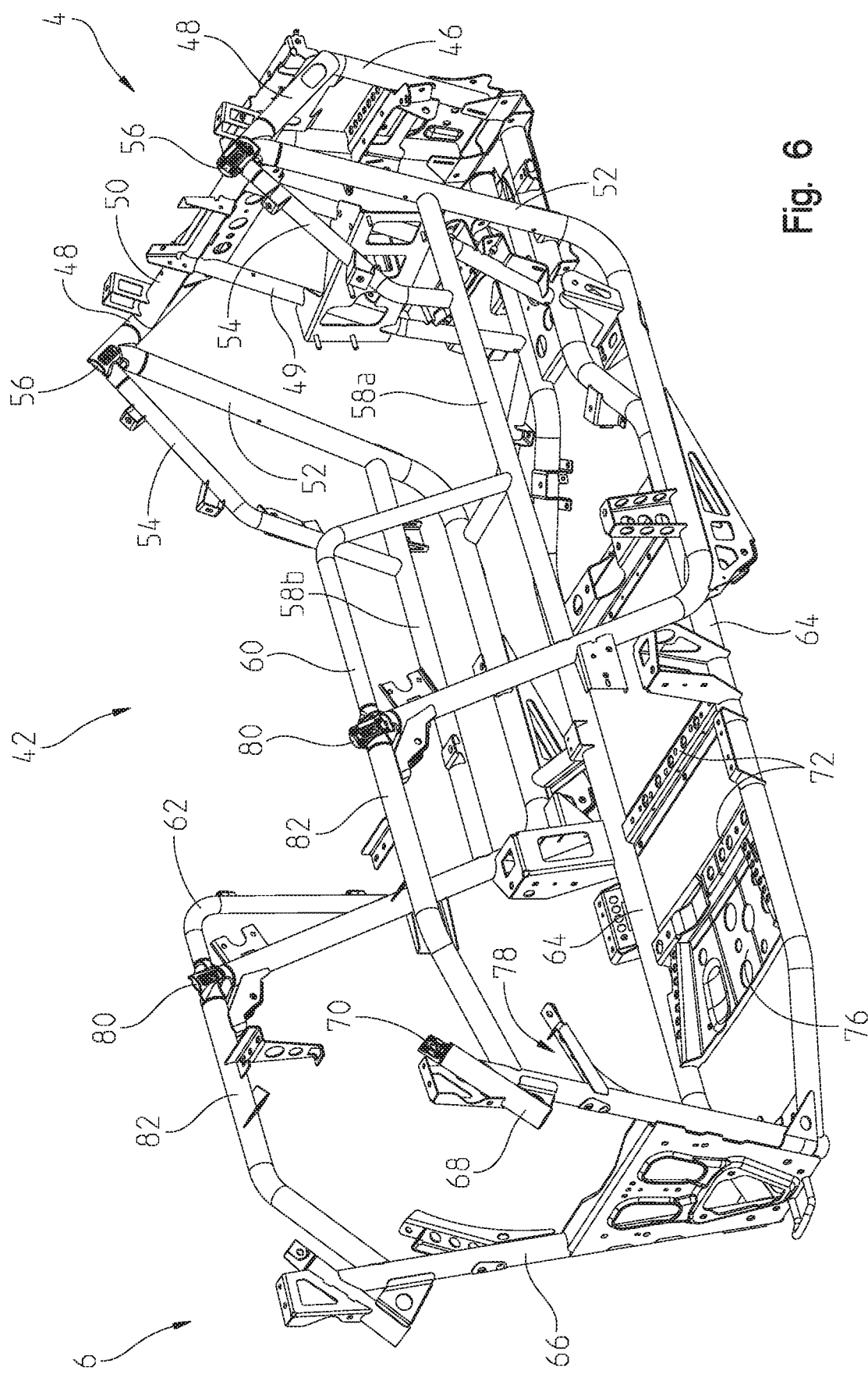
FIG. 6 is a rear right perspective view of the lower frame assembly of FIG. 5.
Figure 7:
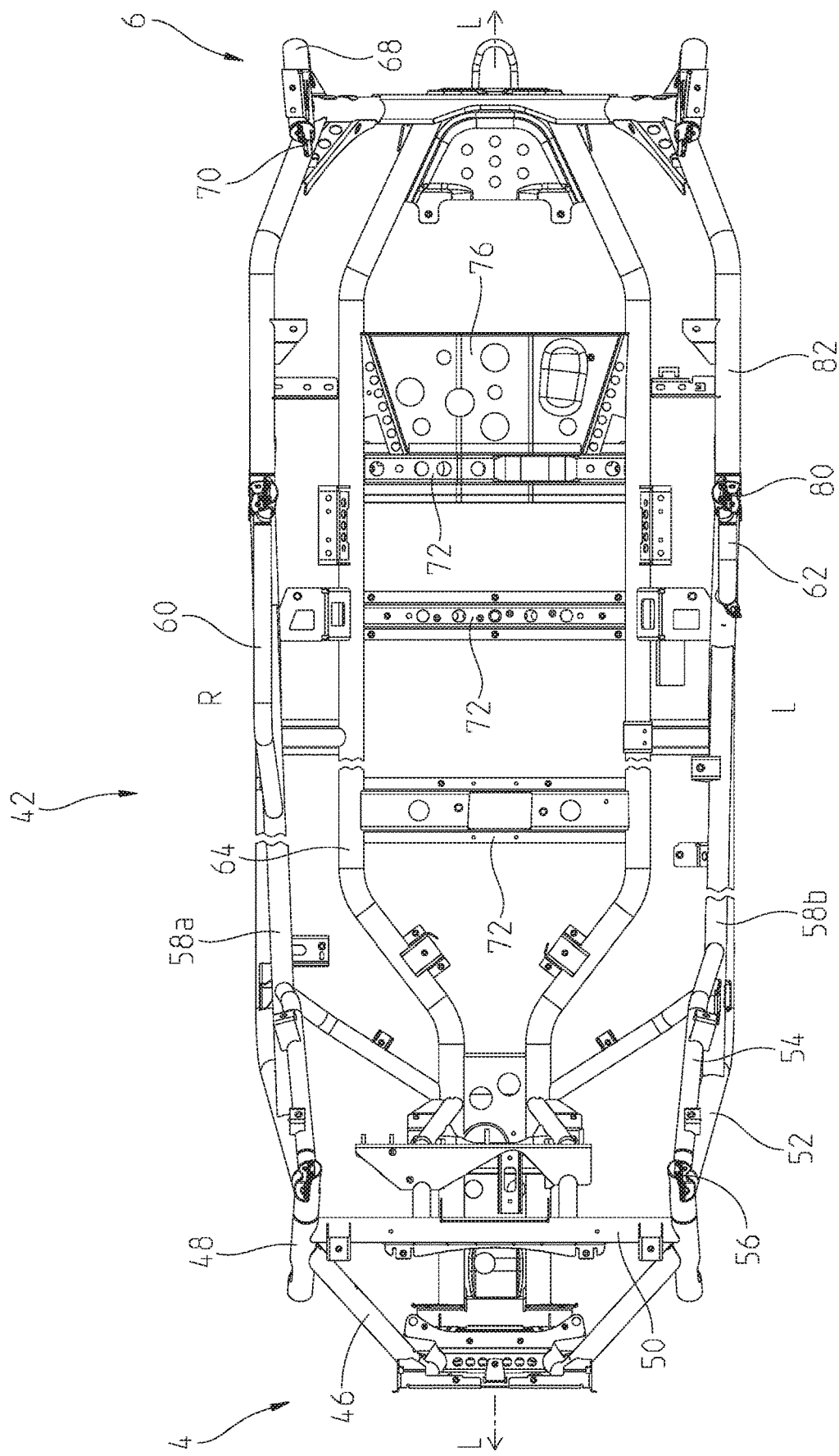
FIG. 7 is a top view of the lower frame assembly of FIG. 5.

Referring to FIGS. 5-7, frame tubes 54 are each coupled to a rearwardly-extending frame member 58, however, frame member 58a on a right side of vehicle 2 (denoted by R in FIG. 7) is positioned at a smaller vertical distance from coupling members 56 than frame member 58b on a left side of vehicle 2 (denoted by L in FIG. 7), as shown best in FIG. 9. The vertical distance between frame member 58b and coupling member 56 on left side L of vehicle 2 allows for ingress and egress of the operator within operator area 16. However, the vertical distance between frame member 58a and coupling member 56 on right side R of vehicle 2 makes ingress and egress from operator area 16 on right side R seemingly less obvious to the operator, as disclosed herein. Additionally, frame member 58a on right side R of vehicle 2 is coupled to a frame tube 60 which may further decrease the likelihood of ingress and egress from operator area 16 on right side R. Conversely, on left side L, a bolster bar 62 may be coupled to upstanding member 52 only and may be configured to support a door to facilitate ingress and egress from operator area 16. Frame members 58 also are coupled to portions of upstanding members 52.

Referring still to FIGS. 5-7, first upstanding members 46 also are coupled to longitudinally-extending frame members 64 which extend continuously from front end 4 to rear end 6. In this way, lower frame assembly 42 is configured as a one-piece frame such that lower frame assembly 42 does not include couplers positioned partially along the length of longitudinally-extending frame members 64 to couple together a front section and a rear section of lower frame assembly 42. This one-piece construction of lower frame assembly 42 may result in lower frame assembly 42 having a lower weight but greater rigidity than a multi-piece frame assembly coupled together at a longitudinal distance between front end 4 and rear end 6.

Longitudinally-extending frame members 64 are coupled to rear upstanding members 66 at rear end 6. Upstanding members 66 extend vertically to couple with rear diagonal members 68. Each rear diagonal member 68 includes a coupling member 70 configured to couple with upper frame assembly 44 (FIG. 8), as disclosed further herein. Rear upstanding members 66 also couple with frame members 82.

Additionally, longitudinally-extending frame members 64 are coupled together through a plurality of cross members 72 extending laterally therebetween. Additionally, an engine support member 76 is coupled to longitudinally-extending frame members 64 to support an engine 390 (FIG. 42) of powertrain assembly 24. Also, rear upstanding members 66 include a plurality of brackets 78 configured to support additional components of vehicle 2, as disclosed further herein.

Referring to FIGS. 8-13, lower frame assembly 42 is coupled to upper frame assembly 44. More particularly, upper frame assembly 44 includes front upstanding members 84, which each includes a coupling member 86, and rear upstanding members 88, which also each includes a coupling member 90. In one embodiment, front upstanding members 84 are integral with rear upstanding members 88 such that upper frame assembly 44 is configured as a one-piece frame component. Illustratively, at least front and rear upstanding members 84, 88 are comprised as a single weldment that extends continuously from front end 4 to rear end 6 of vehicle 2 and over operator area 16. Alternatively, front upstanding members 84 may be separate from and coupled to rear upstanding members 88. Upper frame assembly 44 also may include intermediate upstanding members 92 integrally formed with rear upstanding members 88. Each of intermediate upstanding members 92 may include a coupling member 94.

Figure 10:
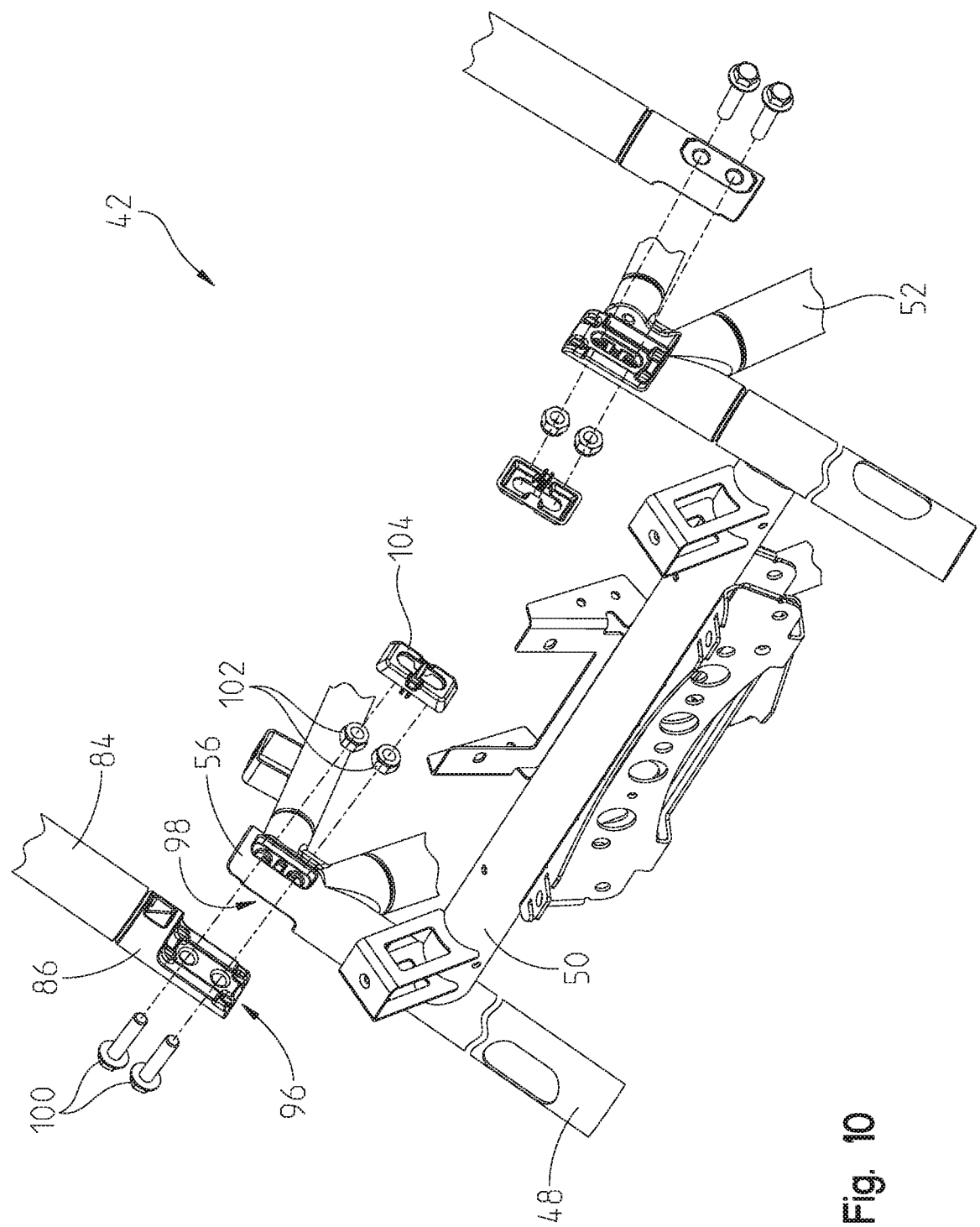
FIG. 10 is an exploded view of a portion of the lower frame assembly coupled to a portion of the upper frame assembly of FIG. 8.

As shown in FIG. 10, front upstanding members 84 of upper frame assembly 44 are coupled to diagonal members 48 of lower frame assembly 42 through coupling members 56, 86. More particularly, coupling members 56, 86 have a generally complimentary shape to each other such that a recessed portion 96 of coupling member 86 receives a recessed portion 98 of coupling member 56. In one embodiment, coupling members 56, 86 are cast members comprised of a metallic material. When coupled together, coupling members 56, 86 define a generally cylindrical member that has a diameter or perimeter that generally equals the diameter or perimeter of diagonal member 48 and/or front upstanding member 84. Coupling members 56, 86 are coupled together with removable fasteners, such as bolts 100 and nuts 102. Additionally, a polymeric bracket or plug 104 may be included to retain nuts 102 on coupling members 56, 86. Coupling members 56, 86 may be concealed by a body panel 456 (FIG. 1) which is removably coupled to a portion of a hood assembly 192 of body assembly 14.

Figure 11:
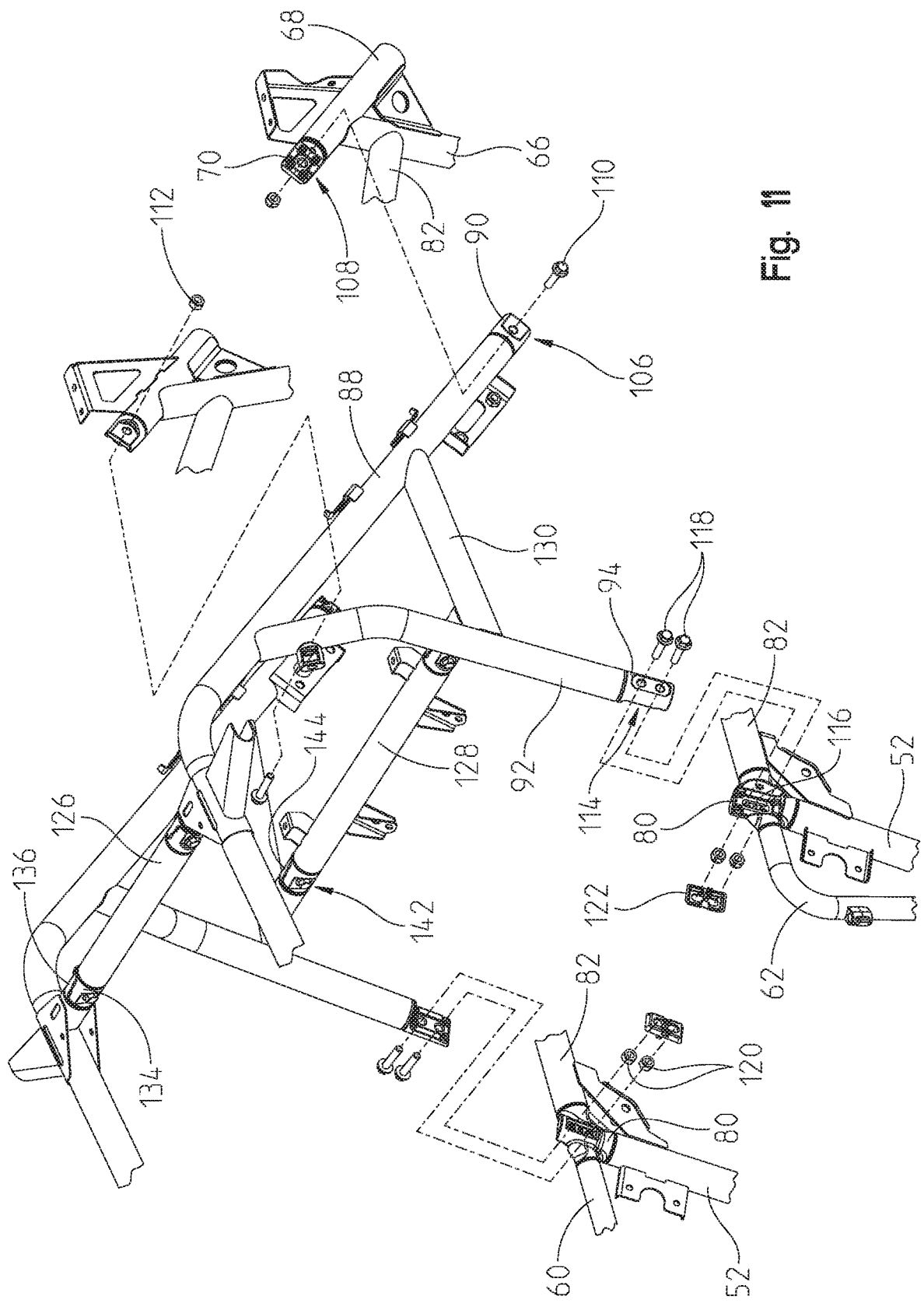
FIG. 11 is an exploded view of another portion of the upper frame assembly coupled to another portion of the lower frame assembly of FIG. 8.

As shown in FIG. 11, rear upstanding members 88 of upper frame assembly 44 are coupled to rear diagonal members 68 of lower frame assembly 42 through coupling members 70, 90. More particularly, coupling members 70, 90 have a generally complimentary shape with each other such that a recessed portion 106 of coupling member 90 receives a recessed portion 108 of coupling member 70. In one embodiment, coupling members 70, 90 may be cast from a metallic material. When coupled together, coupling members 70, 90 define a generally cylindrical member that has a diameter or perimeter that generally equals the diameter or perimeter of rear diagonal member 68 and/or rear upstanding member 88. Coupling members 70, 90 are coupled together with removable fasteners, such as bolts 110 and nuts 112.

Referring still to FIG. 11, intermediate upstanding members 92 of upper frame assembly 44 are coupled to upstanding members 52 of lower frame assembly 42 through coupling members 80, 94. More particularly, coupling members 80, 94 have a generally complimentary shape such that a recessed portion 114 of coupling member 94 receives a recessed portion 116 of coupling member 80. In one embodiment, coupling members 80, 94 are cast from a metallic material. When coupled together, coupling members 80, 94 define a generally cylindrical member that has a diameter or perimeter that generally equals the diameter or perimeter of upstanding member 52 and/or intermediate upstanding member 92. Coupling members 80, 94 are coupled together with removable fasteners, such as bolts 118 and nuts 120. Additionally, a polymeric bracket or plug 122 may be included to retain nuts 120.

Figure 12:
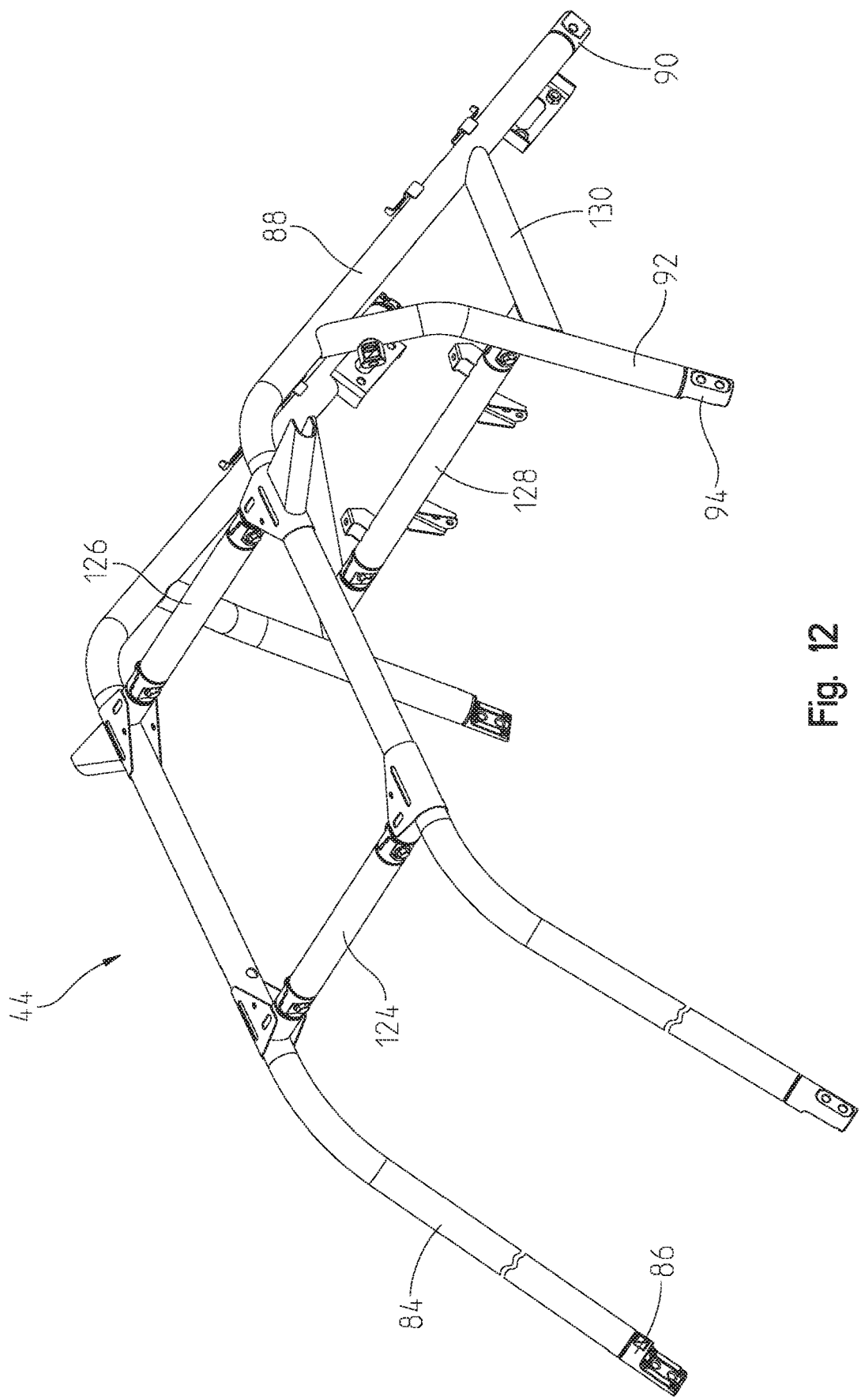
FIG. 12 is a front left perspective view of the upper frame assembly of FIG. 8.
Figure 13:
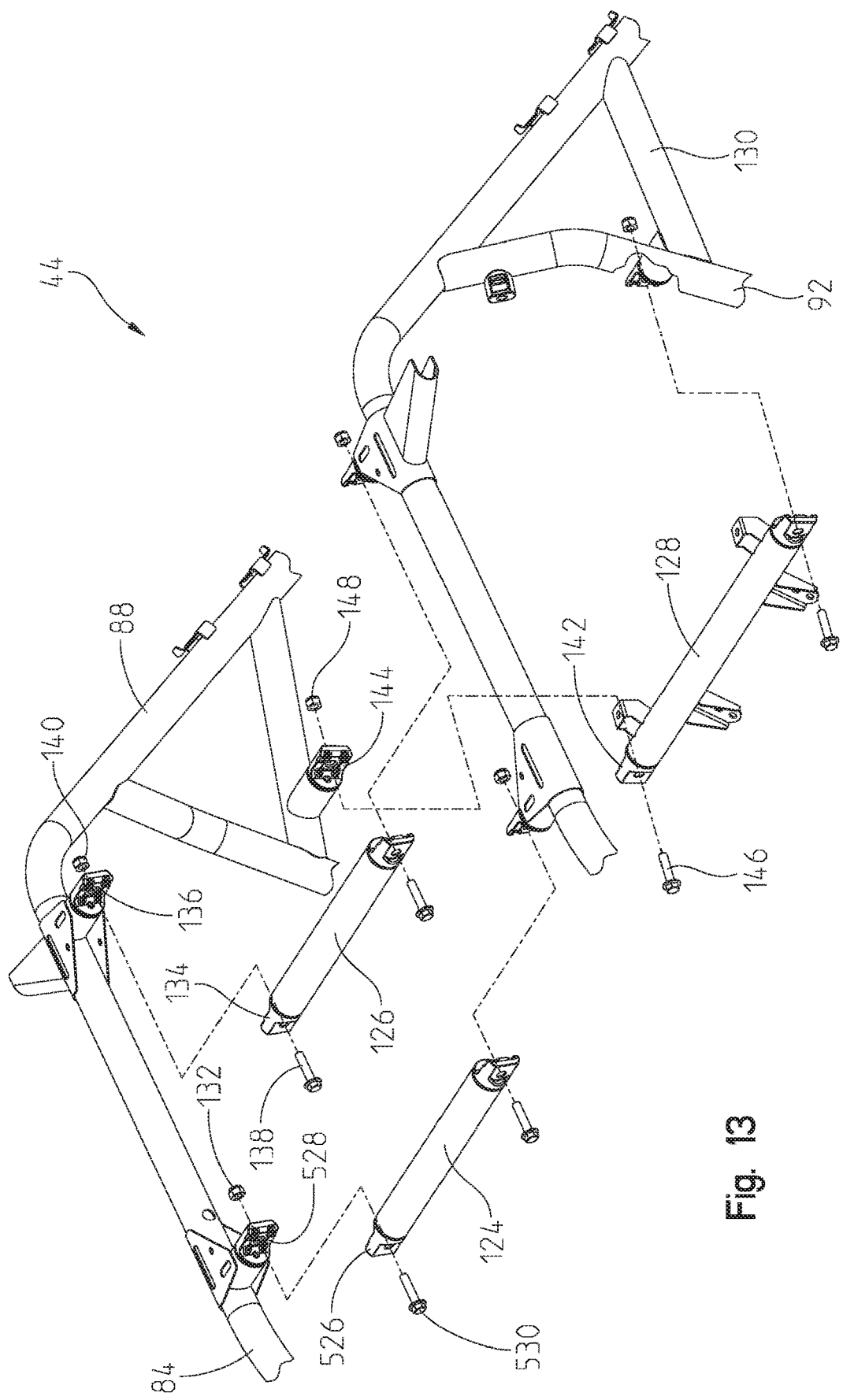
FIG. 13 is an exploded view of a portion of the upper frame assembly of FIG. 12.
Figure 14:
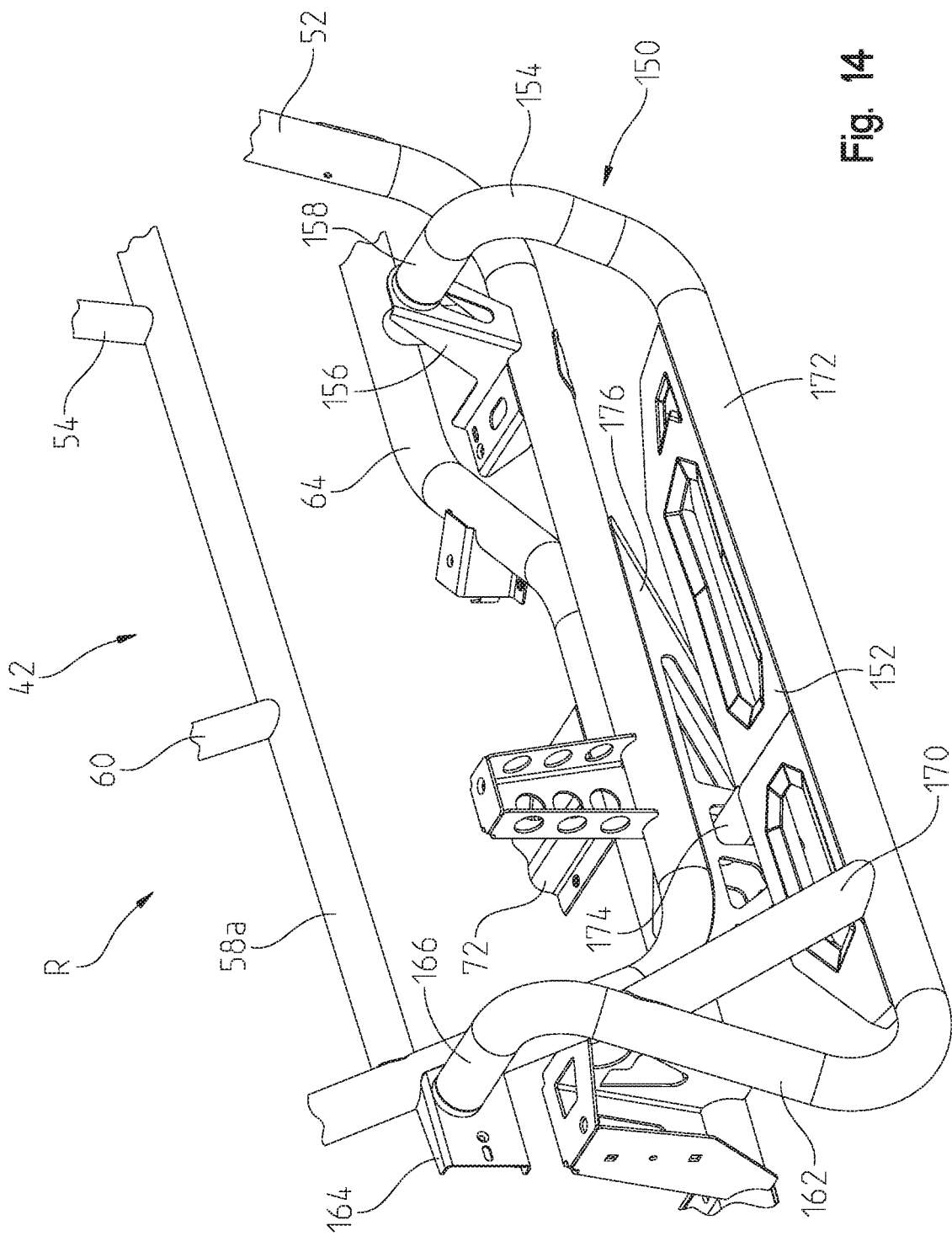
FIG. 14 is a rear right perspective view of a side frame portion of the lower frame assembly of FIG. 5, illustratively an accessory rock slider for the vehicle.
Figure 15:
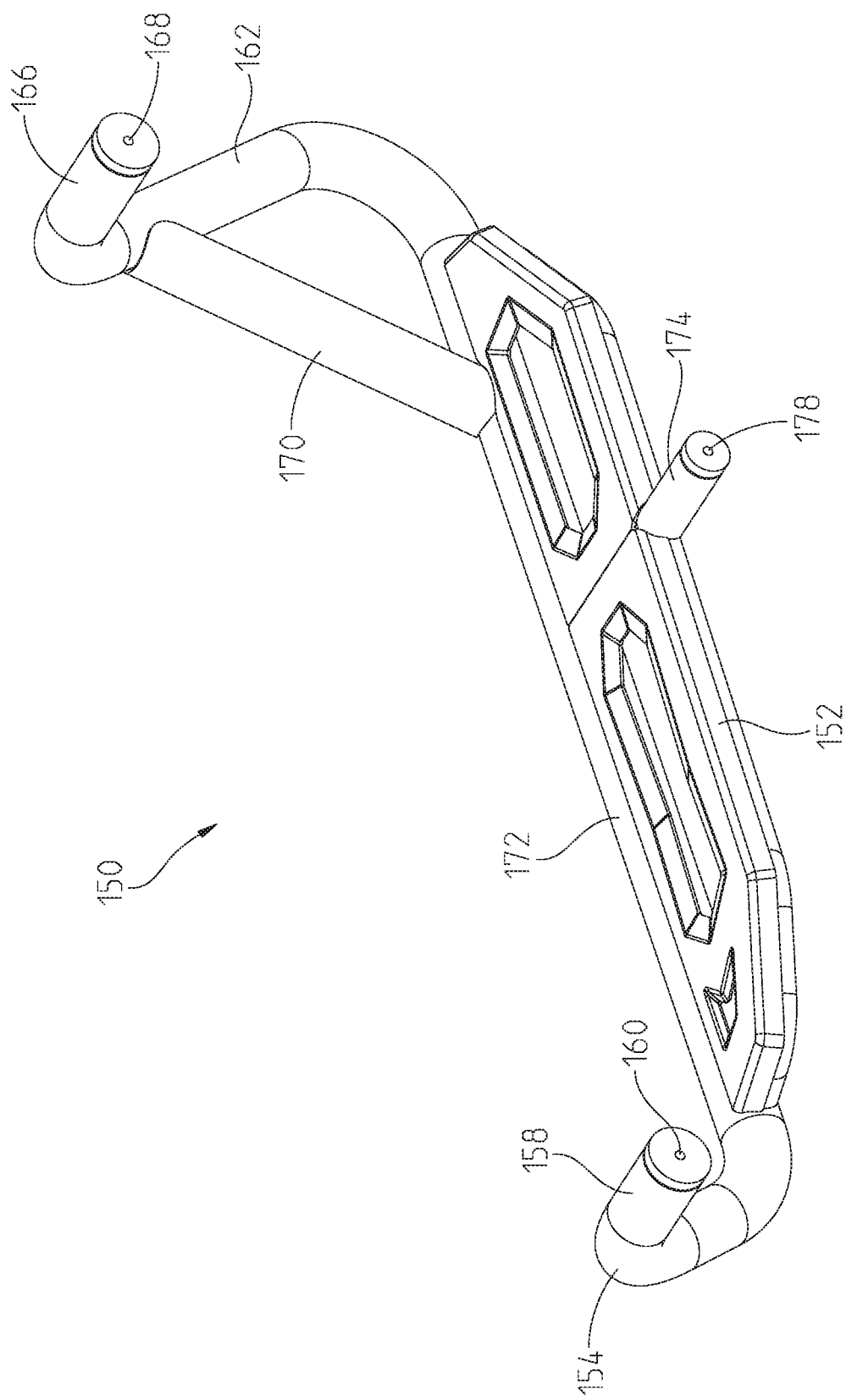
FIG. 15 is a front left perspective view of the side frame portion of FIG. 14.

Referring to FIGS. 12 and 13, upper frame assembly 44 further includes a front cross member 124, an upper rear cross member 126, a lower rear cross member 128, and a longitudinal cross member 130. Illustratively, front cross member 124 is coupled to front upstanding members 84 with coupling members 526 which are removably coupled to coupling members 528 on front upstanding members 84 with fasteners 530, 132. Similarly, upper rear cross member 126 is coupled to rear upstanding members 88 with coupling members 134 which are removably coupled to coupling members 136 on rear upstanding members 88 with fasteners 138, 140. Additionally, lower rear cross member 128 is coupled to longitudinal cross members 130 with coupling members 142 which are removably coupled to coupling members 144 on longitudinal cross members 130 with fasteners 146, 148.

As shown in FIGS. 14-17, frame assembly 12 also may include a side frame member 150 coupled to lower frame assembly 42. Side frame member 150 extends longitudinally in a direction parallel longitudinal axis L (FIG. 7) and includes a generally horizontal platform or support plate 152 configured to support an accessory or person thereon. In one embodiment, side frame member 150 may be a rock slider provided as an accessory for vehicle 2.

Illustratively, side frame member 150 includes a forward portion 154 which is removably coupled to a bracket 156 on upstanding member 52 of lower frame assembly 42 on right side R of vehicle 2. More particularly, forward portion 154 includes a coupling member 158 with an opening 160 configured to receive a fastener (not shown) which extends through bracket 156 and opening 160 to removably couple forward portion 154 to bracket 156. Additionally, side frame member 150 includes a rearward portion 162 which is removably coupled to a bracket 164 on upstanding member 52 on right side R of vehicle 2. More particularly, rearward portion 162 includes a coupling member 166 with an opening 168 configured to receive a fastener (not shown) which extends through bracket 164 and opening 168 to removably couple rearward portion 162 to bracket 164. A diagonal member 170 of side frame member 150 may extend between rearward portion 162 and a longitudinal member 172 extending between forward portion 154 and rearward portion 162. In one embodiment, longitudinal member 172 is integrally formed with forward portion 154 and rearward portion 162.

Side frame member 150 also may include an intermediate coupling member 174 which is configured to be received through an opening on a bracket 176 of lower frame assembly 42. Illustratively, bracket 176 is coupled to a lower surface of upstanding member 52. Intermediate coupling member 174 may include an opening 178 configured to receive a fastener (not shown) which extends into opening 178 for attaching intermediate coupling member 174 to a portion of lower frame assembly 42.

Figure 16:
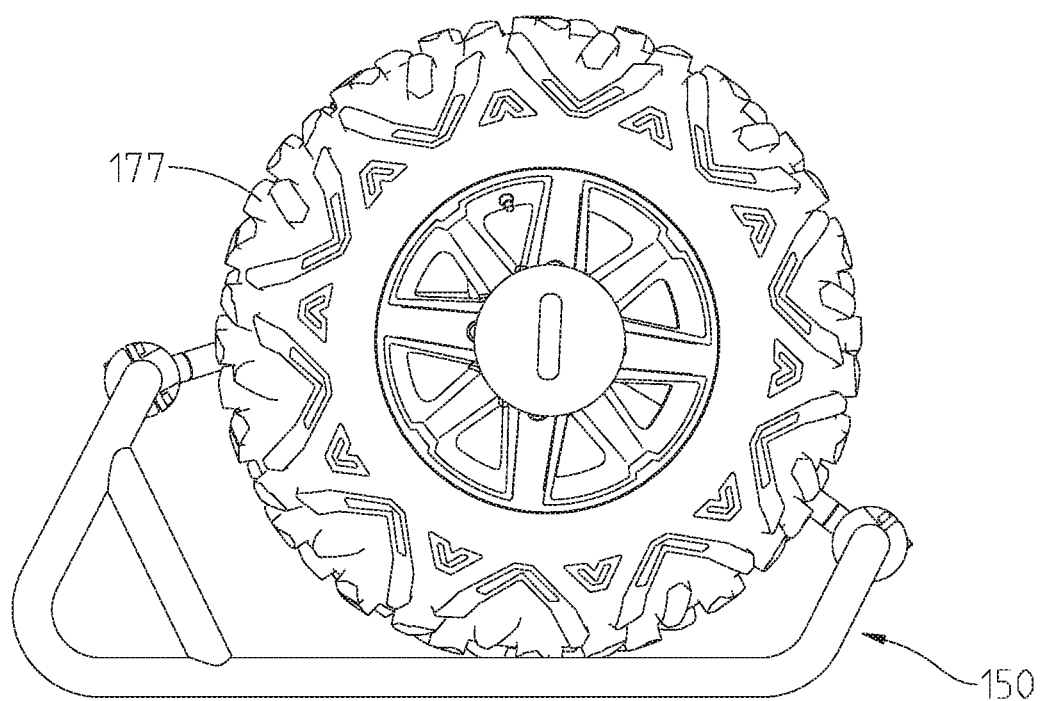
FIG. 16 is a right side view of the side frame portion of FIG. 14 supporting a spare tire.
Figure 17:
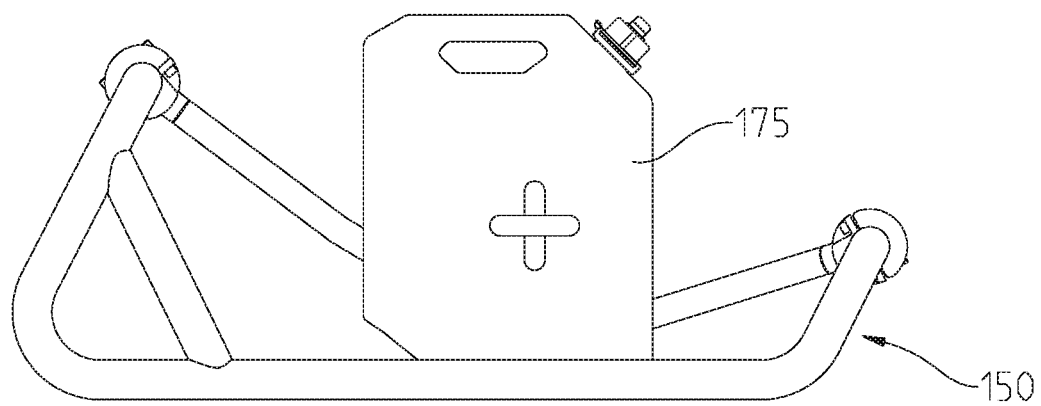
FIG. 17 is a right side view of the side frame portion of FIG. 14 supporting a fuel tank.

As shown in FIGS. 16 and 17, a plurality of accessories or components for vehicle 2 may be carried on vehicle 2 using side frame member 150. Because, as disclosed above, the right side R of vehicle 2 may suggest to the operator that ingress and egress from operator area 16 (FIG. 1) should occur on left side L, side frame member 150 and the accessory carried thereon are positioned on right side R of vehicle 2, given that the operator does not enter or exit operator area 16 from right side R. In one embodiment, side frame member 150 may be configured to support a spare tire 177 (FIG. 16) or an auxiliary fuel canister or tank 175 (FIG. 17), however, side frame member 150 may be configured to support any accessory or component to be used with vehicle 2, such as a toolbox, cargo, etc.

Figure 18:
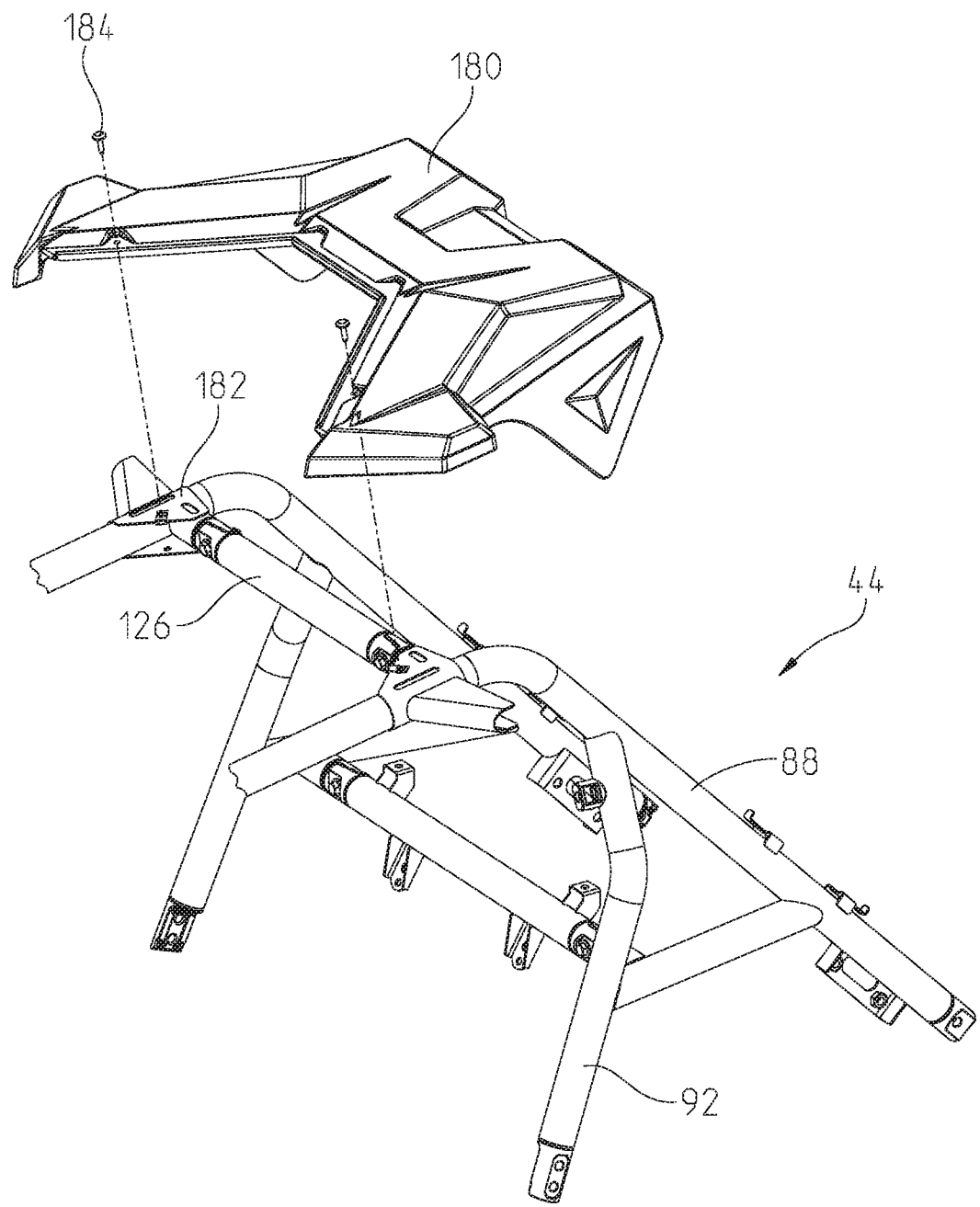
FIG. 18 is an exploded view of a rear body panel coupled to a portion of the upper frame assembly of FIG. 8.

Referring to FIGS. 18-36, portions of body assembly 14 are coupled to and supported by frame assembly 12. For example, as shown in FIG. 18, upper frame assembly 44 supports a visor or air deflector 180 of body assembly 14. Illustratively, air deflector 180 is coupled to a bracket 182 on rear upstanding members 88 of upper frame assembly 44 with removable fasteners 184. Air deflector 180 is configured to surround a portion of upper rear cross member 126 and rear upstanding members 88. Additionally, air deflector 180 may be configured to direct air flowing along rear upstanding members 88 toward air intake assembly 28, as disclosed further herein.

Figure 19:
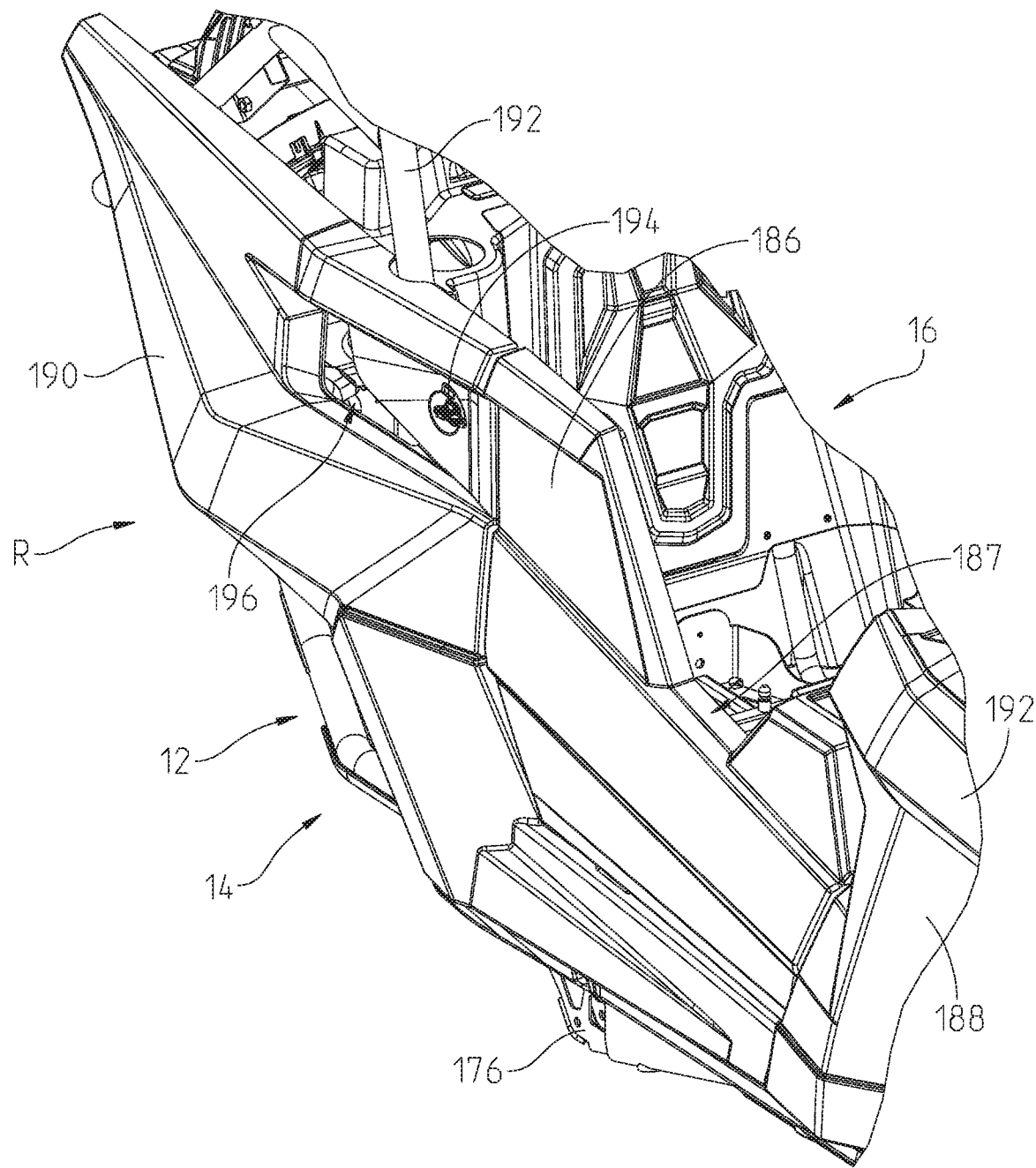
FIG. 19 is a front right perspective view of a plurality of body panels on a fixed side of the vehicle of FIG. 1.

Additionally, as shown in FIGS. 19-23, portions of body assembly 14 are disclosed. Referring to FIG. 19, body assembly 14 may include a body panel 186 positioned on right side R of vehicle 2 and extending between a forward panel 188 and a rearward panel or fender 190. In one embodiment, forward panel 188 is positioned below a portion of a hood assembly 192. Illustrative body panel 186 is fixed to frame assembly 12 at right side R of vehicle 2 to make ingress/egress from operator area 16 along right side R less likely than from left side L. More particularly, body panel 186 extends above seat bottom 20, which suggests to the operator that ingress and egress should occur on left side L. In this way, body panel 186 is not movable and does not define a door or opening through which the operator may step through when entering and exiting operator area 16. By fixing the position of body panel 186 such that body panel 186 is a stationary member which decreases the likelihood of ingress/egress from operator area 16 on right side R, controls or other components within operator area 16 may be positioned at the right side of the operator when seated in seating 18 (FIG. 1), as disclosed further herein. As is also shown in FIG. 19, illustrative body panel 186 may include a recessed portion 187 which increases the operator's line of sight when seated on seat bottom 20 (FIG. 1), as disclosed further herein.

Referring still to FIG. 19, fender 190 may be a removable access panel configured to allow access to powertrain assembly 24, cooling assembly 26, air intake assembly 28, and/or any other component supported at rear end 6 of vehicle 2. More particularly, fender 190 includes a fastener 194 which is an illustrative quarter-turn fastener configured to remain with fender 190 when fender 190 is removed from vehicle 2. Fastener 194 may be rotated approximately 90° between a locked position in which fender 190 is coupled to vehicle 2 and an unlocked position in which fender 190 may be removed from vehicle 2. In other embodiments, fastener 194 may include any other fastener configured to removably couple fender 190 to frame assembly 12 and/or may be rotated less or more than 90° between the locked and unlocked positions. It may be appreciated that the use of quarter-turn fasteners on vehicle 2 allows for various components or members to be coupled to vehicle 2 without the need for tools.

Figure 20A:
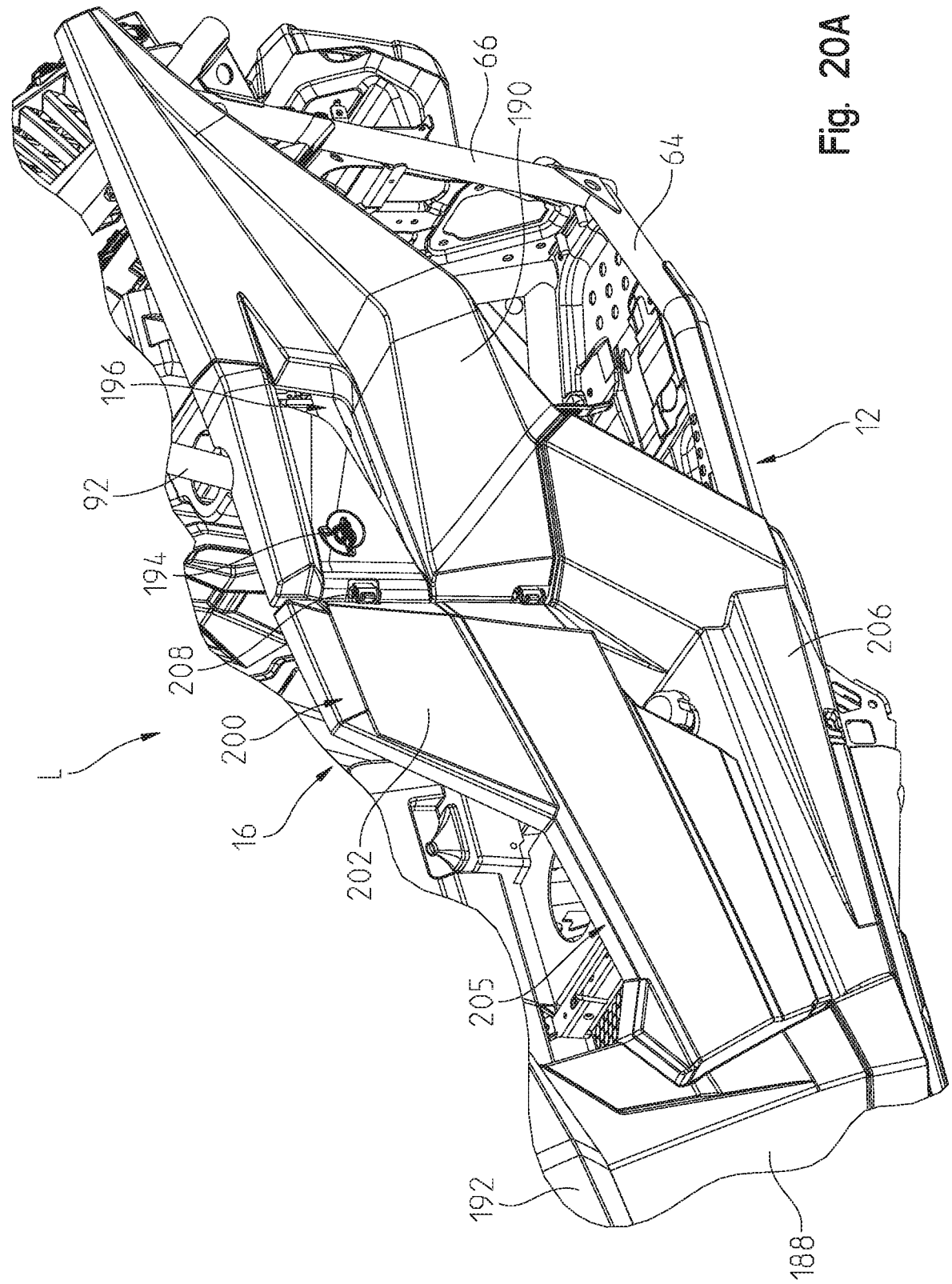
FIG. 20A is a front left perspective view of a door assembly and body panels of the utility vehicle of FIG. 1.
Figure 20B:
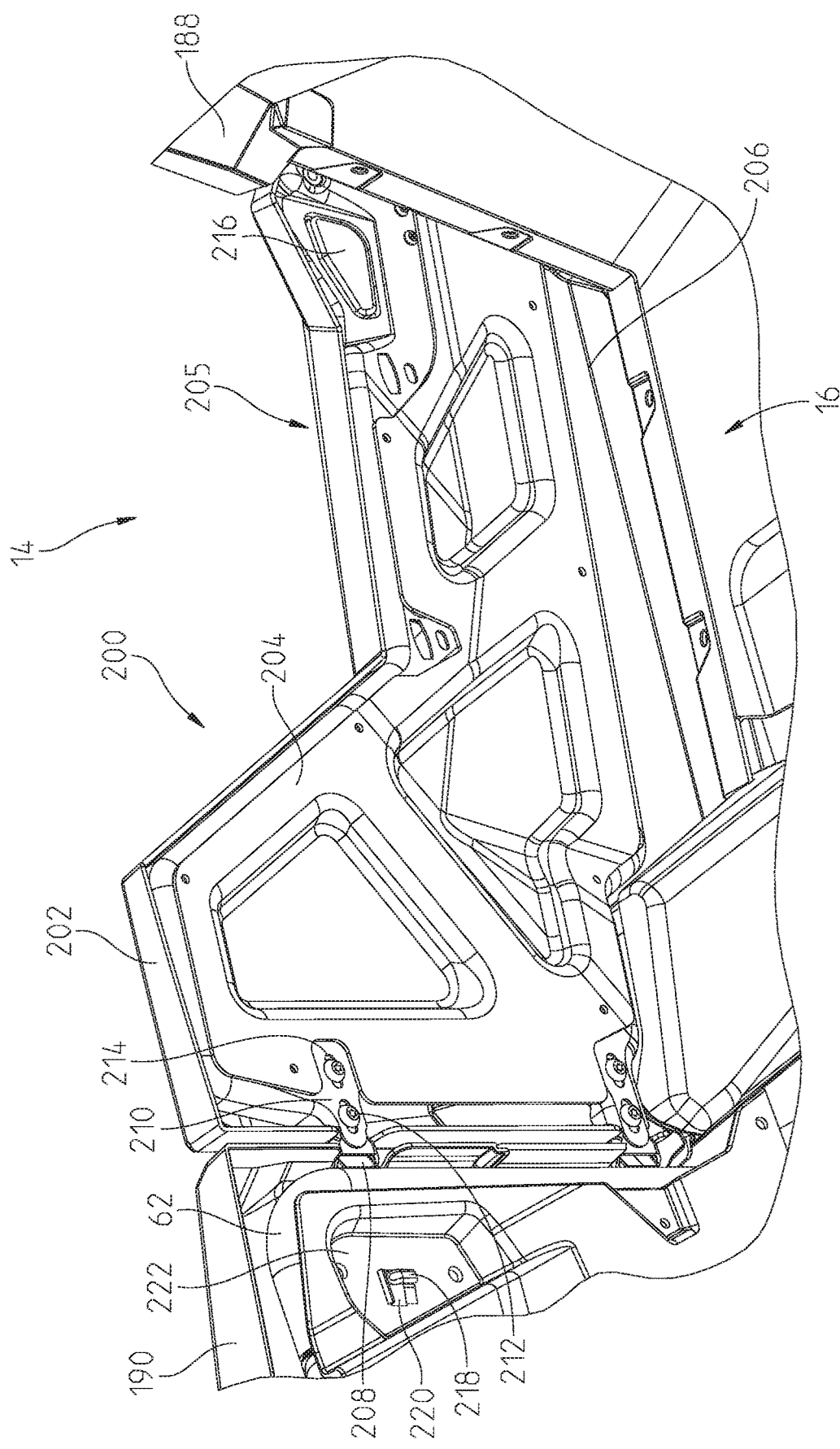
FIG. 20B is a right side view of the door assembly and body panels of FIG. 20A.
Figure 22:
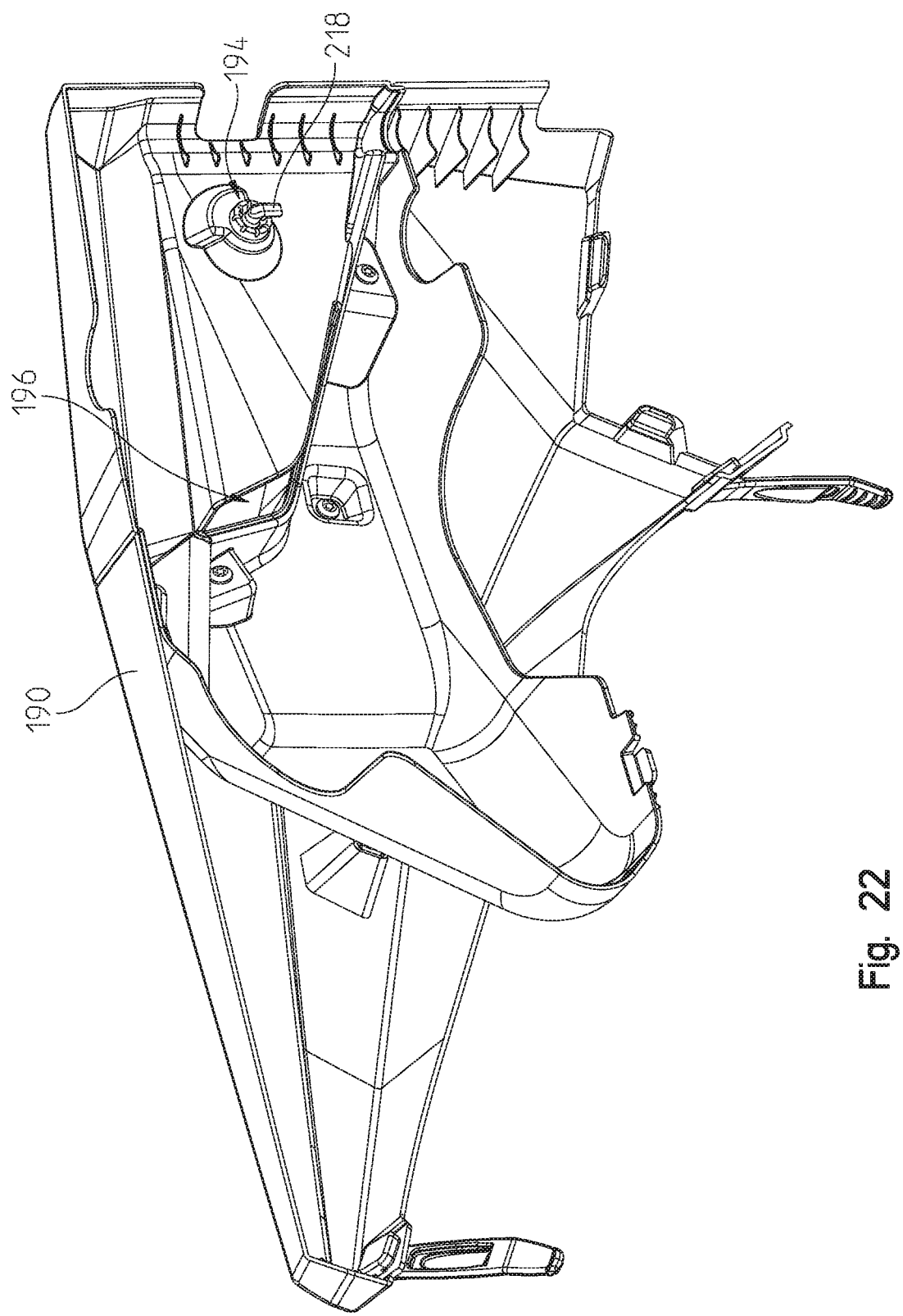
FIG. 22 is a right side view of an inner surface of the body panel of FIG. 21.

Illustratively, as shown in FIGS. 20B-22, fastener 194 includes a tab 218 (FIG. 22) which is configured to be received within an opening 220 on a bracket 222 coupled to upstanding members 52 of lower frame assembly 42. Tab 218 has an elongated configuration such that tab 218 is configured to be received through opening 220 when tab 218 is oriented in the direction of opening 220. Once tab 218 slides through opening 220, fastener 194 may be rotated approximately 90° to move tab to an orientation approximately perpendicular to the orientation of opening 220. In this way, tab 218 abuts a portion of bracket 222 and cannot move through opening 220, as shown in FIG. 20B. When tab 218 abuts a portion of bracket 222, fender 190 is coupled to vehicle 2 and cannot be removed therefrom. However, when fastener 190 is rotated approximately 90°, tab 218 aligns with opening 220 such that tab 218 is configured to move through opening 220, thereby allowing fender 190 to be removed from vehicle 2. It may be appreciated that fastener 194, including tab 218, remains on fender 190 even after fender 190 has been removed from vehicle 2. Fasteners 194 on both left side L and right side R of vehicle 2 are configured to operate as disclosed herein in order to couple and uncouple fender 190 from vehicle 2, thereby exposing or concealing portions of powertrain assembly 24, cooling assembly 26, air intake assembly 28, and/or any other component supported on rear end 6 of vehicle 2.

As shown in FIGS. 19-22, fenders 190 on both right side R and left side L each includes an opening 196 extending rearwardly from fastener 194. Opening 196 may allow air to flow into an air volume defined with portion of rear end 6 of vehicle, as disclosed further herein.

Referring still to FIGS. 20A-22, a door assembly 200 includes an outer door cover or panel 202 which is coupled to a door frame 204 (FIG. 20B). Door assembly 200 is positioned intermediate forward panel 188 and fender 190 on left side L of vehicle 2. As such, door assembly 200 is similar to body panel 186 on right side R of vehicle 2 but door panel 202 is not fixed to frame assembly 12 and, instead, is configured to move between an open position and a closed position to allow the operator to enter and exit vehicle 2. Door assembly 200 may extend downwardly toward a body panel 206 which extends generally continuously between forward panel 188 and fender 190 on left side L. Additionally, door panel 202 and door frame 204 also include a recessed portion 205 which increases the operator's line of sight when seated on seat bottom 20 (FIG. 1), as disclosed further herein.

To allow door assembly 200 to pivot between the open and closed positioned, door assembly 200 is hingedly coupled to bolster bar 62 (FIG. 20B) at hinges 208. Hinges 208 on bolster bar 62 are configured to couple with a bracket 210 using removable fasteners 212. More particularly, bracket 210 is coupled to door frame 204 and hinges 208 with fasteners 212 such that outer door panel 202 and door frame 204 pivot together about hinges 208. Bracket 210 includes elongated openings 214 which receive fasteners 212. Because openings 214 are elongated, the position of fasteners within openings 214 may be adjusted to adjust the position of door assembly 200 relative to forward panel 188 and/or fender 190. In this way, door assembly 200 is configured to be positioned between forward panel 188 and fender 190 such that left side L of vehicle 2 includes a continuous plurality of body panels. Door assembly 200 also includes a handle 216, as shown in FIG. 20B, which latches to frame tube 54 (FIG. 5) to maintain door assembly 200 in the closed position, for example, when the operator is driving vehicle 2 and/or when vehicle 2 is not in use.

Figure 3:
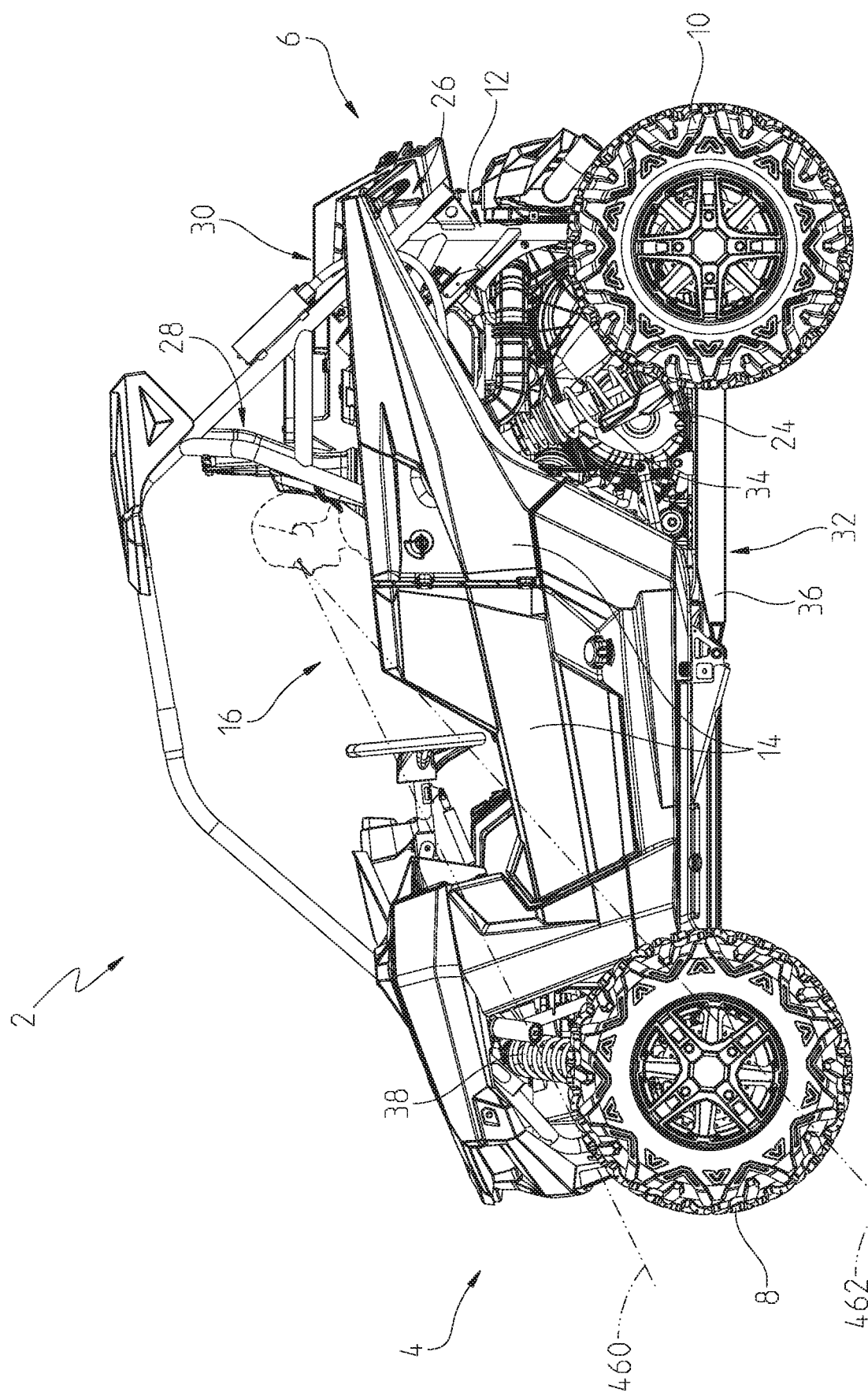
FIG. 3 is a left side view of the utility vehicle of FIG. 1.
Figure 4:
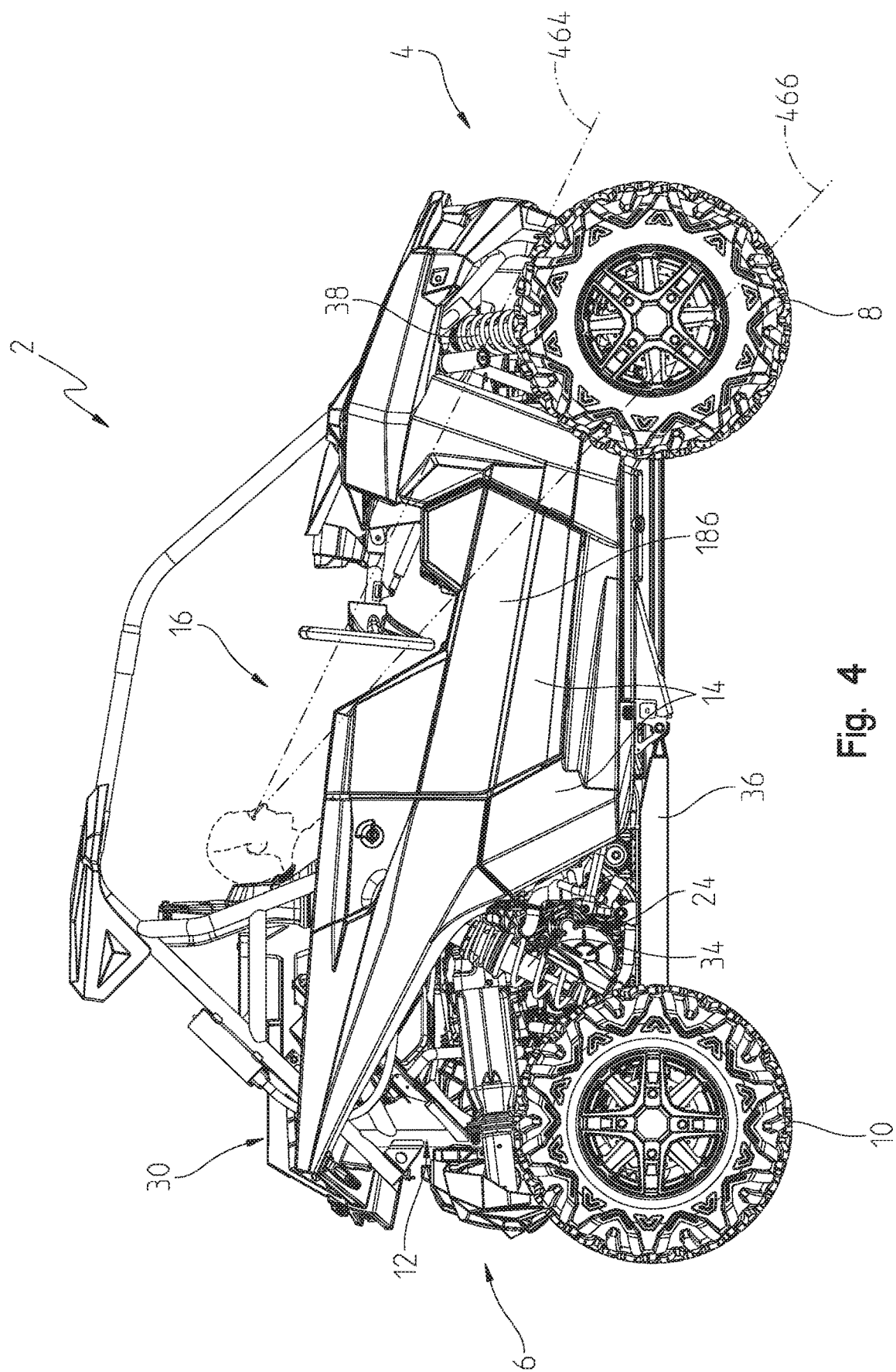
FIG. 4 is a right side view of the utility vehicle of FIG. 1.
Figure 23:
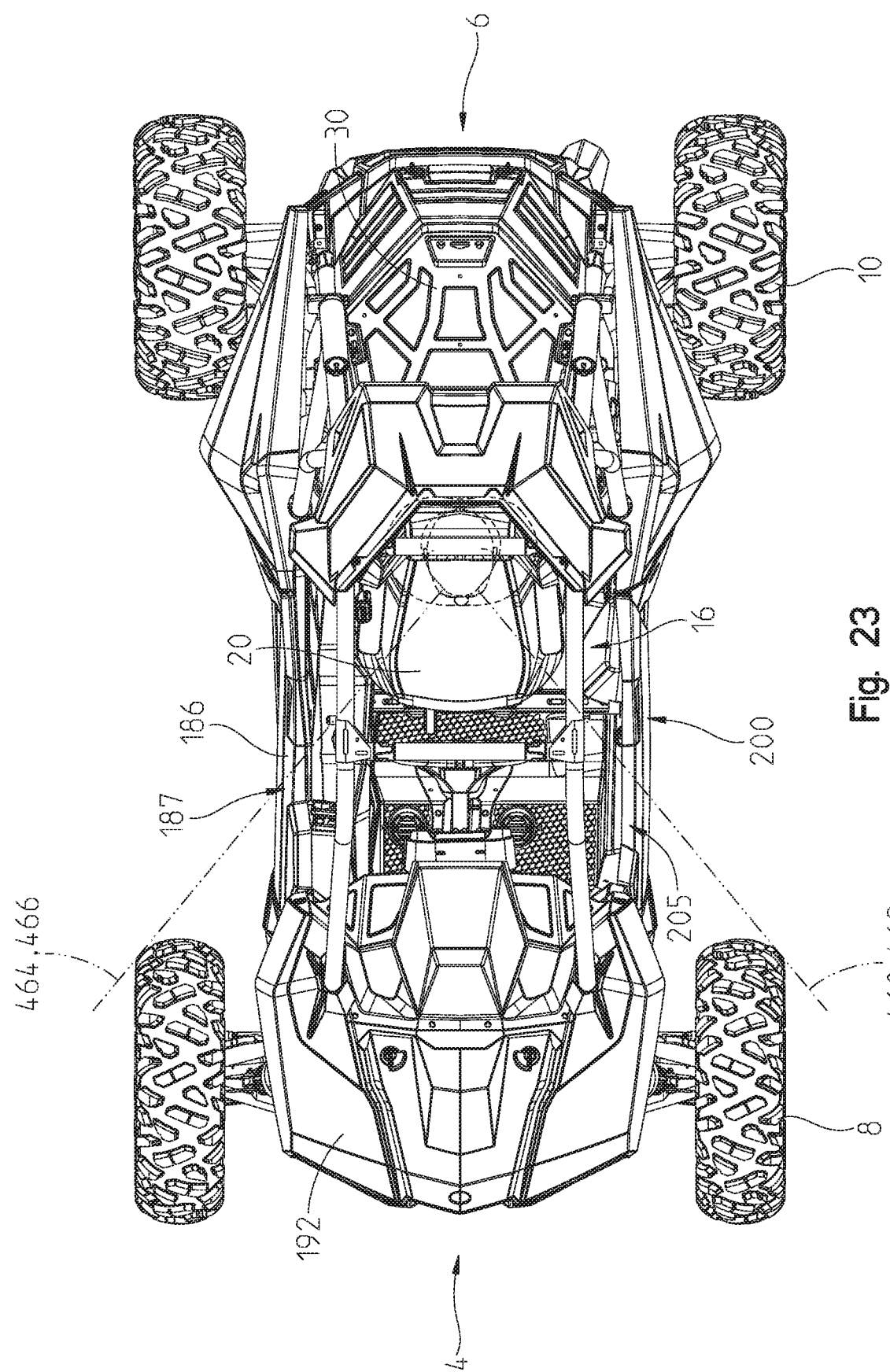
FIG. 23 is a top view of the vehicle of FIG. 1, illustrating sight lines of the operator when looking forward while seated in the operator area.
Figure 24:
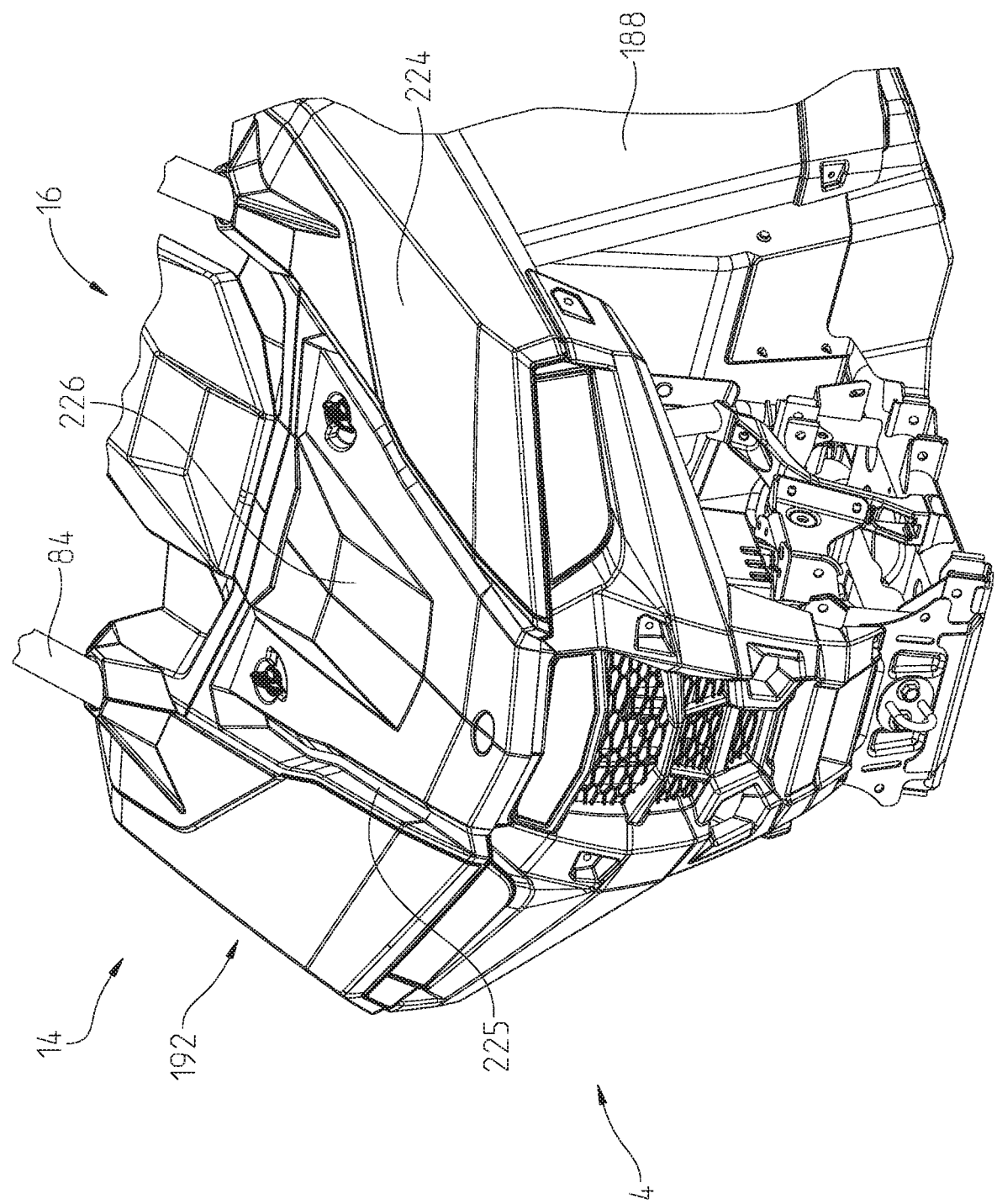
FIG. 24 is a front left perspective view of a hood assembly of the vehicle of FIG. 1.

Referring to FIG. 23, an operator's field-of-view ("FOV") when the operator is positioned on seating 18 in operator area 16 may be increased due to recessed portions 187, 205 of panel 186 and door assembly 200, respectively. More particularly, the FOV may be defined by sight lines 460, 462, 464, 466 (FIGS. 3, 4, and 23) of the operator when the operator is seated in operator area 16 and looking forward. As shown in FIGS. 3, 4, and 23, the width of front end 4 of vehicle 2 may be narrowed such that the width of body assembly 14 is less than the width of front wheels 8 which allows the operator to have a sight line 460 on left side L and a sight line 464 on right side R showing at least the upper surfaces of front wheels 8. Additionally, recessed portions 205, 187 of body assembly 14 allow the operator to have a sight line 462 on left side L and a sight line 466 on right side R, respectively, showing a rear surface and lower surface of front wheels 8. As such, the combination of the narrow width of front end 4 and recessed portions 187, 205 increases the operator's FOV when seated in operator area 16 to allow the operator to generally see the entirety of front wheels 8 which may assist the operator when vehicle 2 is traversing rocks, logs, or other such terrain.

Figure 25:
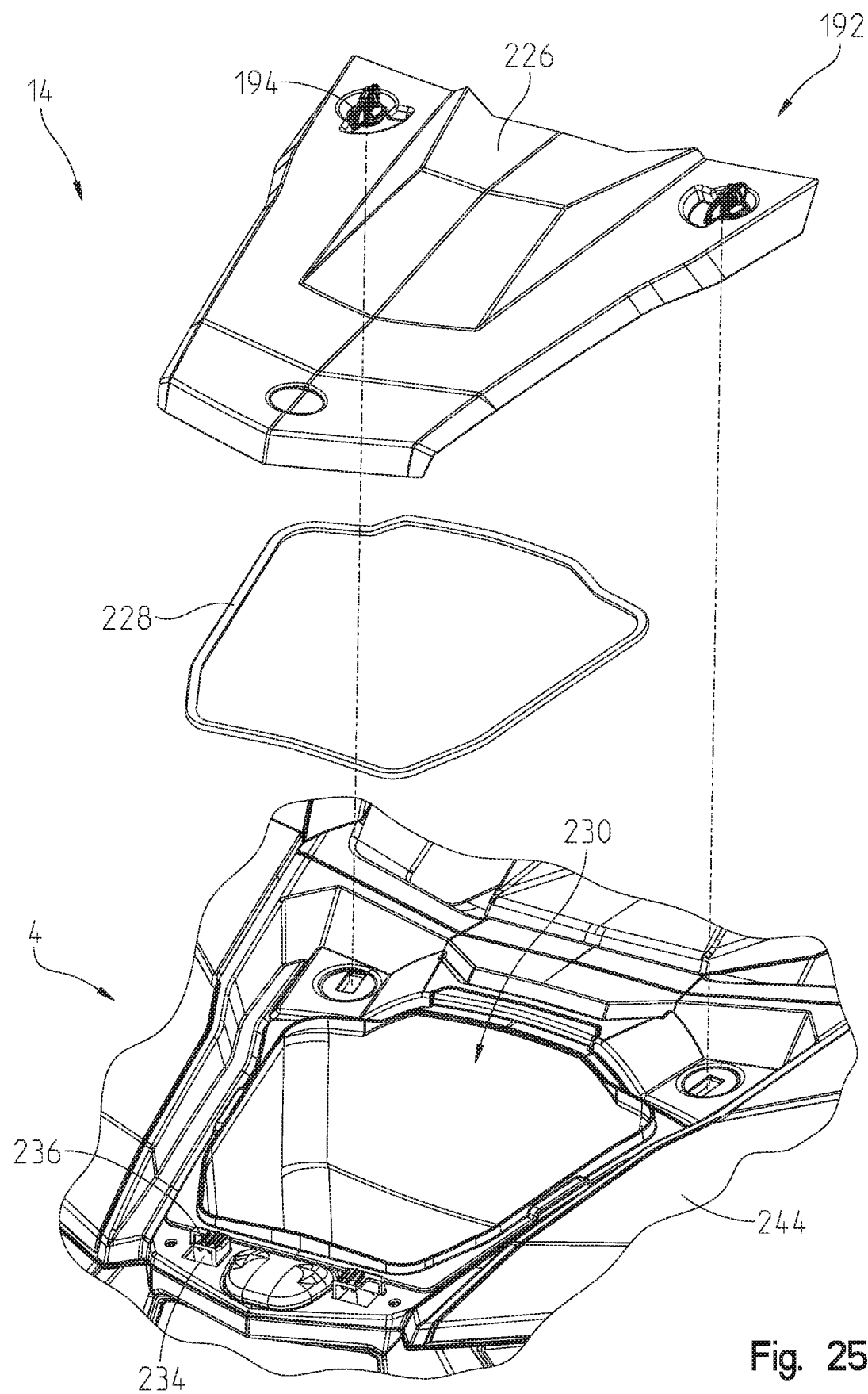
FIG. 25 is an exploded view of the hood assembly of FIG. 24.

Referring to FIGS. 24-27, body assembly 14 further includes hood assembly 192. Hood assembly 192 includes side panels 224 and a removable center panel 226. Center panel 226 is approximately centered on longitudinal axis L (FIG. 7) and is positioned intermediate side panels 224. Side panels 224 are configured to remain coupled to frame assembly 12, however, center panel 226 is configured to be removed from vehicle 2 to access various components of vehicle 2. More particularly, center panel 226 includes fasteners 194 as defined herein to removably couple and uncouple center panel 226 from body assembly 14 by rotating fasteners 194 approximately 90°. Additionally, the underside of center panel 226 includes tabs 232, as shown in FIG. 26, which are received within openings 234 of latches 236 on body assembly 14, as shown in FIG. 25. In this way, center panel 226 is removably coupled to body assembly 14 with fasteners 194, tabs 232, and latches 236.

Figure 27:
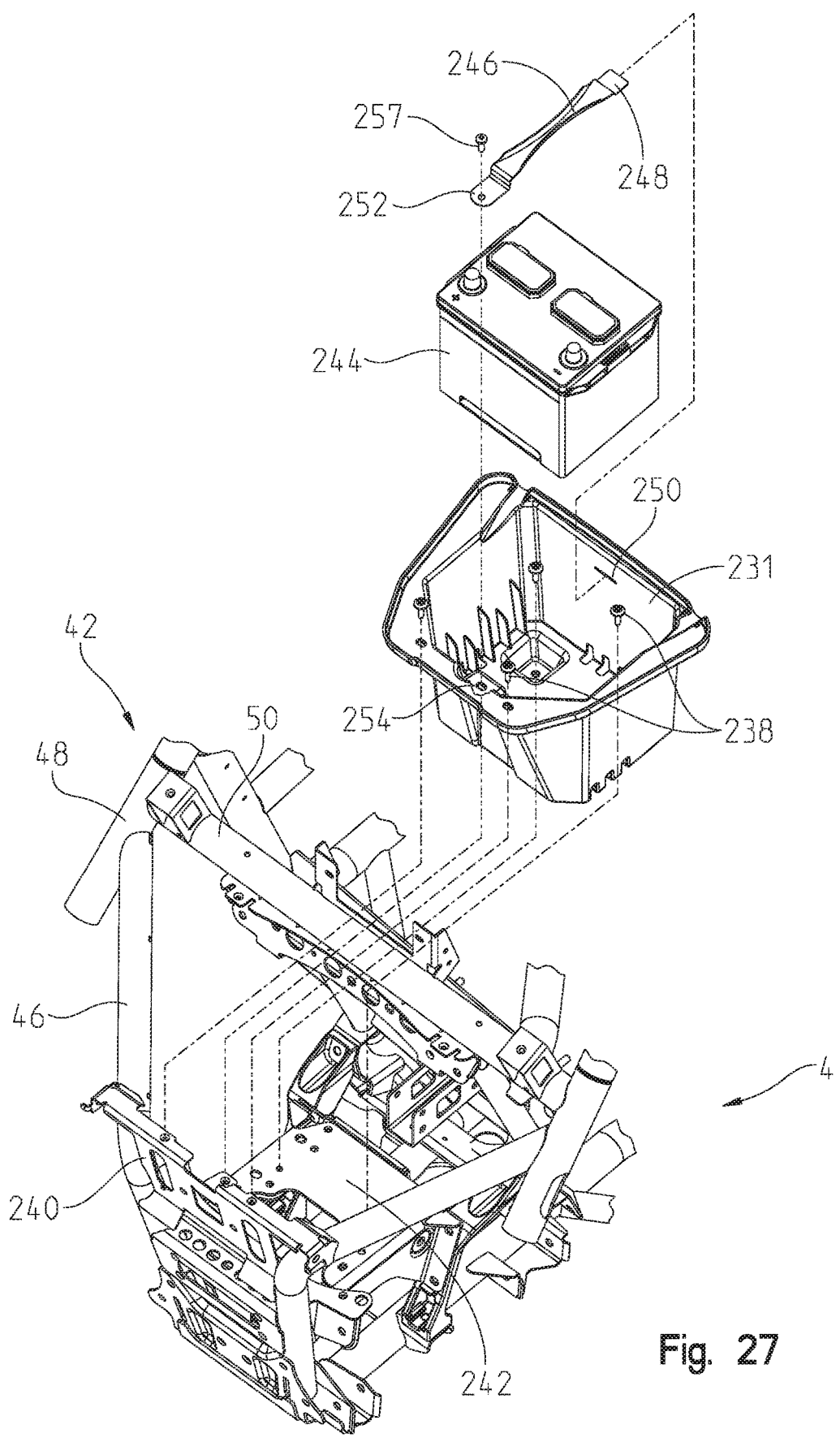
FIG. 27 is an exploded view of a housing supported on a portion of the lower frame assembly and below a portion of the hood assembly of FIG. 24, and the housing is configured to support a battery.

Body assembly 14 further includes a storage container or volume 230 below center panel 226 which is configured to support various components of vehicle 2 and/or cargo. Center panel 226 is sealingly coupled to body assembly 14 with a gasket or seal 228 positioned below center panel 226 which generally prevents fluids or dirt and debris from entering storage container 230. In this way, storage container 230 is a "dry" storage area on vehicle 2. Additionally, hood assembly 192 includes run-off channels 225 which flow water and debris downwardly and off of hood assembly 192 and away from storage container 230. As shown in FIG. 27, storage container 230 is coupled to lower frame assembly 42 with fasteners 238. More particularly, storage container is coupled to a bracket 240 on first upstanding members 46 and a support member 242 extending rearwardly from first upstanding members 46.

In one embodiment, as shown in FIG. 27, storage container 230 may be removed to expose a housing 231 configured to support a battery 244 of vehicle 2. Illustratively, housing 231 and battery 244 are positioned below storage container 230 and at front end 4 of vehicle 2. A removable latch or strap 246 may be positioned over an upper surface of battery 244 to retain battery 244 in housing 231. Illustratively, a rear end 248 of latch 246 may be inserted into a slot 250 of housing 231 and a front end 252 of latch 236 may be coupled to a protrusion 254 on housing 231 with a fastener 257. In this way, battery 244 is supported at front end 4 of vehicle 2, rather than within operator area 16, and may be in a position where a cooling assembly, including a radiator, would be positioned on other vehicles.

Figure 28:
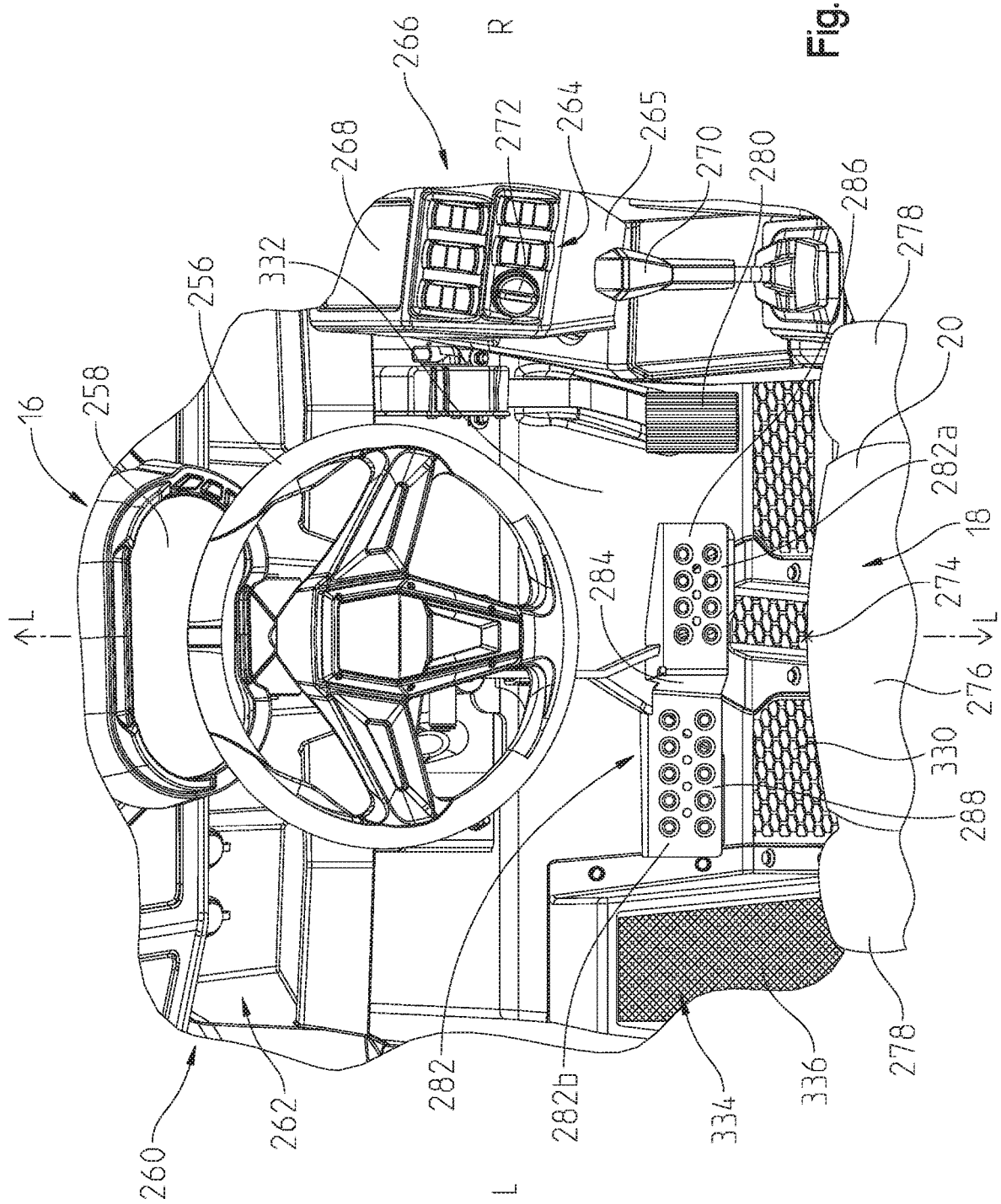
FIG. 28 is a front view of a portion of an operator area including a brake pedal, a throttle pedal, a steering wheel, and a plurality of operator inputs accessible to the operator when seated in the operator area.
Figure 29:
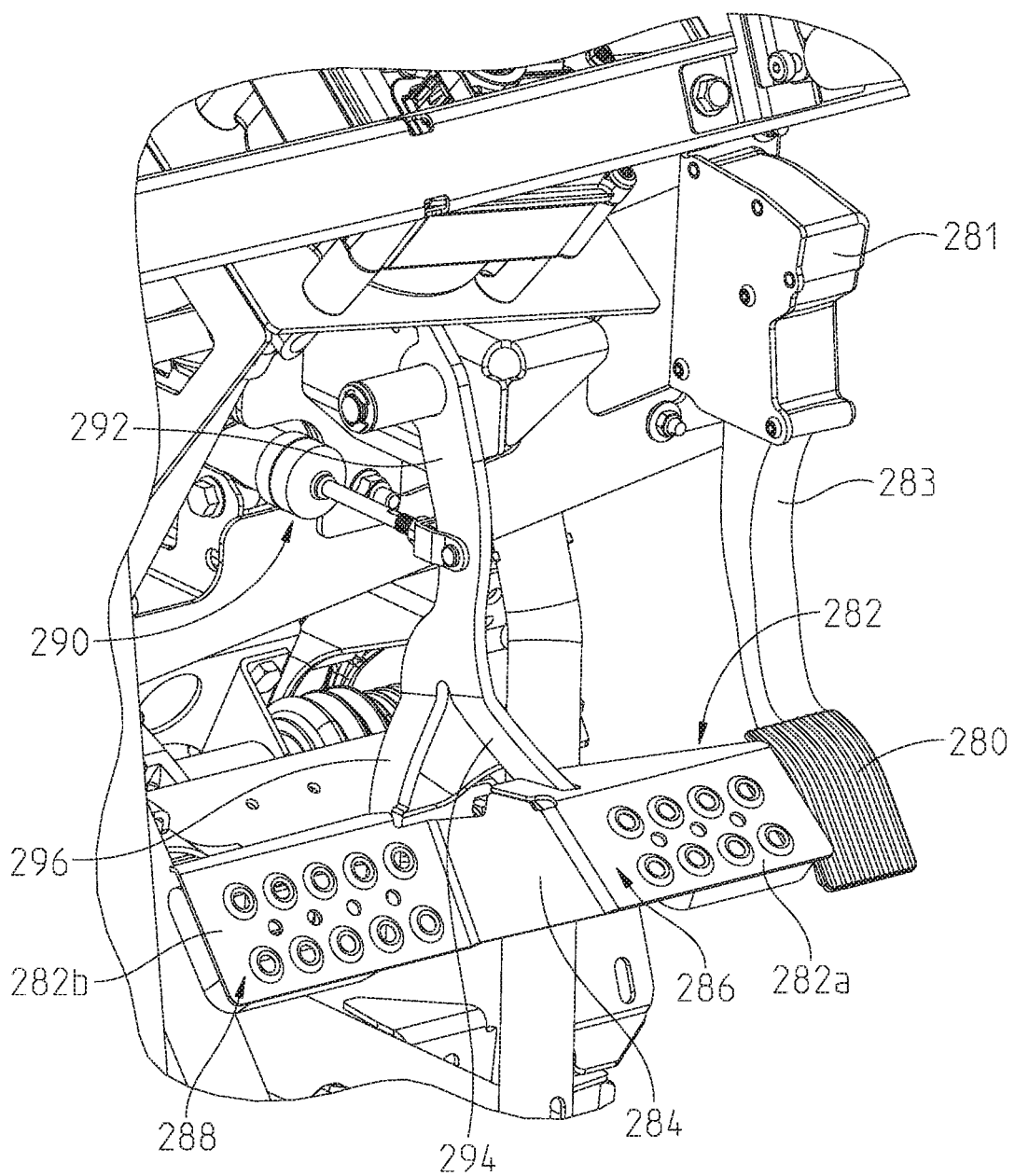
FIG. 29 is a rear left perspective view of the brake pedal and the throttle pedal of FIG. 28.

Referring to FIG. 28, operator area 16 includes seating 18 positioned rearward of a steering assembly, including a steering wheel 256. Steering wheel 256 is positioned rearward of a gauge or display 258 configured to display vehicle parameters to the operator, such as vehicle speed, fuel level, a drive mode, etc. Display 258 and steering wheel 256 are supported on a dashboard assembly 260 which may include one or more storage areas 262.

Additionally, operator area 16 may include a control panel 264 with a plurality of operator inputs 266, illustratively five operator inputs 266 but also could include less than or more than five inputs 266. Alternatively, operator inputs 266 may be positioned on panel 265 positioned immediately forward of a shifter 270. Operator inputs 266 are positioned on one side of longitudinal axis L of vehicle 2 and, illustratively, are positioned on right side R of vehicle 2 because panel 186 is fixed to frame assembly 12 such that the operator may choose to enter/exit vehicle 2 at left side L, rather than on right side R. Because right side R is fixed and the operator is likely to choose to enter and exit vehicle 2 at left side L, various components within operator area 16, such as operator inputs 266, may be positioned on right side R without interfering with the operator's ability to enter and exit vehicle 2. Operator inputs 266 may include push buttons, toggle switches, or any other member which receives an input from the operator to control operation of vehicle 2. For example, operator inputs 266 may include an input for a drive mode (e.g., 4WD or 2WD), an input to turn on/off the vehicle lights, including high beam lights, low beam lights, and accessory light bars, an input to control a winch (not shown) or other accessories of vehicle 2, wireless or Bluetooth® controls, an input for controlling a stereo or infotainment system of vehicle 2, and any other input to control operation and/or various components of vehicle 2.

Additionally, a second display or gauge 268 may be positioned adjacent operator inputs 266 to display additional information about vehicle 2. Illustratively, gauge 268 also is positioned on right side R of vehicle 2. In one embodiment, gauge 268 may be configured to wirelessly connect with the operator's phone (e.g., via a Bluetooth or cellular network) to display call, text, mapping, or other data from the phone on gauge 268. Additional details of display 258 and/or gauge 268 may be disclosed in U.S. Pat. No. 9,324,195, issued on Apr. 26, 2016; U.S. Patent Application Publication No. 2016/0003621, filed on Aug. 25, 2015; U.S. patent application Ser. No. 15/161,720, filed May 23, 2016; and U.S. Patent Application Publication No. 2016/0332676, filed May 13, 2016, the complete disclosures of which are expressly incorporated by reference herein.

Also positioned adjacent operator inputs 266 on right side R of vehicle 2 is shifter 270 which is operably coupled to a portion of powertrain assembly 24 to provide an input of the selected driving gear. An ignition input 272 also may be positioned on right side R and may include a push button, a key, or any other input to start operation of vehicle 2. In this way, operator inputs 266, gauge 268, shifter 270, and ignition input 272 may be concentrated on right side R of vehicle 2 to allow the operator to easily access these inputs while seated on seat bottom 20. More particularly, operator inputs 266, gauge 268, shifter 270, and ignition input 272 may be positioned generally rearward of steering wheel 256 or laterally adjacent steering wheel 256, thereby moving operator inputs 266, gauge 268, shifter 270, and ignition input 272 closer to the operator. For example, in one embodiment, operator inputs 266, gauge 268, shifter 270, and ignition input 272 may be positioned approximately 10-22 inches from a forwardmost end 274 of seat bottom 20. Illustratively, operator inputs 266, gauge 268, shifter 270, and ignition input 272 may be positioned approximately 11.5-20 inches from forwardmost end 274 of seat bottom 20. In this way, when the operator is seated on seat bottom 20 and, even when wearing a seat belt or harness, the operator can still easily access operator inputs 266, gauge 268, shifter 270, and ignition input 272.

As shown in FIG. 28, forwardmost end 274 of seat bottom 20 is aligned with longitudinal axis L such that a center portion 276 of seat bottom 20 is positioned along longitudinal axis L while side portions 278 of seat bottom 20 are positioned laterally outward of longitudinal axis L.

Figure 30:
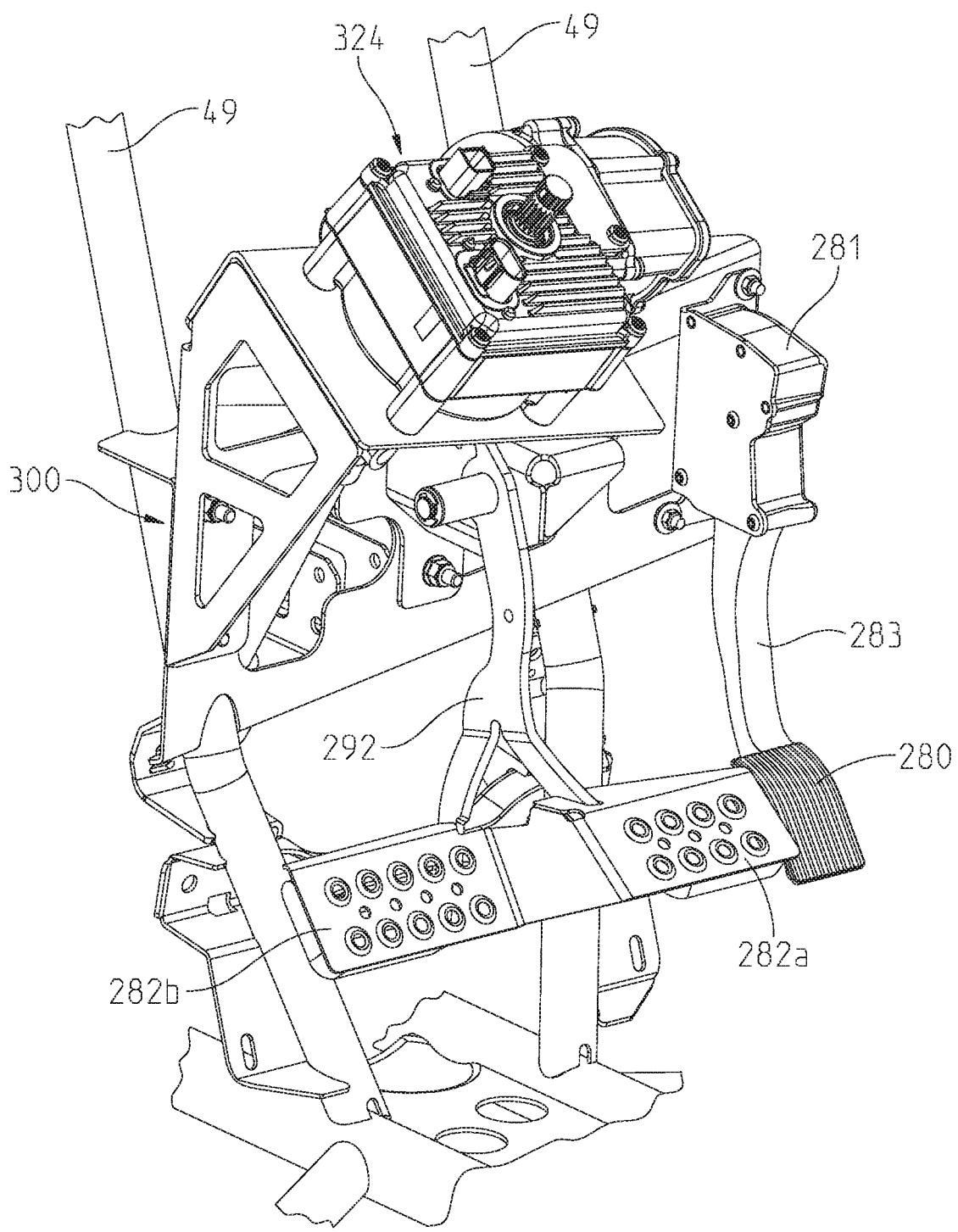
FIG. 30 is a further rear left perspective view of the brake pedal and the throttle pedal of FIG. 29 coupled to a bracket on the lower frame assembly of FIG. 5, and the bracket supports an electric power steering unit.

As shown in FIGS. 28-31, operator area 16 further includes operator inputs such as a throttle pedal 280 and a brake pedal 282 to control acceleration and braking of vehicle 2. Throttle pedal 280 is positioned to the right of longitudinal axis L and, in some embodiments, may be operably coupled to an electronic throttle control unit 281 through a lever arm 283. As shown in FIG. 30.

Referring still to FIGS. 28-31, brake pedal 282 is positioned to the left of throttle pedal 280 and is generally positioned under a portion of steering wheel 256. Brake pedal includes a first portion 282a and a second portion 282b. First portion 282a is positioned adjacent throttle pedal 280 and at least partially aligns with longitudinal axis L and forwardmost end 274 of seat bottom 20. Additionally, first portion 282a is at least partially positioned under a center point of steering wheel 256. The position of first portion 282a is configured to receive the operator's right foot, such that if the operator drives with only his/her right foot, the operator's right foot can easily move between throttle pedal 280 and first portion 282a of brake pedal 282.

Second portion 282b of brake pedal 282 is spaced apart from throttle pedal 280 by first portion 282a of brake pedal 282. Illustratively, second portion 282b is positioned forward of side portion 278 of seat bottom 20. Additionally, second portion 282b is spaced apart from first portion 282a by a wall 284 which extends generally rearwardly and/or diagonally from second portion 282b to first portion 282a. In this way, a foot surface 286 of first portion 282a is longitudinally rearward of a foot surface 288 of second portion 282b. As shown in FIG. 28, second portion 282b is positioned laterally outward from the center point of steering wheel 256, longitudinal axis L, and forwardmost end 274 of seat bottom 20. Second portion 282b is configured to receive the operator's left foot, such that if the operator drives with both his/her right foot and left foot, the operator can maintain his/her right foot proximate throttle pedal 280 when his/her left foot contacts second portion 282b of brake pedal 282. In this way, the operator does not need to fully remove his/her foot from throttle pedal 280 in order to access brake pedal 282.

Figure 31:
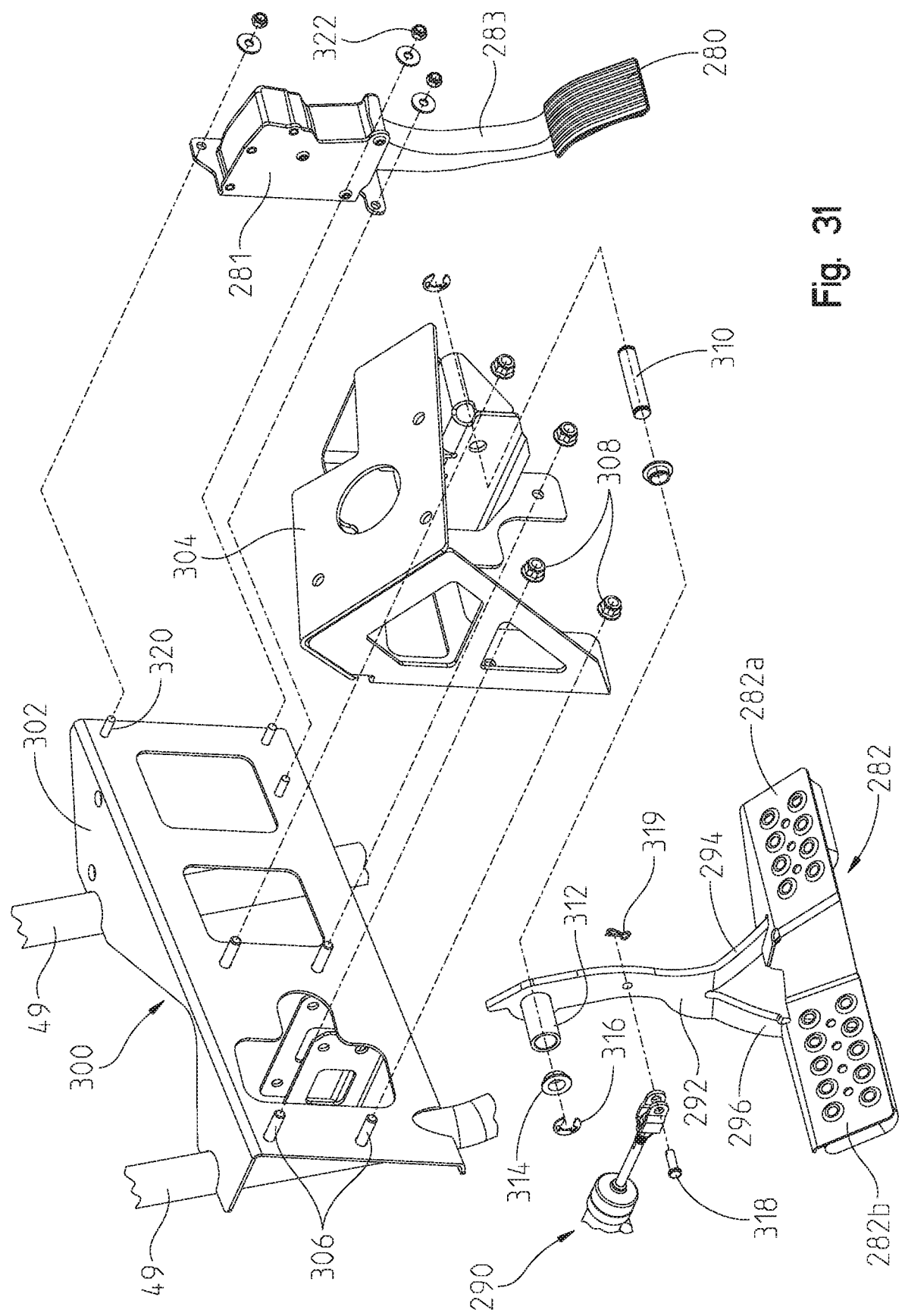
FIG. 31 is an exploded view of the brake pedal, throttle pedal, and bracket of FIG. 30.
Figure 32:
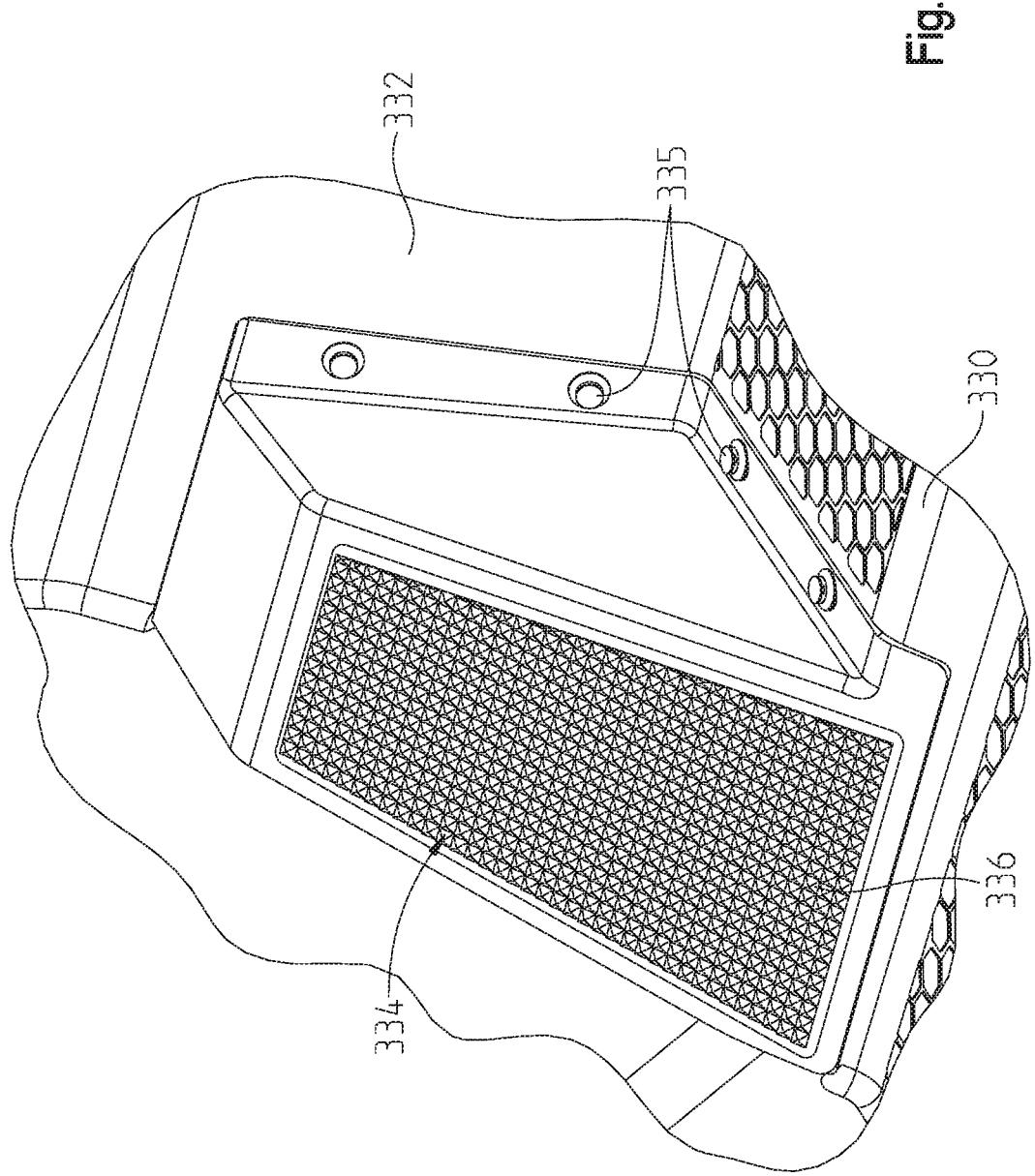
FIG. 32 is a rear right perspective view of a foot rest positioned within the operator area.

Brake pedal 282 is coupled to a brake master cylinder 290 through a lever arm 292 which extends into a first arm 294 coupled to first portion 282a of brake pedal 282 and a second arm 296 coupled to second portion 282b of brake pedal 282. More particularly, as shown in FIG. 31, brake master cylinder 290 is coupled to lever arm 292 with a pin 318 and spring clip or other fastener 319.

Brake master cylinder 290, brake pedal 282, and throttle pedal 280 are supported on a mounting bracket assembly 300 coupled to upstanding frame members 49. As shown in FIG. 31, mounting bracket assembly 300 includes a first bracket 302 directly coupled to upstanding frame members 49 and a second bracket 304 which is removably coupled to first bracket 302 with fasteners 306, 308. Lever arm 292 of brake pedal 282 is coupled to second bracket 304 with a pin 310 which is received within a mounting boss 312 on lever arm 292. Pin 310 is configured to rotate within mounting boss 312 to allow rotational movement of lever arm 292 when the operator depresses brake pedal 282. Additionally, washers 314 and C-clips 316 maintain pin 310 within mounting boss 312. In addition to supporting brake pedal 282, second bracket 304 also supports an electric power steering unit 324 which is operably coupled to steering wheel 256 (FIG. 28) to facilitate the rotation of steering wheel 256 when the operator is turning vehicle 2. As is also shown in FIG. 31, throttle pedal 280 is coupled to first bracket 302 with fasteners 320, 322.

Figure 33:
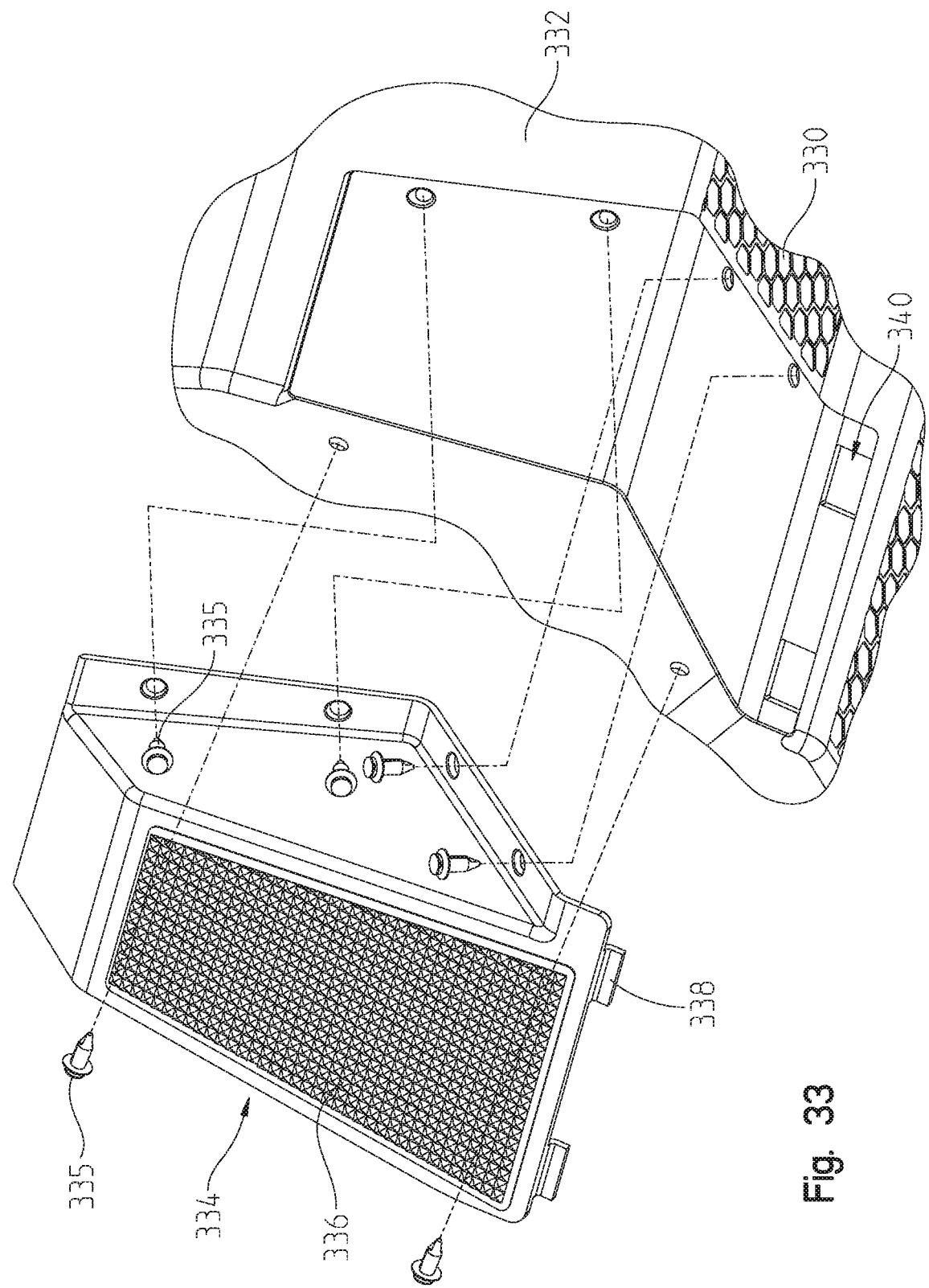
FIG. 33 is an exploded view of the foot rest of FIG. 32 coupled to a floorboard assembly and a front wall of the body assembly.
Figure 34:
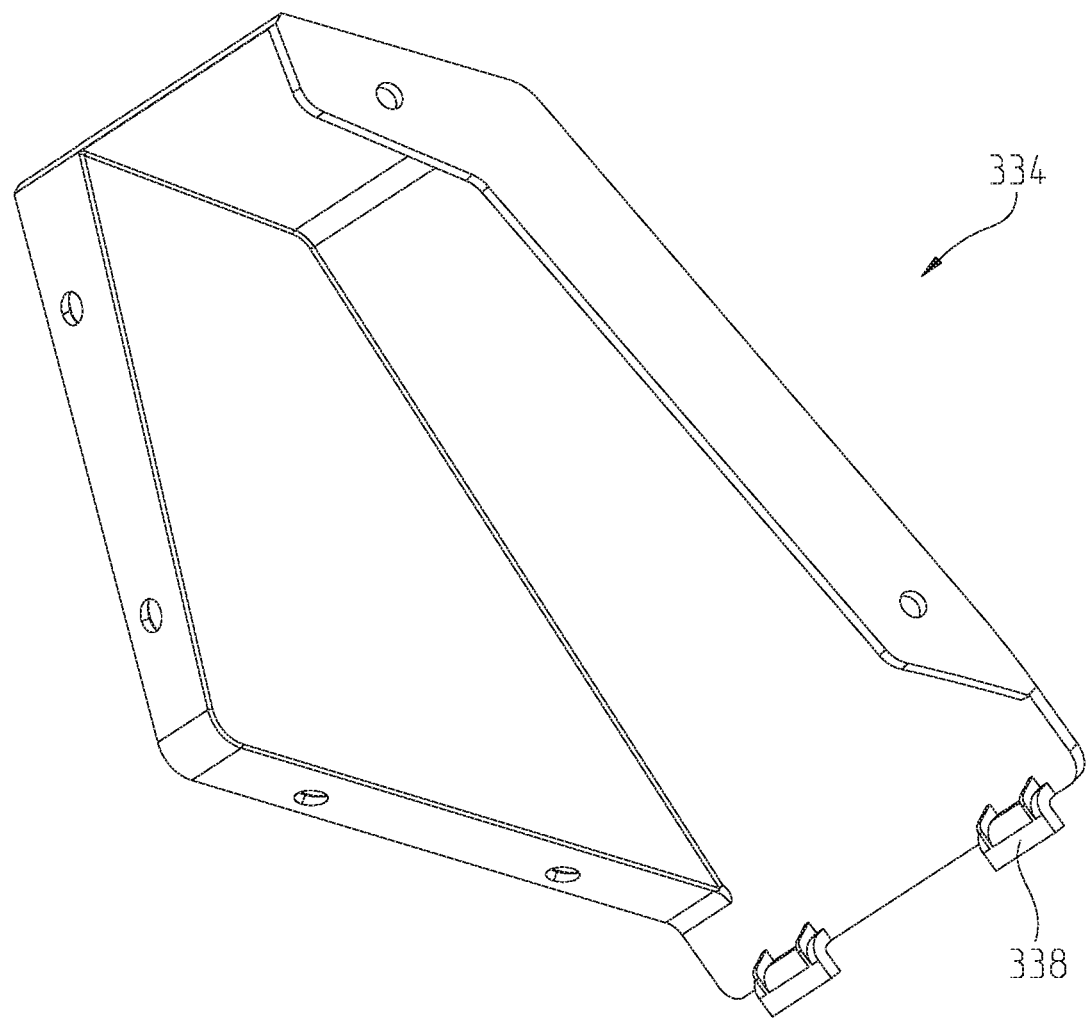
FIG. 34 is a front left perspective view of an underside of the foot rest of FIG. 33.

Referring to FIGS. 28 and 32-34, within operator area 16, body assembly 14 further includes a floorboard assembly 330 which is coupled at a front end to a front upstanding wall panel 332. Alternatively, floorboard assembly 330 may be integrally formed with wall panel 332. A foot rest 334 is removably coupled to both floorboard assembly 330 and front upstanding wall panel 332 with fasteners 335. Additionally, as shown in FIGS. 33 and 34, foot rest 334 also includes tabs 338 extending downwardly therefrom which are received within openings 340 of floorboard assembly 330 to further couple foot rest 334 to floorboard assembly 330. In this way, because foot rest 334 is not molded to floorboard assembly 330 or wall panel 332, foot rest 334 can be adjusted or replaced with a different foot rest configuration to accommodate the preferences and best ergonomics for the operator.

Foot rest 334 is positioned laterally outward from brake pedal 282. Illustratively, foot rest 334 is positioned on left side L of vehicle 2 and is spaced apart from longitudinal axis L. Foot rest 334 includes a foot surface 336 on which the operator may rest his/her left foot during operation of vehicle 2. Foot surface 336 of foot rest 334 is generally laterally aligned with foot surface 288 of second portion 282b of brake pedal 282 such that foot surfaces 288, 336 are positioned in the same vertically extending plane. In this way, the operator can easily move his/her left foot between second portion 282b of brake pedal 282 and foot rest 334 when operating vehicle 2 with both feet. Illustratively, a lateral distance between foot rest 334 and second portion 282b is less than a lateral distance between throttle pedal 280 and second portion 282b. In this way, it is easy for the operator to access second portion 282b after resting his/her left foot on foot rest 334 than to move his/her right foot from throttle pedal 280 to second portion 282b, thereby naturally defining second portion 282b for the operator's left foot, if the operator drives with both foot, and naturally defining first portion 282a for the operator's right foot, if the operator drives with only the right foot. If the operator uses only his/her right foot to operator vehicle 2, the left foot can remain on foot rest 334 at all times for a comfortable position when seated in operator area 16. Additionally, foot surface 336 of foot rest 334 may be laterally aligned with throttle pedal 280 such that foot rest 334 and throttle pedal 280 are positioned in the same vertically extending plane.

Figure 35:
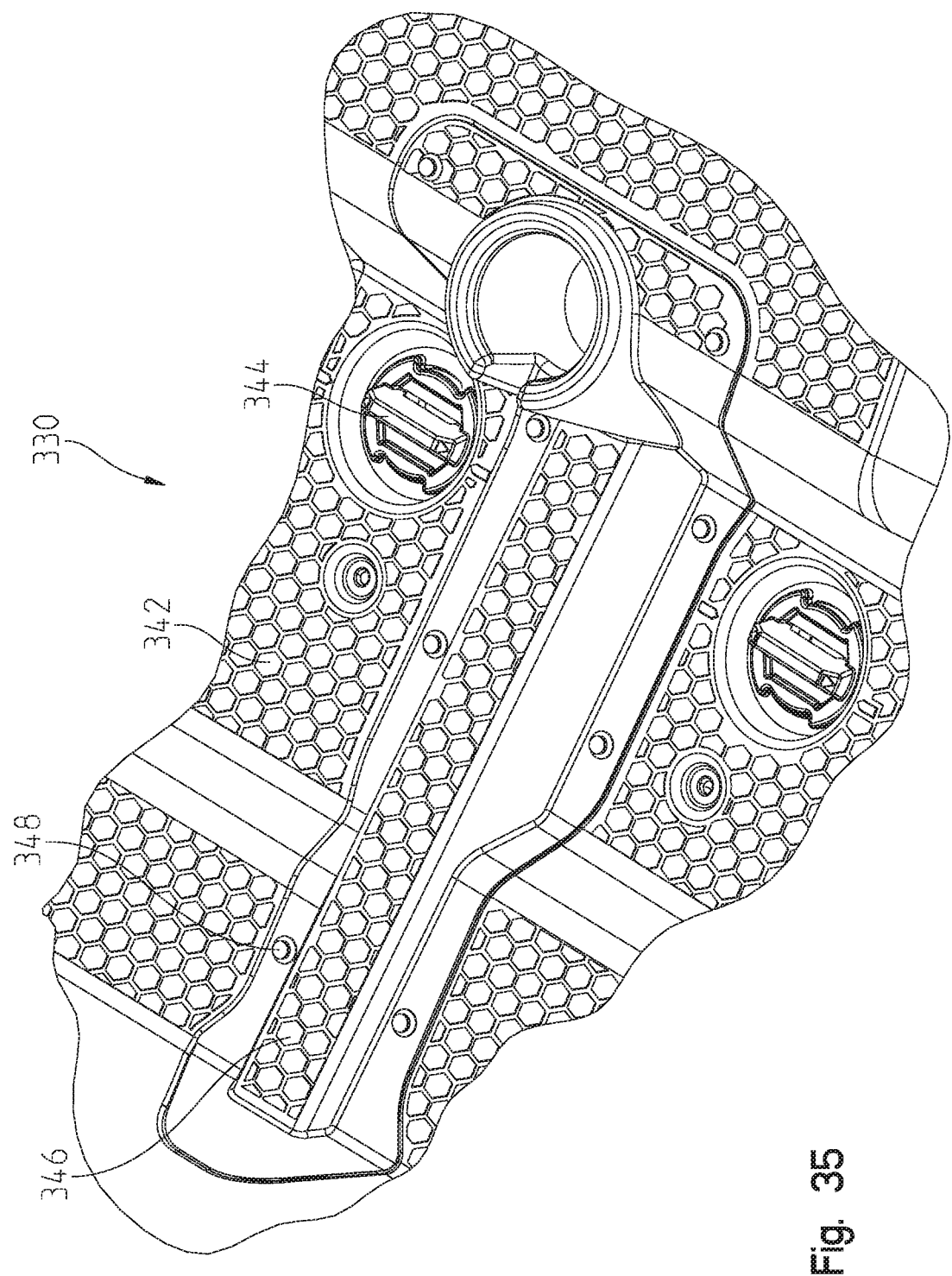
FIG. 35 is a rear left perspective view of a portion of the floorboard assembly of FIG. 33 including a drain.
Figure 36:
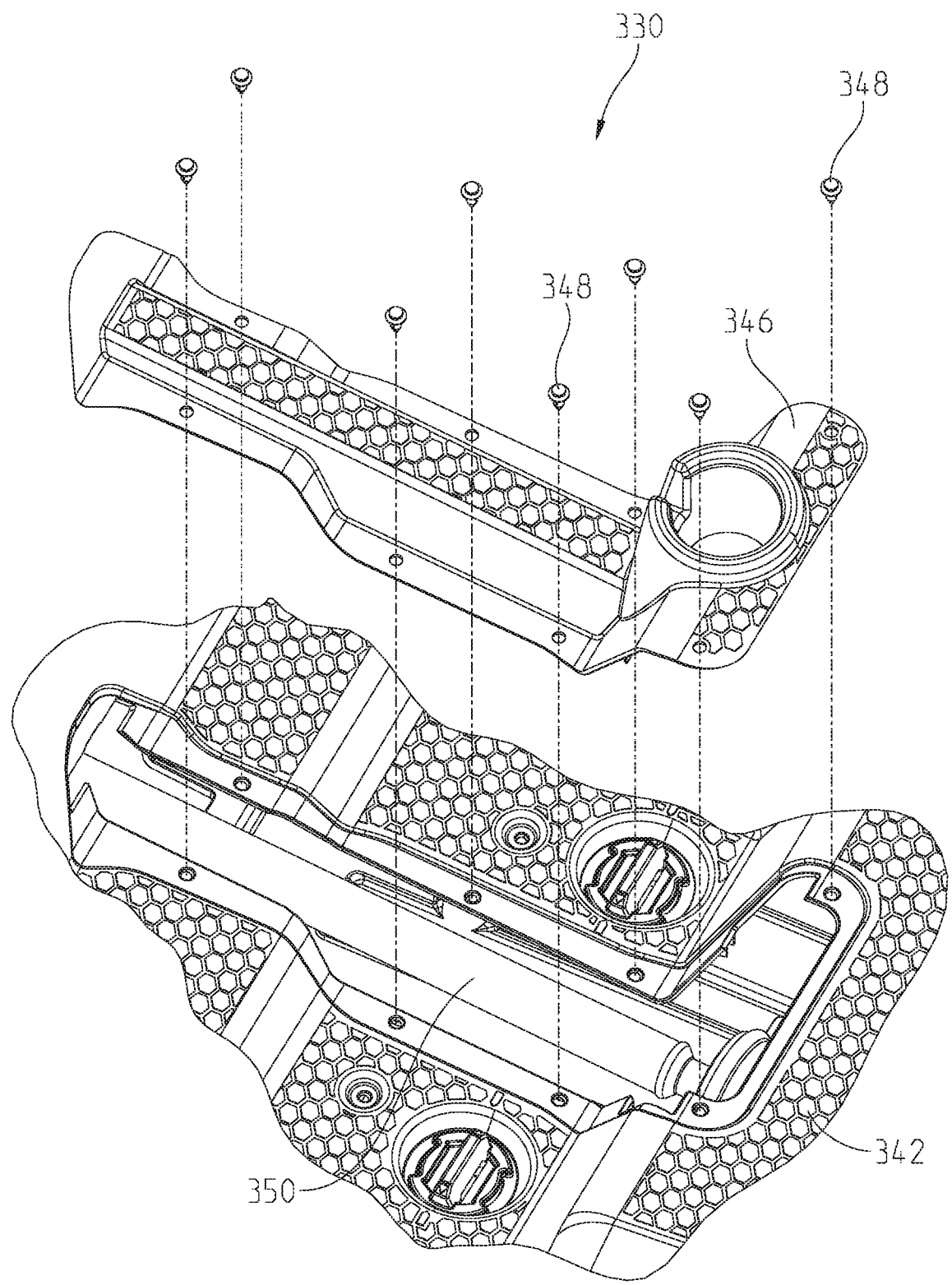
FIG. 36 is an exploded view of the portion of the floorboard assembly of FIG. 35.

As shown FIGS. 35 and 36, floorboard assembly 330 includes a main portion 342 extending generally between right side R and left side L of vehicle 2 and extending from wall panel 332 to seating 18 (FIG. 28). Main portion 342 may include drain caps 344 which can be removed from floorboard assembly 330 to allow fluids and debris within operator area 16 to be removed. Additionally, floorboard assembly 330 includes a center portion 346 which extends generally along longitudinal axis L (FIG. 28) and is removably coupled to main portion 342 with fasteners 348. When center portion 346 is removed from main portion 342, a portion of powertrain assembly 24, more particularly, a drive shaft 350, is exposed. In this way, center portion 346 of floorboard assembly 330 may be removed to service or otherwise access drive shaft 350.

Figure 37:
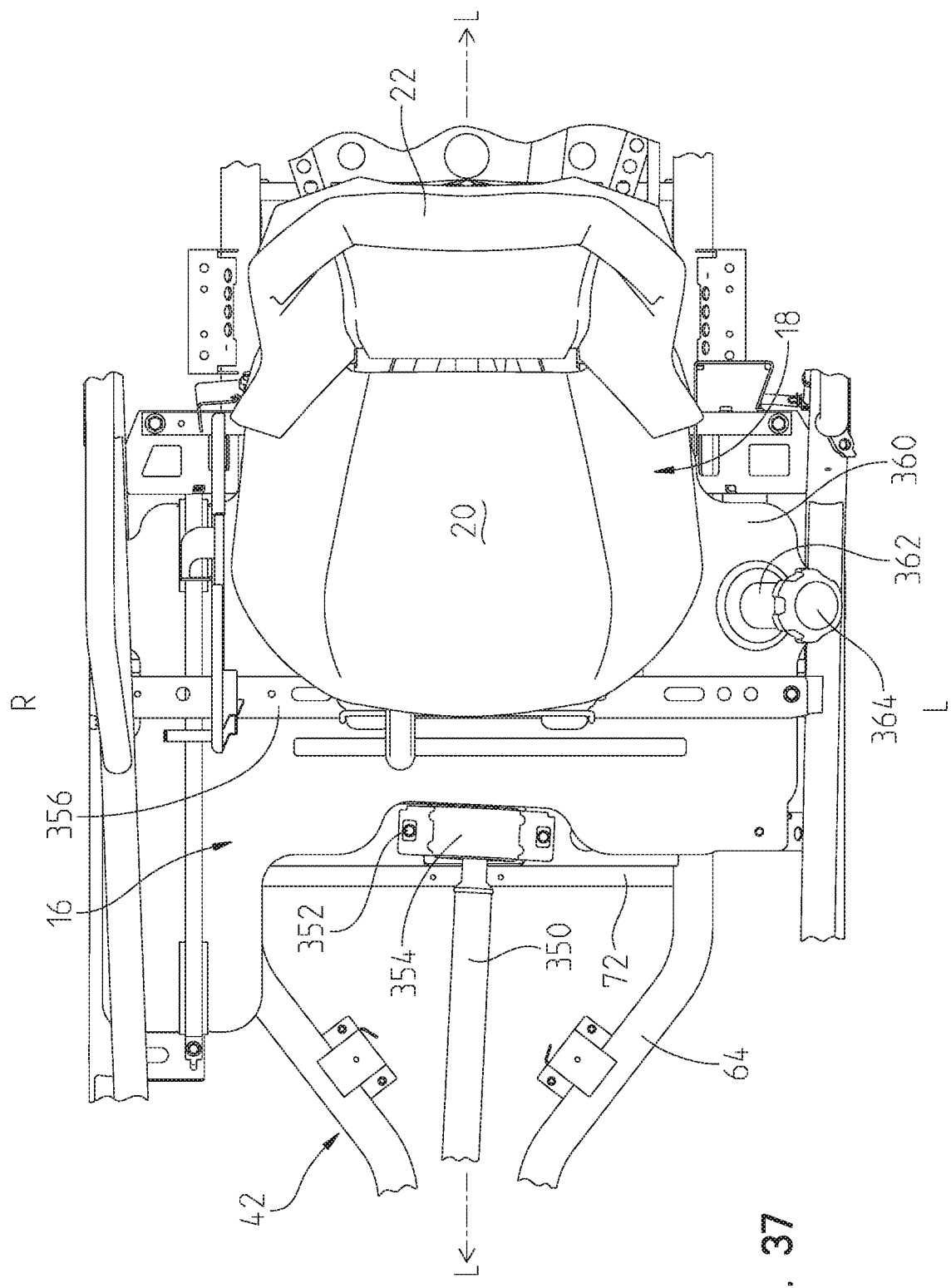
FIG. 37 is a top view of the lower frame assembly supporting an operator seat and a fuel tank positioned below the operator seat.
Figure 38:
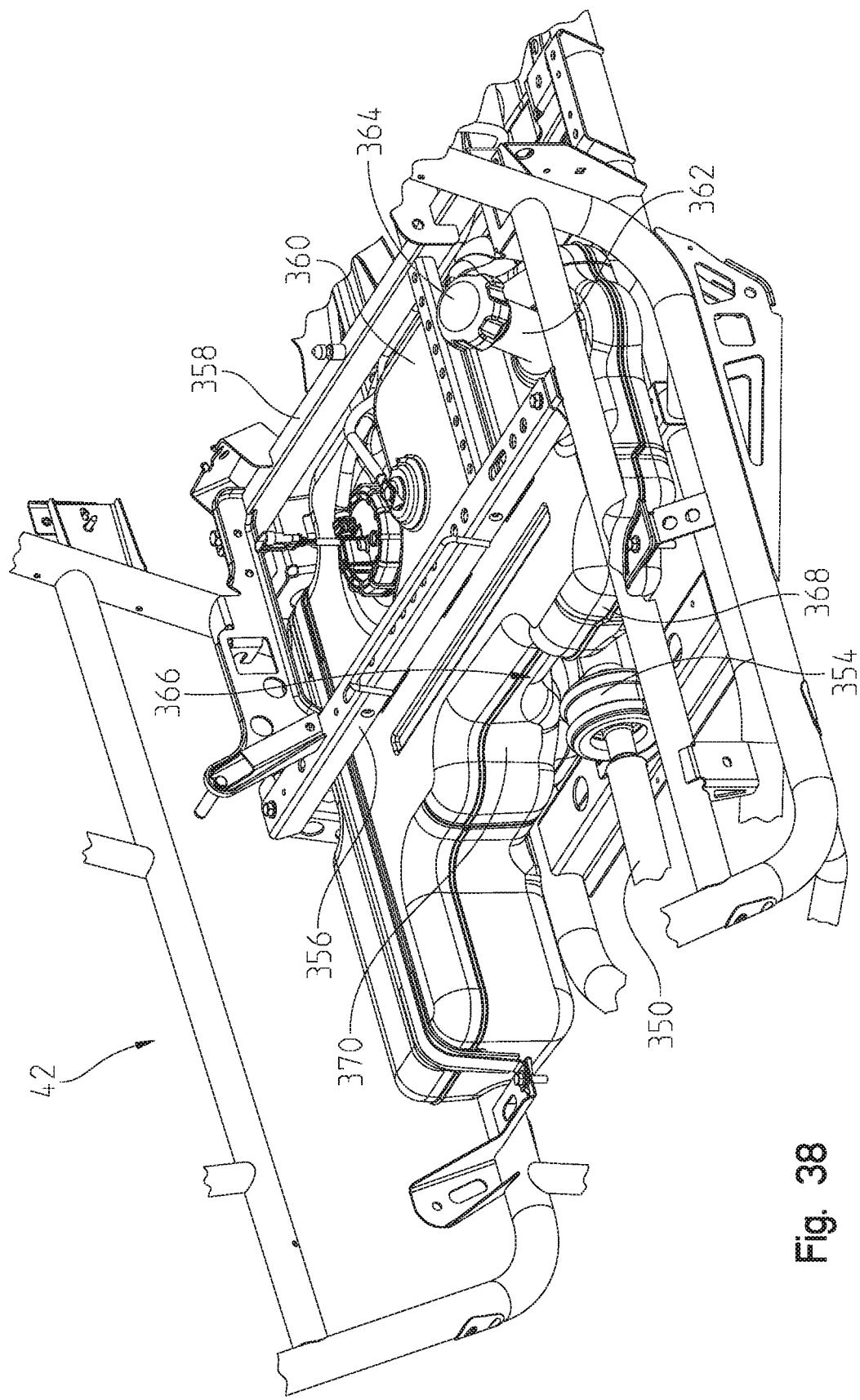
FIG. 38 is a front left perspective view of the fuel tank of FIG. 37 supported by the lower frame assembly.
Figure 39:
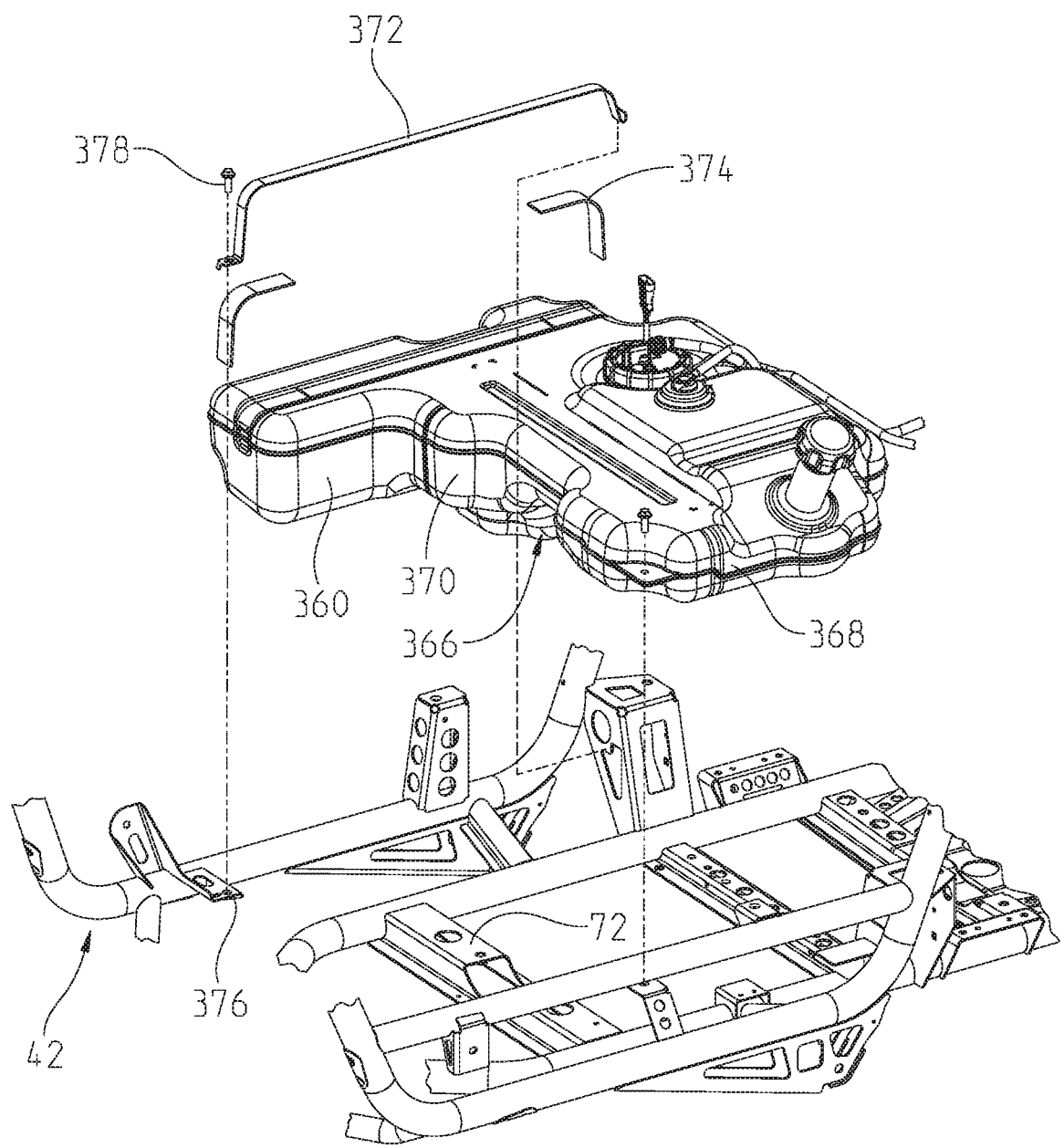
FIG. 39 is an exploded view of the fuel tank and lower frame assembly of FIG. 38.

Referring to FIG. 37, drive shaft 350 extends generally along longitudinal axis L and extends under seating 18. Drive shaft 350 is coupled to at least cross member 72 of lower frame assembly 42 with fasteners 352. More particularly, drive shaft 350 includes a carrier bearing 354 which extends around a portion of drive shaft 350 and couples to cross member 72 with fasteners 352. Illustratively, carrier bearing 354 is positioned forward of but vertically below seat bottom 20 within operator area 16.

Figure 40:
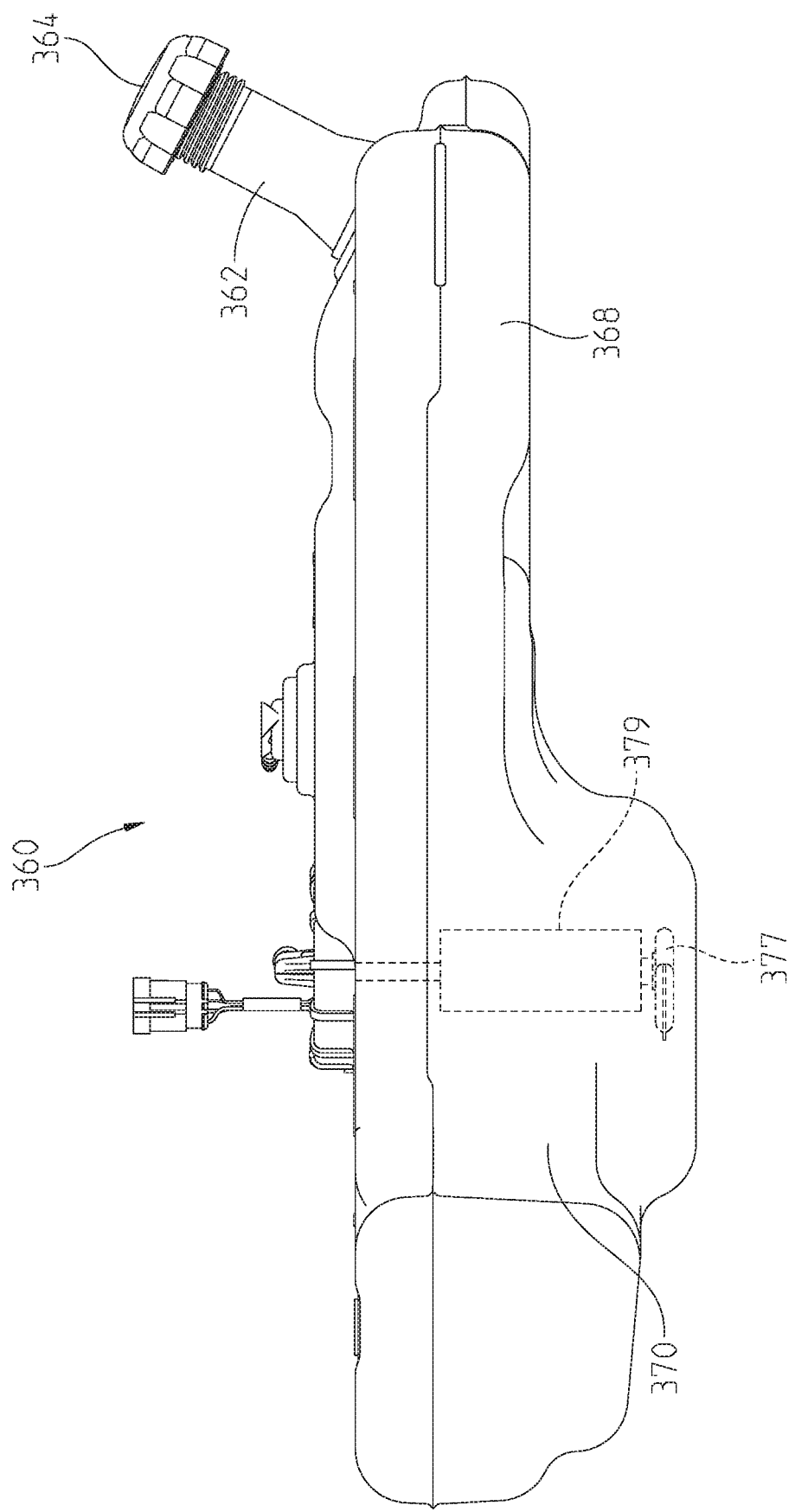
FIG. 40 is a front view of the fuel tank of FIG. 39.
Figure 41:
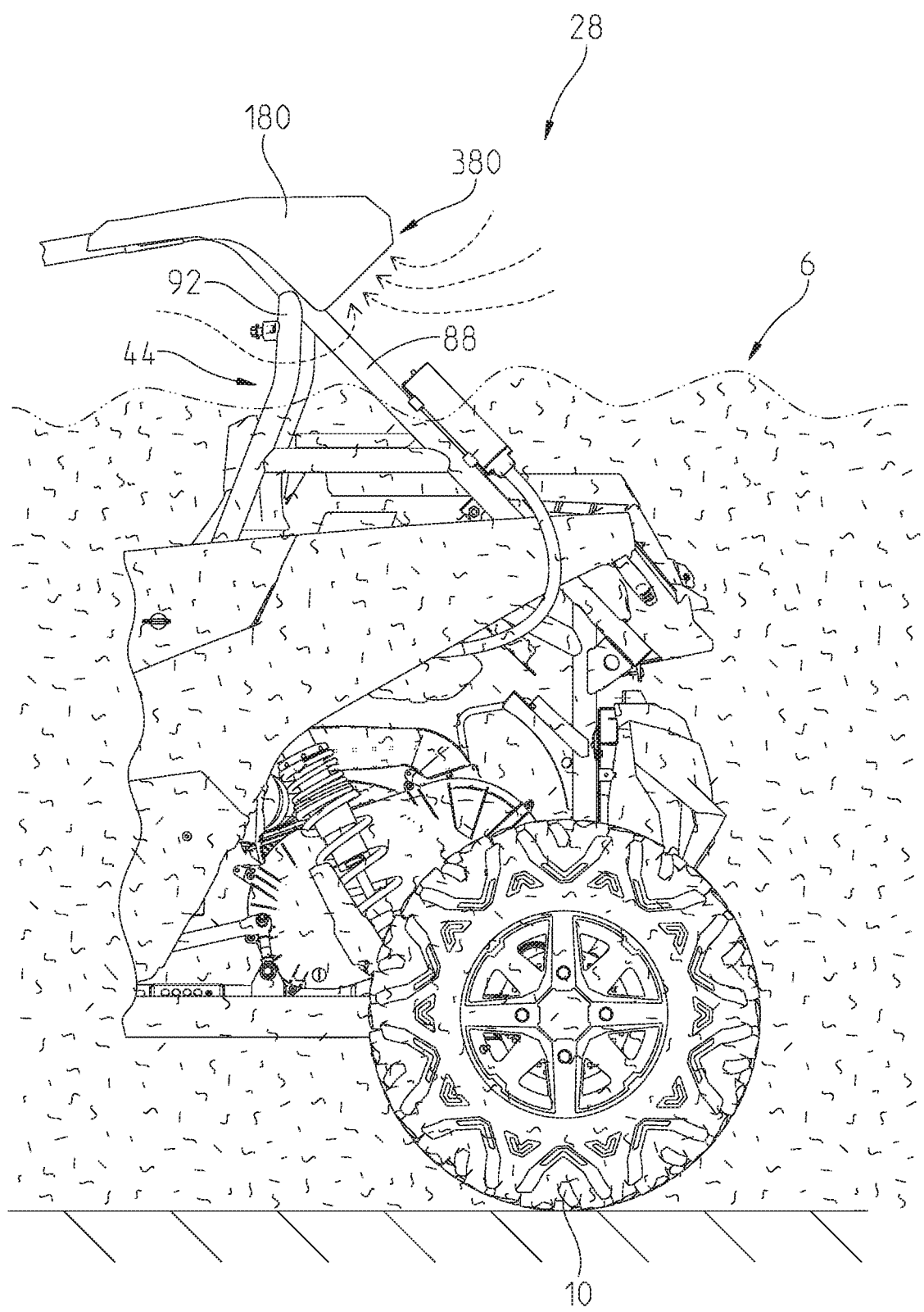
FIG. 41 is a left side view of a rear portion of the utility vehicle of FIG. 1 and illustrating a schematic view of an air intake assembly.

As shown in FIGS. 37-40, a fuel tank 360 also is positioned under seat bottom 20 within operator area 16. More particularly, fuel tank 360 is positioned under seat support members 356, 358 of lower frame assembly 42 support seat bottom 20 on lower frame assembly 42. Fuel tank 360 includes a filler tube 362 and a cap 364 which are positioned on left side L of vehicle 2. In one embodiment, drive shaft 350 extends under fuel tank 360 and, more particularly, extends through a recessed portion 366 of fuel tank 360. In this way, a first portion 368 of fuel tank 360 is positioned to one side of drive shaft 350 and a second portion 370 is positioned to the second side of drive shaft 350. Fuel tank 360 may be coupled to lower frame assembly 42 with a retaining member 372 and brackets 374 which extend over an upper surface of fuel tank 360 and are coupled to support members 376 on lower frame assembly 42 with fasteners 378. In this way, a downward force, rather than an upward force, is applied to fuel tank 360 to couple fuel tank 360 on lower frame assembly 42. In one embodiment, and as shown in FIG. 40, fuel tank 360 includes a fuel pump 379 positioned therein in a vertical orientation and a filter 377 positioned along a bottom surface of fuel tank 360 such that the inlet or "pick up" of fuel pump 379 is along the bottom of fuel tank 360.

Referring to FIGS. 41-49, air intake assembly 28 is shown. Illustratively, air intake assembly 28 is supported by rear end 6 of vehicle 2. Additionally, at least a portion of air intake assembly 28 is supported by upper frame assembly 44. More particularly, an air inlet 380 of air intake assembly 28 is supported by at least rear upstanding frame members 88 of upper frame assembly 44 and is supported under or at air deflector 180 of body assembly 14. In this way, because air inlet 380 is supported on upper frame assembly 44 and at rear end 6 of vehicle 2, any debris, particulate matter, dust, etc. that is flowing around a lower portion of vehicle 2 may not flow upwardly to air inlet 380 which reduces or minimizes the amount of dust or other particulate matter that may enter air intake assembly 28. Additionally, air deflector 180 cooperates with air intake assembly 28 to direct air into air inlet 380 to maximize the amount of air entering air intake assembly 28.

Figure 42:
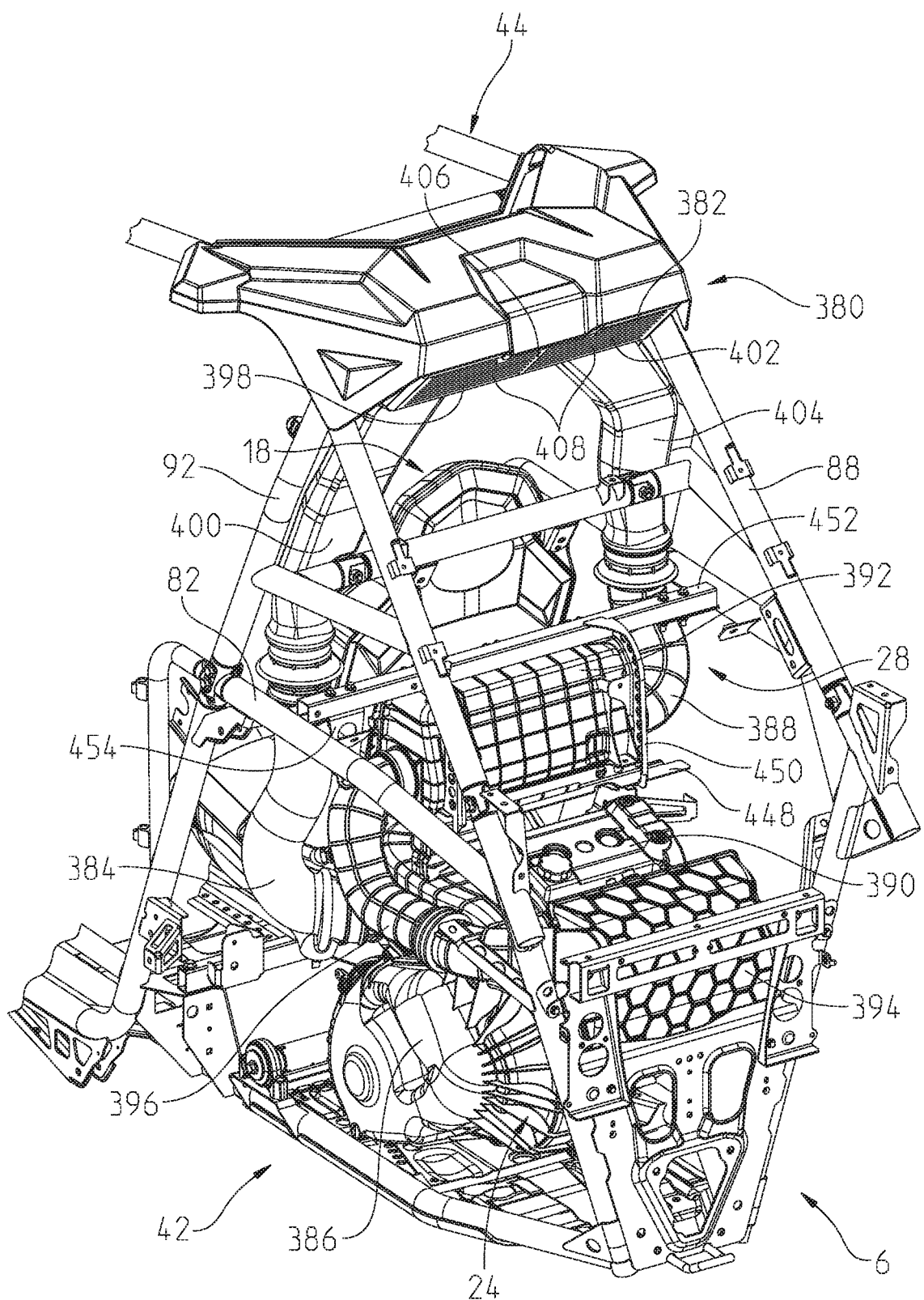
FIG. 42 is a rear left perspective view of a powertrain assembly and the air intake assembly of FIG. 41.
Figure 43:
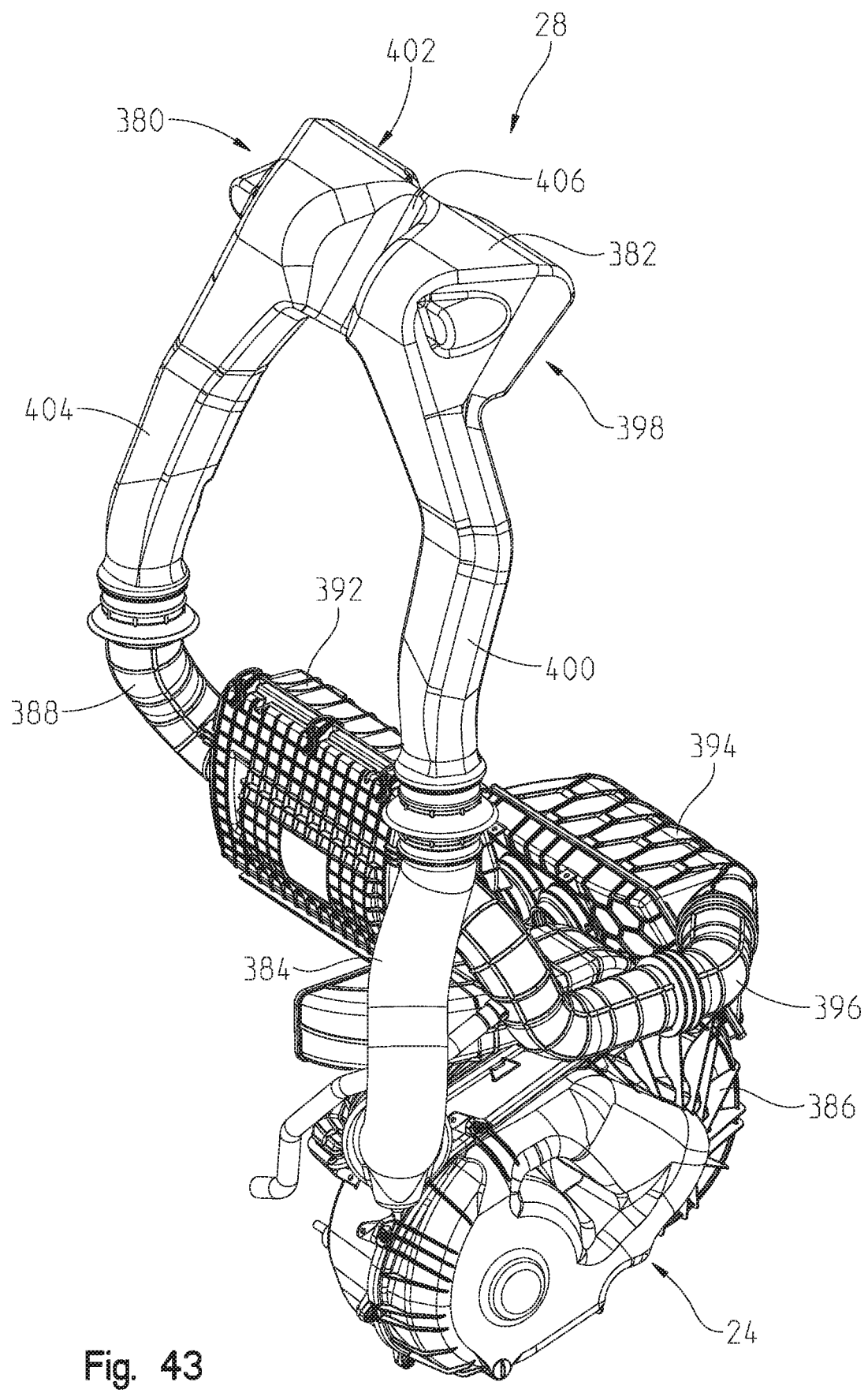
FIG. 43 is a front left perspective view of a portion of the powertrain assembly and the air intake assembly of FIG. 42.
Figure 44:
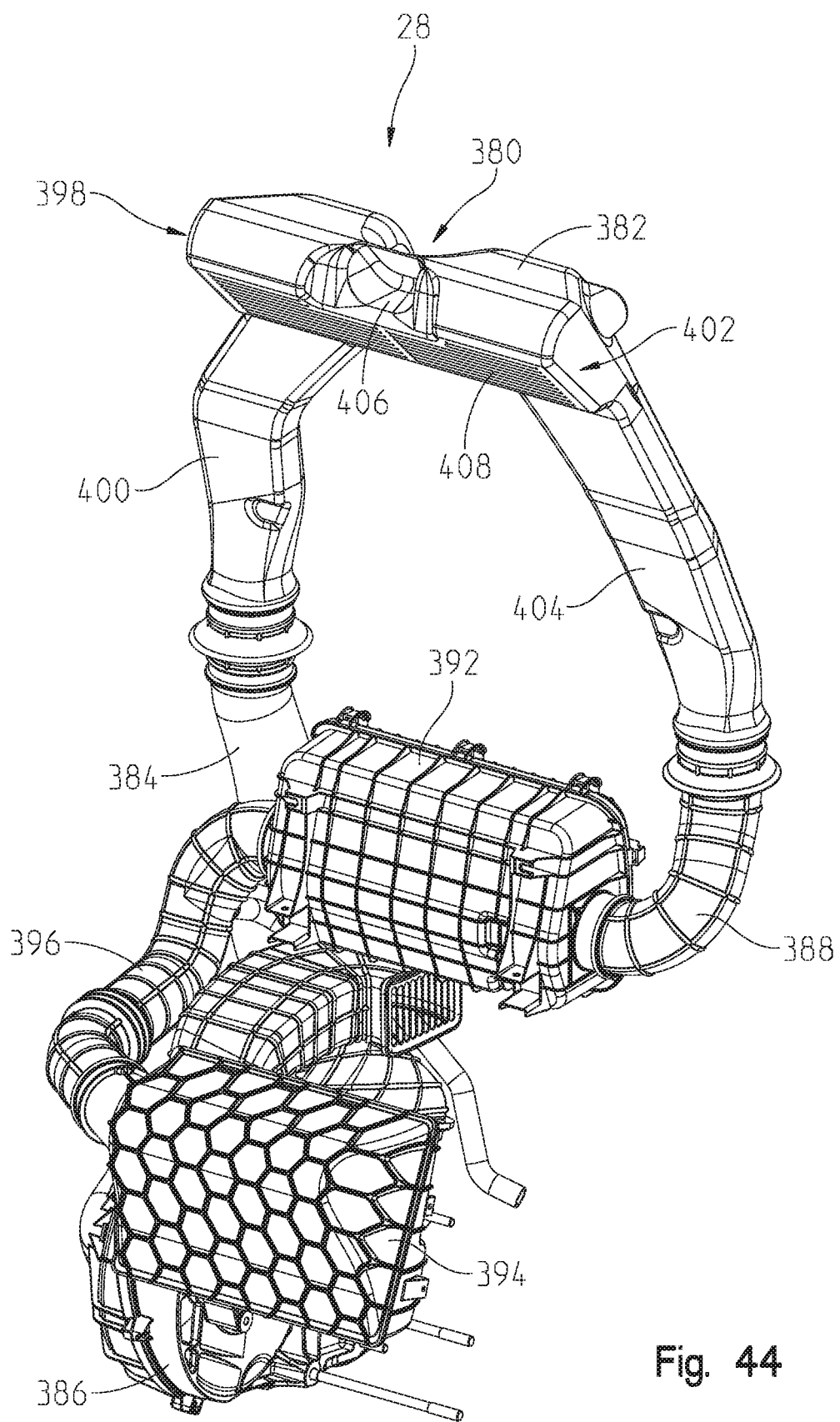
FIG. 44 is a rear right perspective view of the air intake assembly and a portion of the powertrain assembly of FIG. 43.
Figure 45:
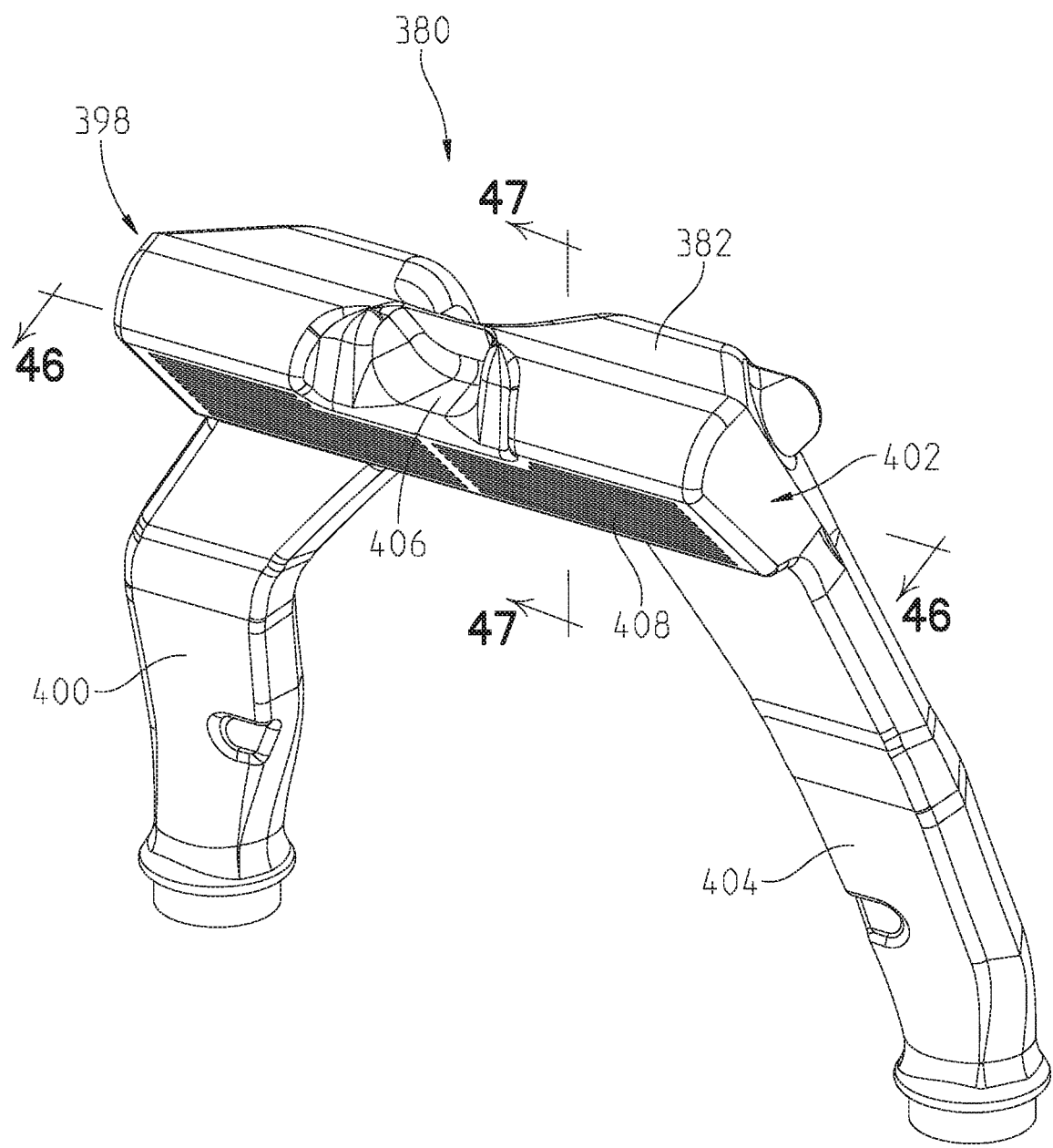
FIG. 45 is a rear right perspective view of an air plenum of the air intake assembly of FIG. 44.

As shown best in FIGS. 42-44, air inlet 380 is defined by an air plenum or housing 382 that is coupled to a first duct 384. First duct 384 is coupled to CVT 386 of powertrain assembly 24 to providing cooling air to the internal components of CVT 386. Additionally, air intake assembly 28 includes a second duct 388 which is coupled to air plenum 382 to provide combustion air to an engine 390 of powertrain assembly 24. More particularly, second duct 388 is coupled to an airbox 392 of air intake assembly 28 which is then coupled to an intake manifold 394 of engine 390 through a third duct 396.

Referring to FIGS. 42-47, air plenum 382 is illustratively shown as a dual plenum which includes both an air inlet for CVT 386 and an air inlet for engine 390. More particularly, as shown in FIG. 42, air plenum 382 is supported at an upper end of upper frame assembly 44 and is supported within the width extending laterally between rear upstanding members 88. In this way, air plenum 382 does not extend laterally outward from vehicle 2 or upper frame assembly 44 and is contained within an envelope of vehicle 2 defined between the upper and lower ends of rear upstanding members 88 and the width extending between rear upstanding members 88.

In one embodiment, air plenum 382 includes a CVT inlet portion 398 positioned along left side L and configured to receive ambient air at rear end 6 of vehicle 2. Air entering CVT inlet portion 398 flows into a conduit 400 which couples with first duct 384 to provide cooling air to CVT 386. In one embodiment, CVT inlet portion 398 may be angled approximately 45° relative to a vertical plane and may be approximately seven inches wide (in the lateral direction). Illustratively, conduit 400 extends downward and is positioned adjacent intermediate upstanding members 92 on left side L of vehicle 2. In operation, ambient air at rear end 6 of vehicle 2 flows into CVT inlet portion 398, into conduit 400 and first duct 384, and enters CVT 386 through first duct 384 to cool CVT 386. In a further embodiment, a secondary air inlet (not shown) may be fluidly coupled to CVT 386 to provide additional air flow thereto. For example, the secondary air inlet may be coupled to CVT inlet portion 398 or CVT 386 itself. Additional details of CVT 386 and the cooling air inlets for CVT 386 may be disclosed in U.S. Patent Application Publication No. 2016/0061314 filed on Sep. 2, 2014, U.S. Patent Application Publication No. 2016/0176283 filed on Dec. 19, 2014, U.S. Patent Application Publication No. 2016/0176284 filed on Dec. 19, 2014, and U.S. Patent Application Publication No. 2016/0176287 filed Dec. 19, 2014, the complete disclosures of which are expressly incorporated by reference herein.

A filter may be positioned within conduit 400 or first duct 384 to filter debris or particulate matter from the air flowing into CVT 386 but no filter is included at CVT inlet portion 398. However, by positioning CVT inlet portion 398 on rear upstanding frame members 88, the amount of debris or particulate matter within the air flowing into CVT inlet portion 398 may be minimized.

Referring still to FIGS. 42-47, air plenum 382 also includes an engine inlet portion 402 configured to receive ambient air at rear end 6 of vehicle 2 for combustion. As with CVT inlet portion 398, in one embodiment, engine inlet portion 402 may be angled approximately 45° relative to a vertical plane and may be approximately seven inches wide (in the lateral direction), such that air plenum 382 has a total width of approximately 14 inches and is angled 45° relative to a vertical plane.

Figure 46:
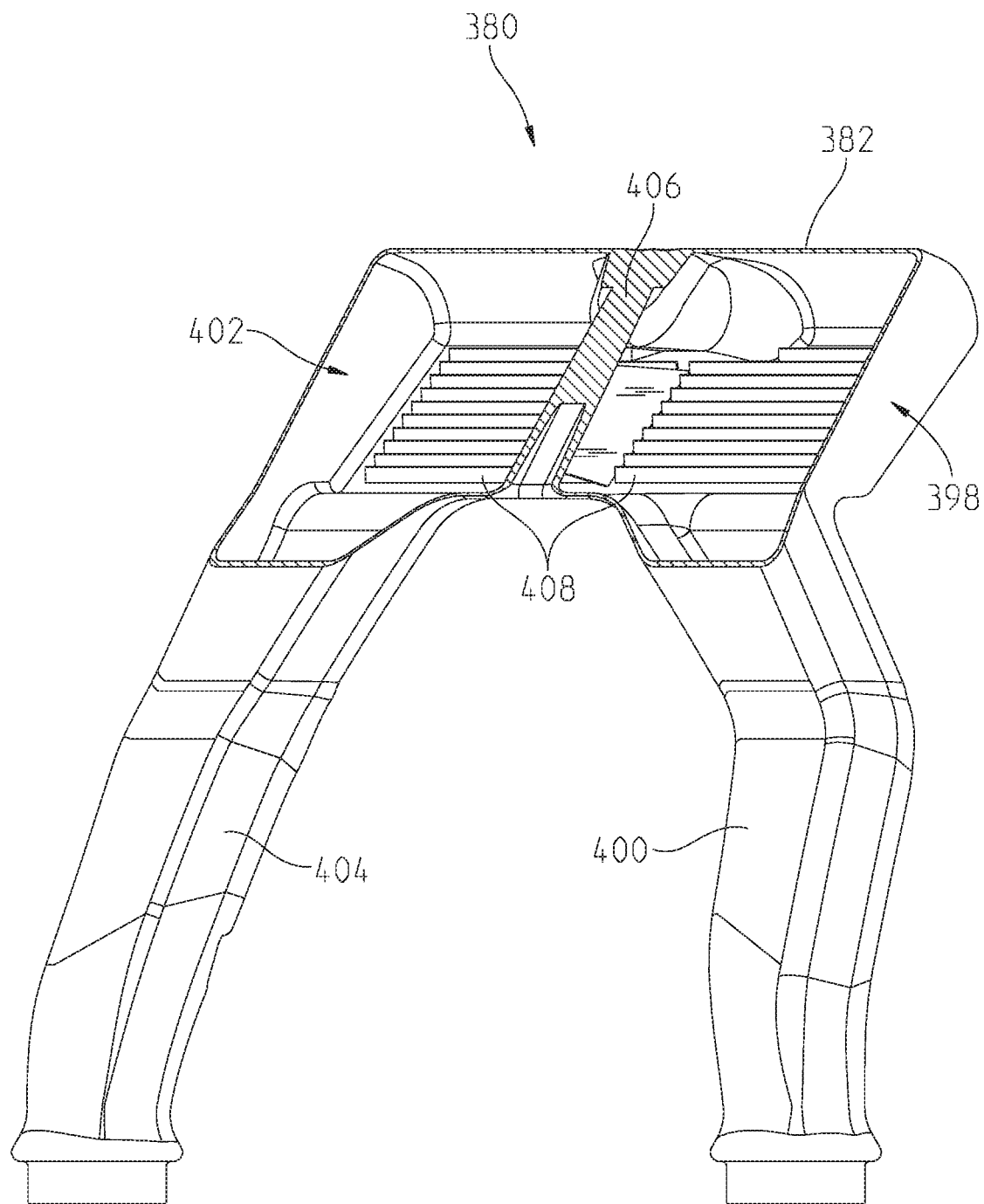
FIG. 46 is a cross-sectional view of the air plenum of FIG. 45, taken along line 46-46 of FIG. 45.
Figure 47:
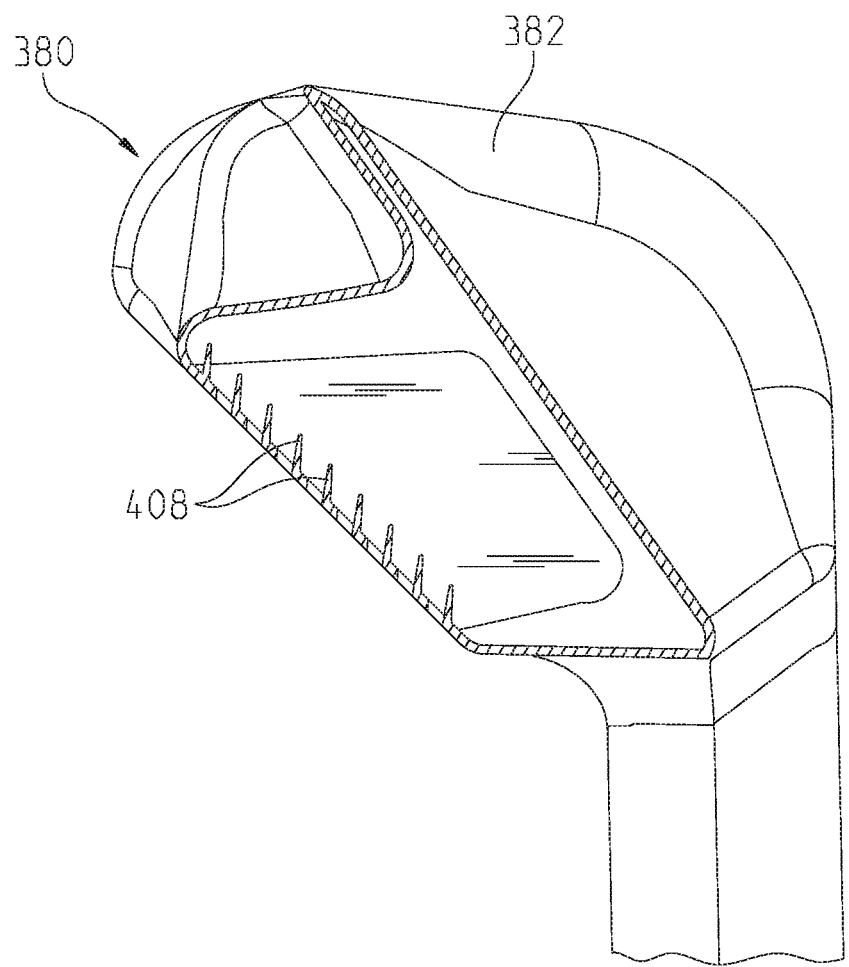
FIG. 47 is a further cross-sectional view of the air plenum of FIG. 45, taken along line 47-47 of FIG. 45.

Engine inlet portion 402 is separated from CVT inlet portion 398 by a wall 406 which decreases the likelihood that CVT inlet portion 398 scavenges incoming air from engine inlet portion 402 or vice versa. In this way, even though air plenum 382 is a single housing which includes both inlet portions 398, 402, sufficient air is received within each inlet portion 398, 402 for proper cooling of CVT 386 and combustion within engine 390. Additionally, as shown in FIGS. 46 and 47, each inlet portion 398, 402 includes a plurality of louvers 408 which extend upwardly into inlet portions 398, 402 such that air initially entering inlet portions 398, 402 is directed inwardly, thereby minimizing the likelihood that the air may be pulled into the adjacent inlet portion 398, 402. Also, the angle of louvers 408 deflects dirt, debris, or other matter away from inlet portions 398, 402 to minimize the likelihood that inlet portions 398, 402 become clogged or blocked.

As shown in FIGS. 42-47, with respect to engine inlet portion 402, air is configured to enter inlet portion 402 and flow into a conduit 404 which couples with second duct 388 to provide combustion air to engine 390. Illustratively, conduit 404 extends downwardly along intermediate upstanding member 92 on right side R of vehicle 2. In operation, ambient air at rear end 6 of vehicle 2 flows into engine inlet portion 402, into conduit 404 and second duct 388, through airbox 392 and into third conduit 396, and enters engine 390 through intake manifold 394.

Figure 48:
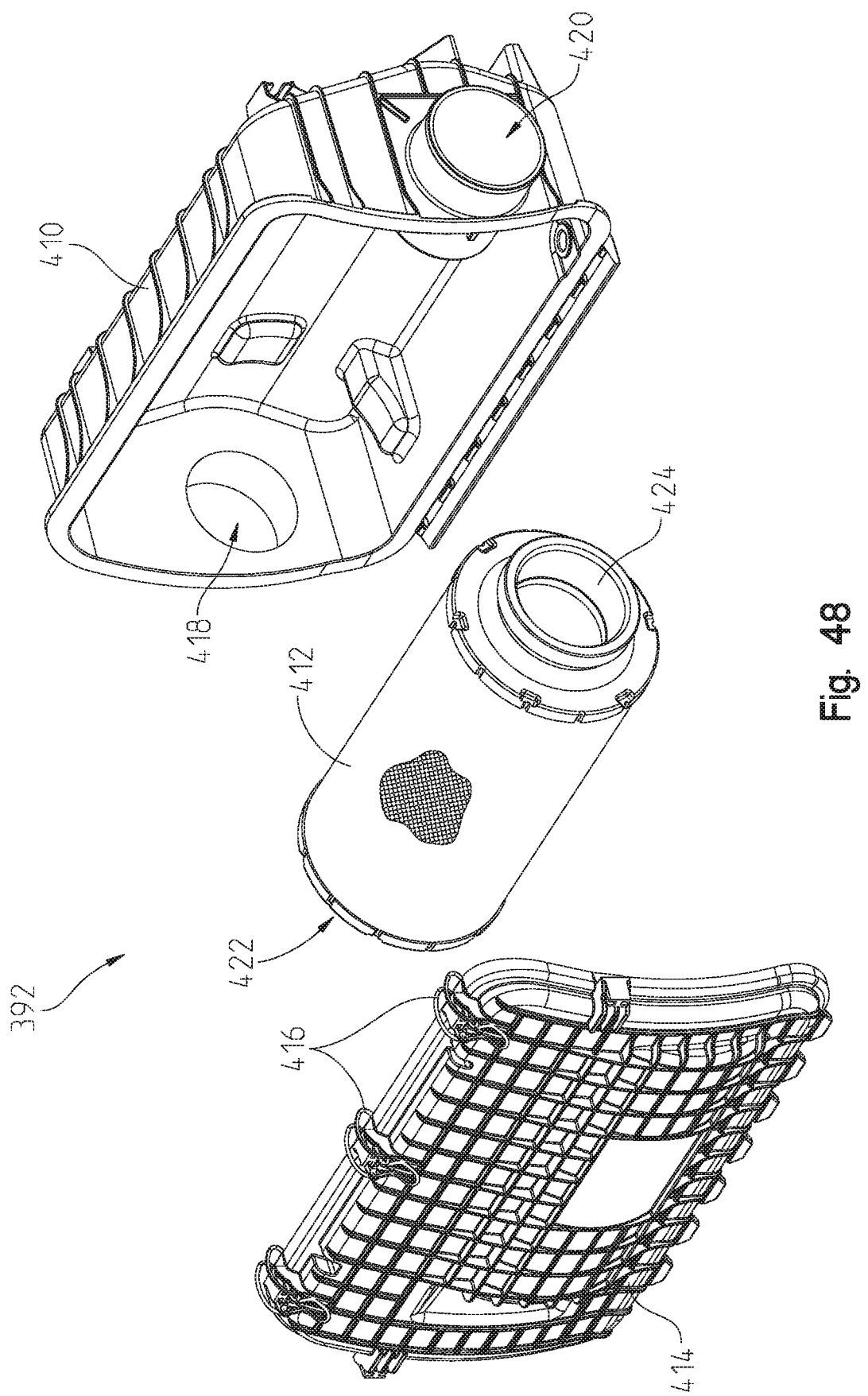
FIG. 48 is an exploded view of an airbox of the air intake assembly of FIG. 44.
Figure 49:
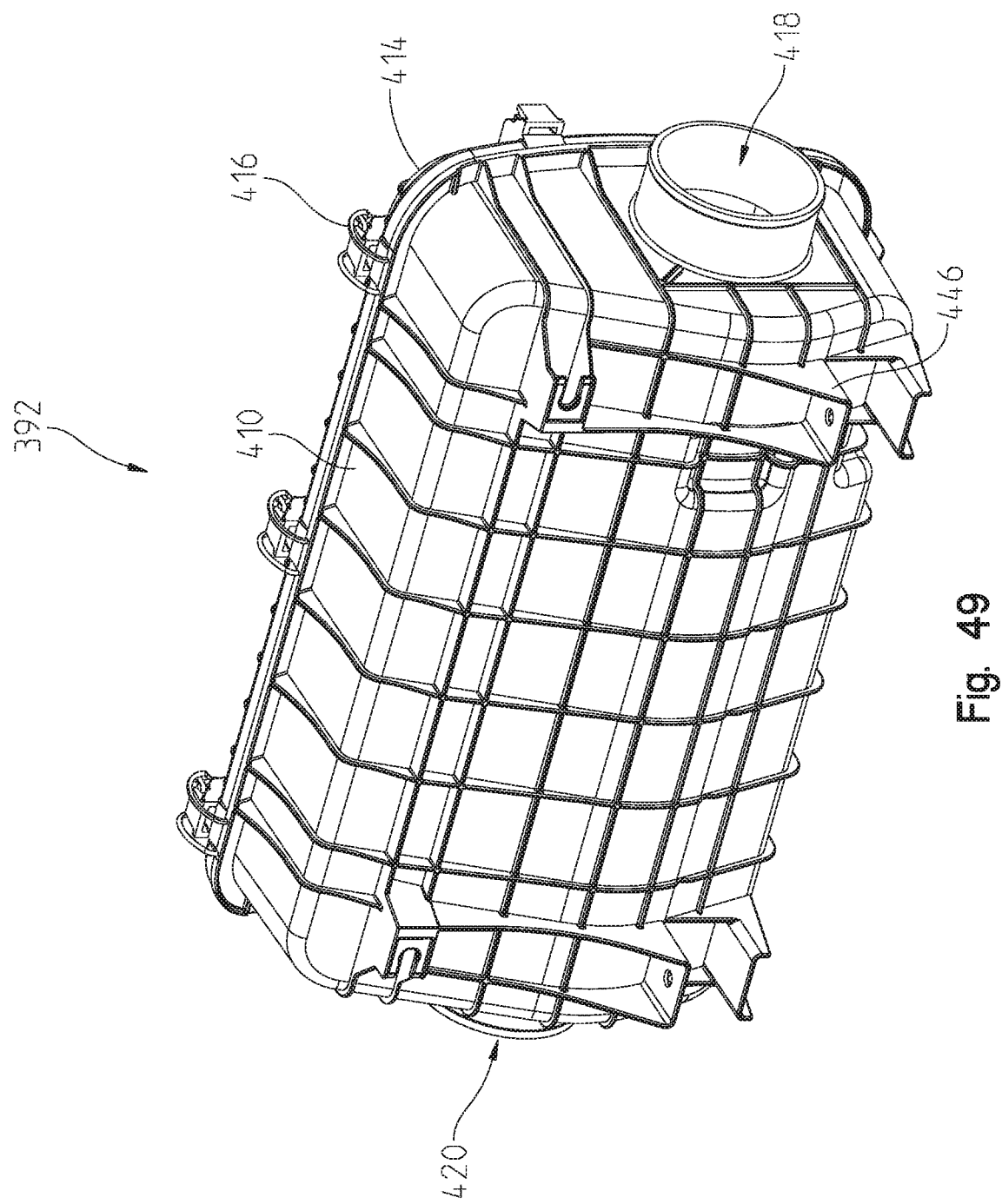
FIG. 49 is a rear right perspective view of the airbox assembly of FIG. 48.
Figure 50:
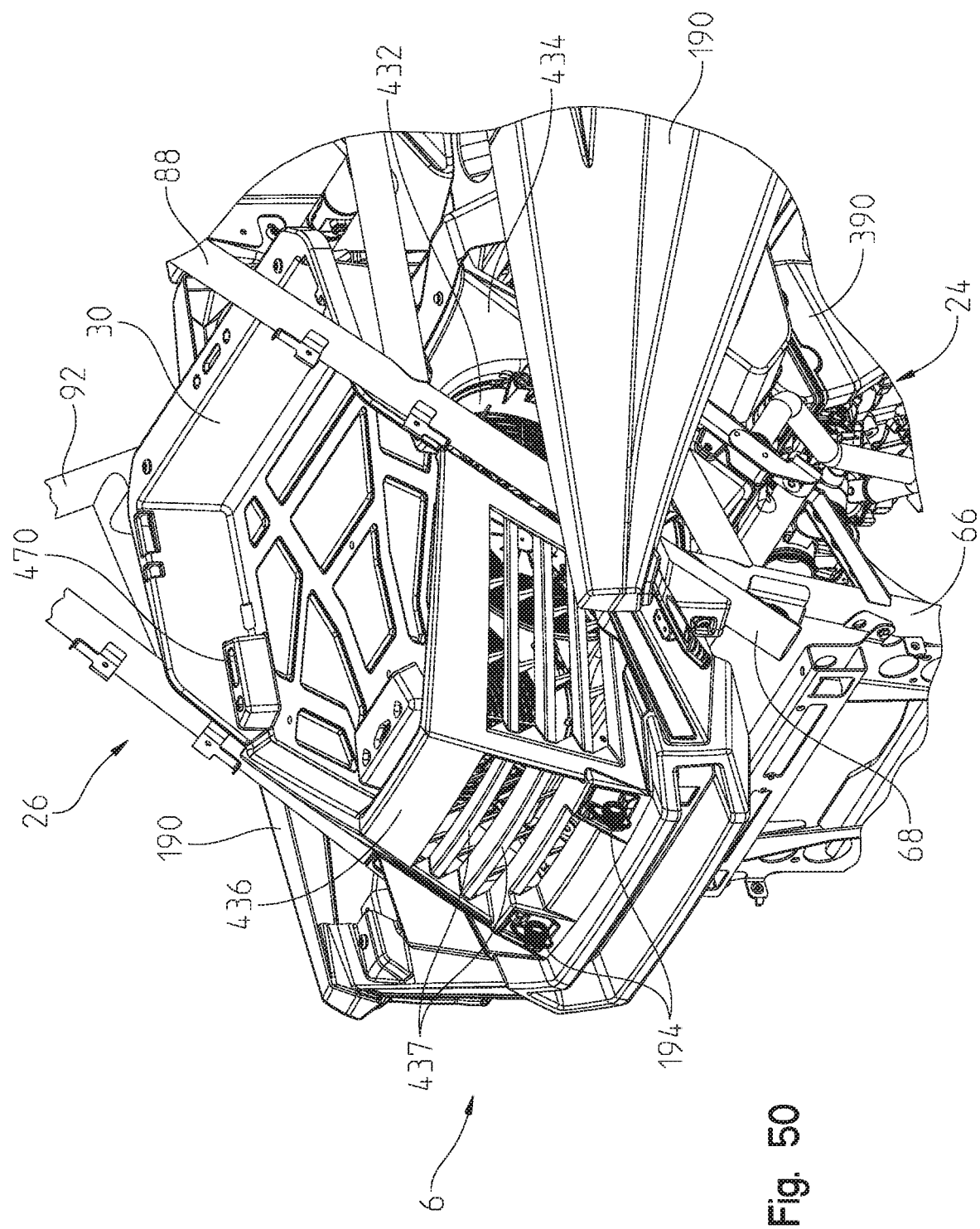
FIG. 50 is a rear right perspective view of a cooling assembly positioned below a removable cargo bed of the utility vehicle of FIG. 1.

Referring to FIGS. 48 and 49, no filter is included at engine inlet portion 402 but, because engine inlet portion 402 is supported on rear upstanding members 88 at rear end 6 of vehicle 2, dust, debris, and particulate matter present in the air flowing through engine inlet portion 402 may be minimized. However, the air flowing into engine 390 from engine inlet portion 402 is filtered with airbox 392. Airbox 392 includes a housing 410 configured to support a filter 412 therein. Filter 412 is secured within housing 410 by a cover 414 which is removably coupled to housing 410 with latches 416. In this way, cover 414 may be removed to clean, replace, or service filter 412. More particularly, airbox 392 may be accessed by removing fenders 190 (FIGS. 19 and 20A) from lower frame assembly 42 or by removing an access panel 411 (FIG. 51) positioned directly rearward of seat back 22. In this way, airbox 392 may be accessible from operator area 16 to facilitate replacement or servicing of filter 412. Additionally, airbox 392 may be accessed from either right side R or left side L of vehicle 2.

Airbox 392 is supported on vehicle 2 using brackets 446 on housing 410. In one embodiment, brackets 446 are integrally formed with housing 410. Brackets 446 are configured to be coupled to a support member 448 extending laterally across a portion of rear end 6 of vehicle 2. Support member 448 and airbox 392 are retained on lower frame assembly 42 with braces 450 that extend vertically along housing 410 and over an upper surface of housing 410 to couple to a cross bar 452. Cross bar 452 is coupled to brackets 454 on frame members 82 of lower frame assembly 42.

During operation of vehicle 2, air flowing into engine inlet portion 402 flows into conduit 404 and second duct 388 before flowing into an intake port 418 of housing 410 of airbox 392. When the air flows into housing 410 through intake port 418, the air flows through filter 412 because an inlet 422 of filter 412 is joined with intake port 418 of housing 410. As such, the filtered air flows from filter 412, through an outlet 424 of filter 412, and into third duct 396 through an outlet port 420 of housing 410. In this way, filtered air is provided to intake manifold 394 to flow into engine 390 for combustion therein.

Referring to FIGS. 50-54, cooling assembly 26 is shown. Illustratively, cooling assembly 26 is supported at rear end 6 of vehicle 2, rather than front end 4, and is positioned below cargo area 30. Even though cargo area 30 is positioned over cooling assembly 26, cooling assembly 26 is configured to receive sufficient air flow from right side R and left side L of vehicle 2, as disclosed herein. Because cooling assembly 26 is positioned at rear end 6, front end 4 of vehicle 2 may be made narrower than other vehicles, as disclosed herein, thereby increasing the FOV of the operator when seated in operator area 16.

Figure 55:
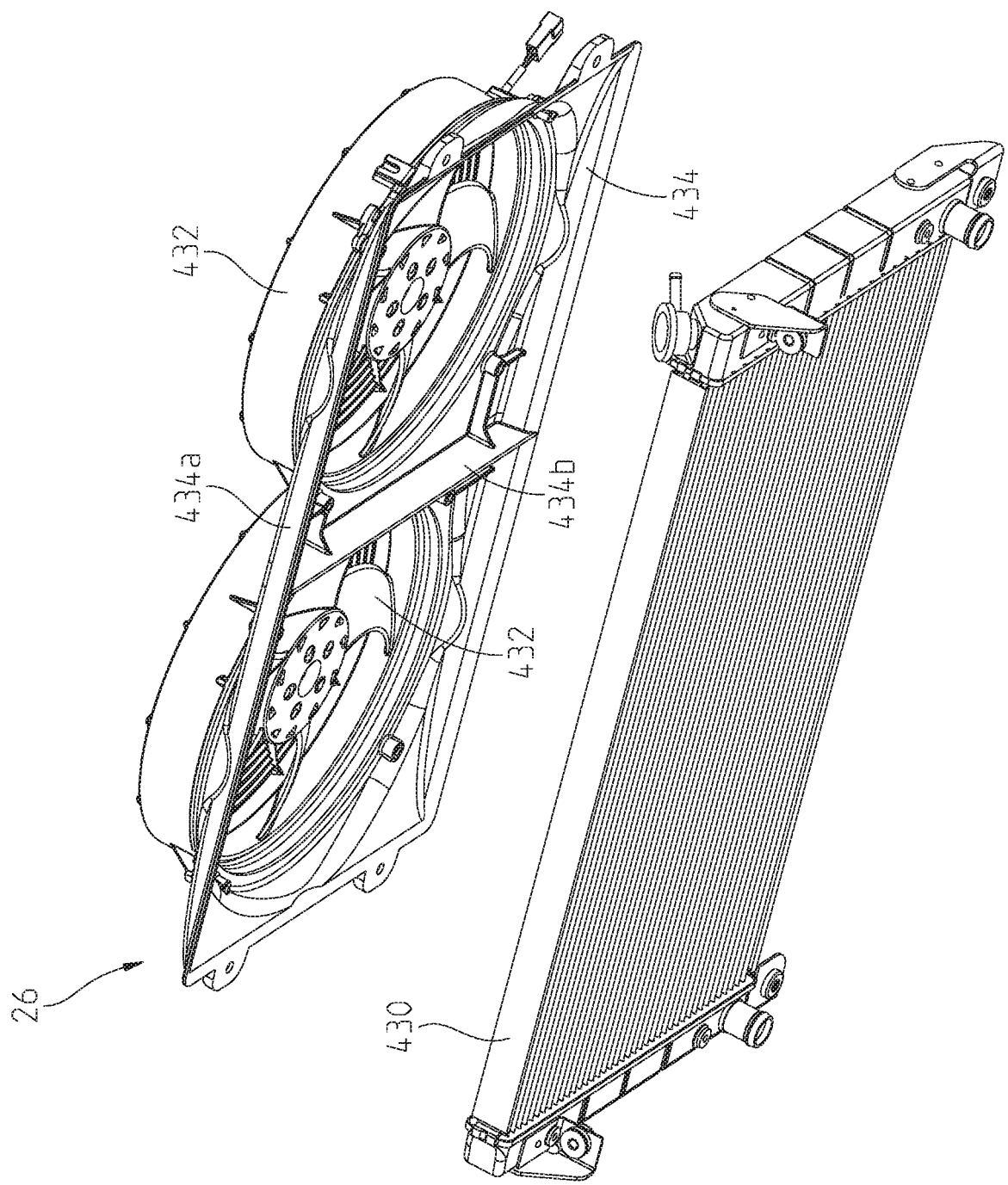
FIG. 55 is a front left exploded view of a radiator and fans of the cooling assembly of FIG. 50.

Cooling assembly 26 includes a heat exchanger, illustratively a radiator 430, and at least one fan 432. In one embodiment, cooling assembly 26 includes two fans 432. Fans 432 may be coupled to a shroud 434 of radiator 430 and radiator 430 may be coupled to brackets 78 on rear upstanding members 66 of lower frame assembly 42. As shown in FIG. 55, shroud 434 includes a perimeter portion 434a and a central wall 434b. Perimeter portion 434a is configured to generally surround both fans 432 and form at least a partial seal against radiator 430. Central wall 434b extends generally downwardly between fans 432 and may contact a rear face of radiator 430. Central wall 434b is configured to inhibit recirculation of warm air expelled from radiator 430 when only one fan 432 is operating. More particularly, central wall 434b decreases the likelihood that air being pulled through the one fan 432 which is operating is then redirected or recirculated through the other fan 432 that is not operating. In this way, central wall 434b increases the cooling efficiency of cooling assembly 26 to prevent warm air pulled through the operating fan 432 from being recirculated through a portion of cooling assembly 26. As such, central wall 434b ensures that the air pulled through radiator 430 is pulled only through the fan 432 which is operating in the situation where only one fan 432 is operating rather than both fans 432.

Radiator 430 and fans 432 may be generally concealed by a grille or body panel 436 which is removably coupled at rear end 6 of vehicle 2 with fasteners 194, illustratively quarter-turn fasteners which operate as disclosed herein. Cooling assembly 26 may be accessed for servicing the components thereof by removing either grille 436 and/or fenders 190 on right side R or left side L of vehicle 2.

In operation, cooling assembly 26 is used to cool engine 390. Fans 432 are configured to draw air into radiator 430 from an air volume 440 defined within vehicle 2 and above powertrain assembly 24. Illustratively, air volume 440 is positioned forward of radiator 430 and fans 432 but is rearward of operator area 16. Additionally, air volume 440 is positioned internally on vehicle 2 such that air volume 440 is defined intermediate frame members 82 of lower frame assembly 42. In this way, rear end 6 of vehicle 2 defines air volume 440 which feeds air into radiator 430. In operation, air flows through openings 196 on fenders 190 and into air volume 440 and then is drawn through radiator 430 by fans 432. Additionally, the shape and position of fenders 190 also may direct air around the rear end thereof and into air volume 440. As such, air volume 440 and radiator 430 receive air from right and left sides R, L of vehicle 2, rather than forward or rearward of vehicle 2.

Fans 432 may be controlled by an engine control unit ("ECU") (not shown) such that fans 432 may operate in stages or at particular times, rather than both fans 432 being turned on together and turned off together. The ECU provides an input to start or stop at least one of fans 432 based on various vehicle and engine operating parameters. When the air flows through radiator 430, fans 432 facilitate the removal of air from radiator 430 by directing the air rearwardly toward grille 436. Grille 436 includes a plurality of louvers 437 which direct the air away from vehicle 2. Additionally, louvers 437 are angled to deflect dirt, mud, and other debris away from fans 432 and radiator 430.

Figure 51:
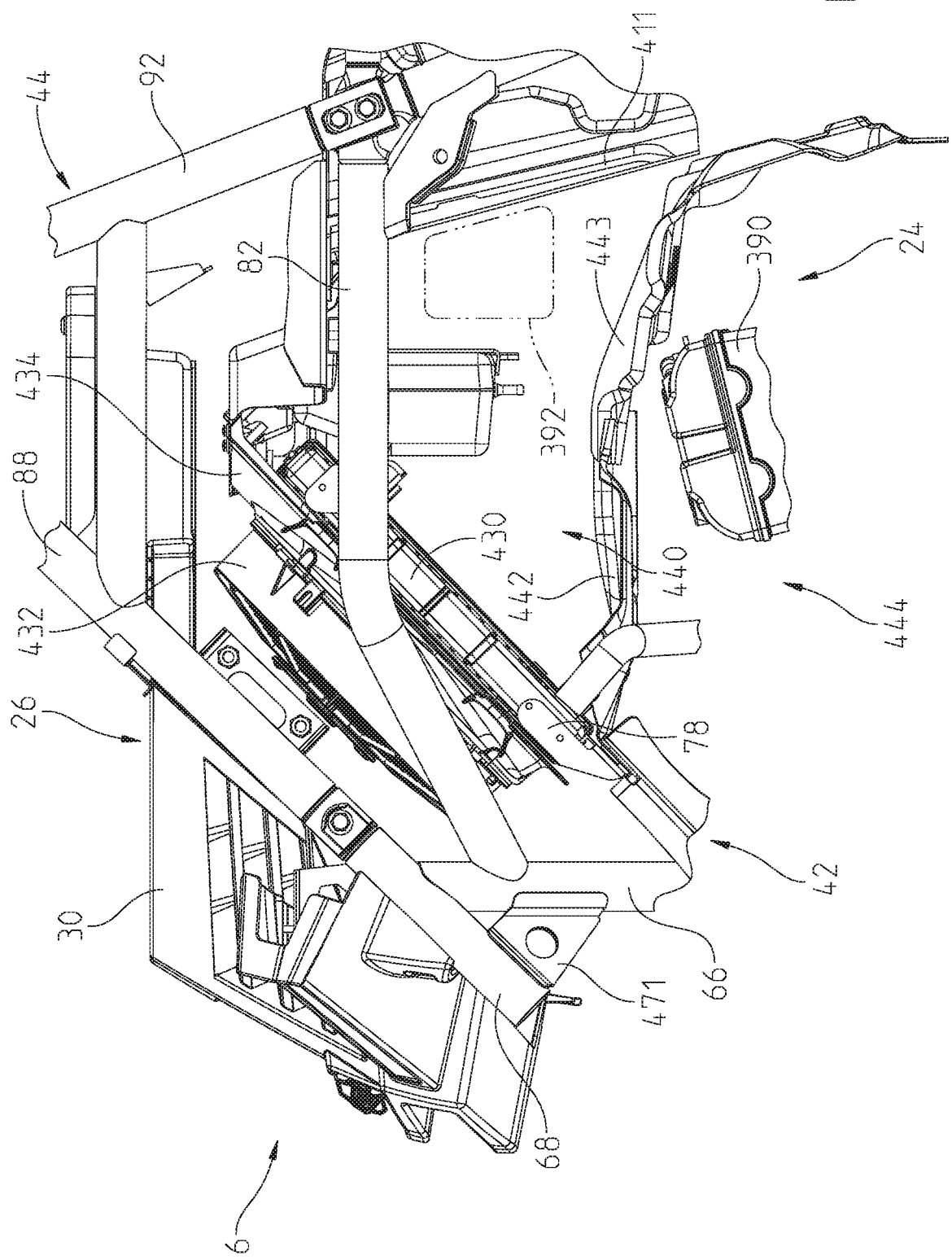
FIG. 51 is a side view of the cooling assembly of FIG. 50.
Figure 52:
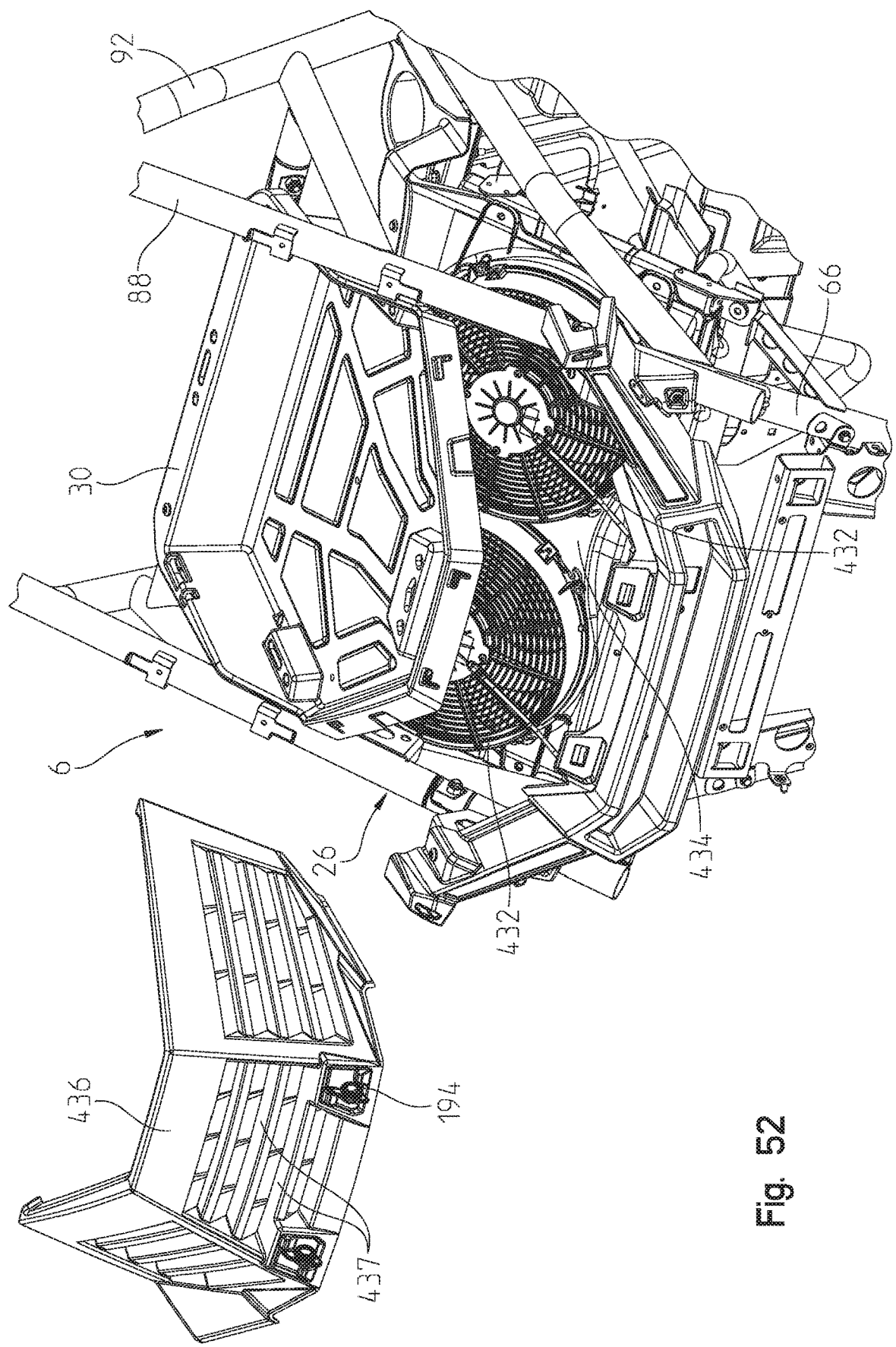
FIG. 52 is a rear right perspective view of the cooling assembly of FIG. 50 with a cover exploded from the cooling assembly.
Figure 53:
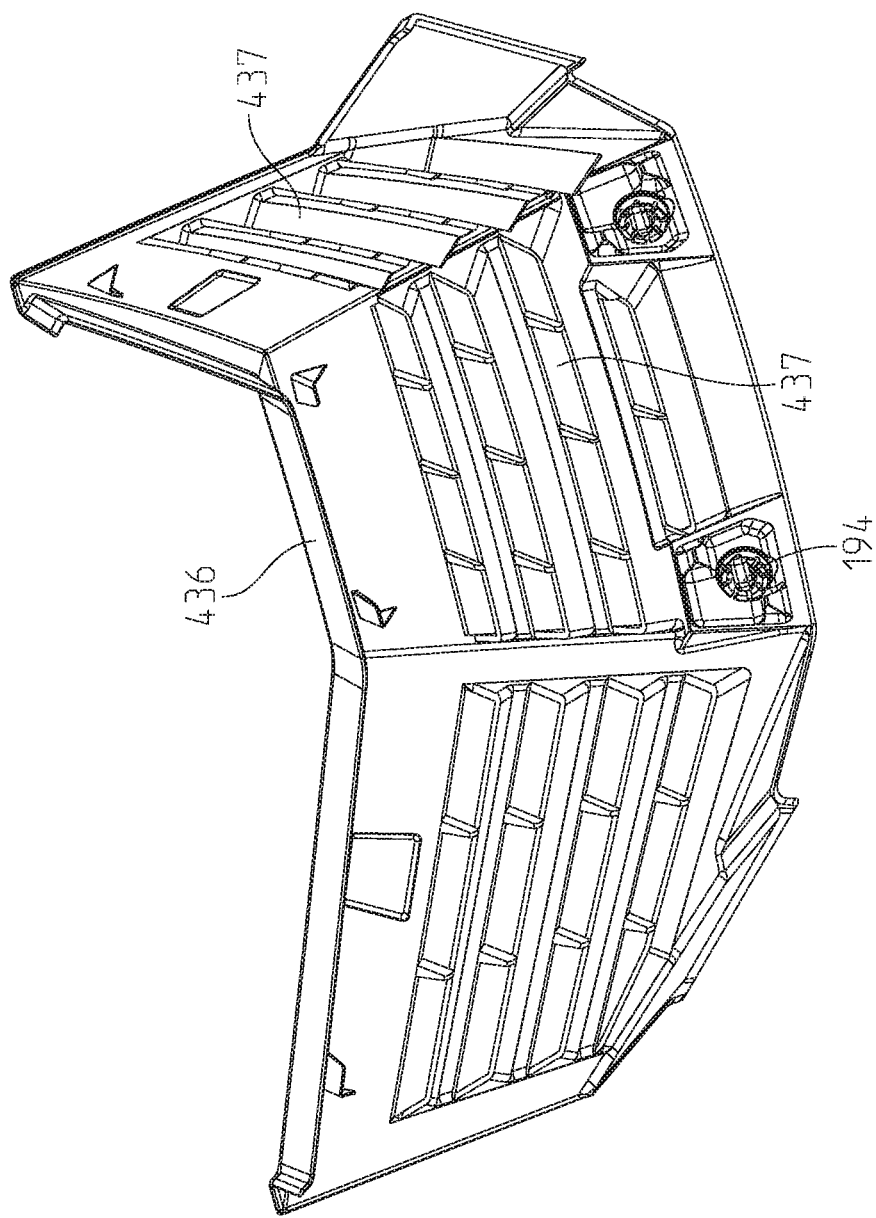
FIG. 53 is a rear left perspective view of a grille configured to be positioned over a portion of the cooling assembly of FIG. 52.
Figure 54:
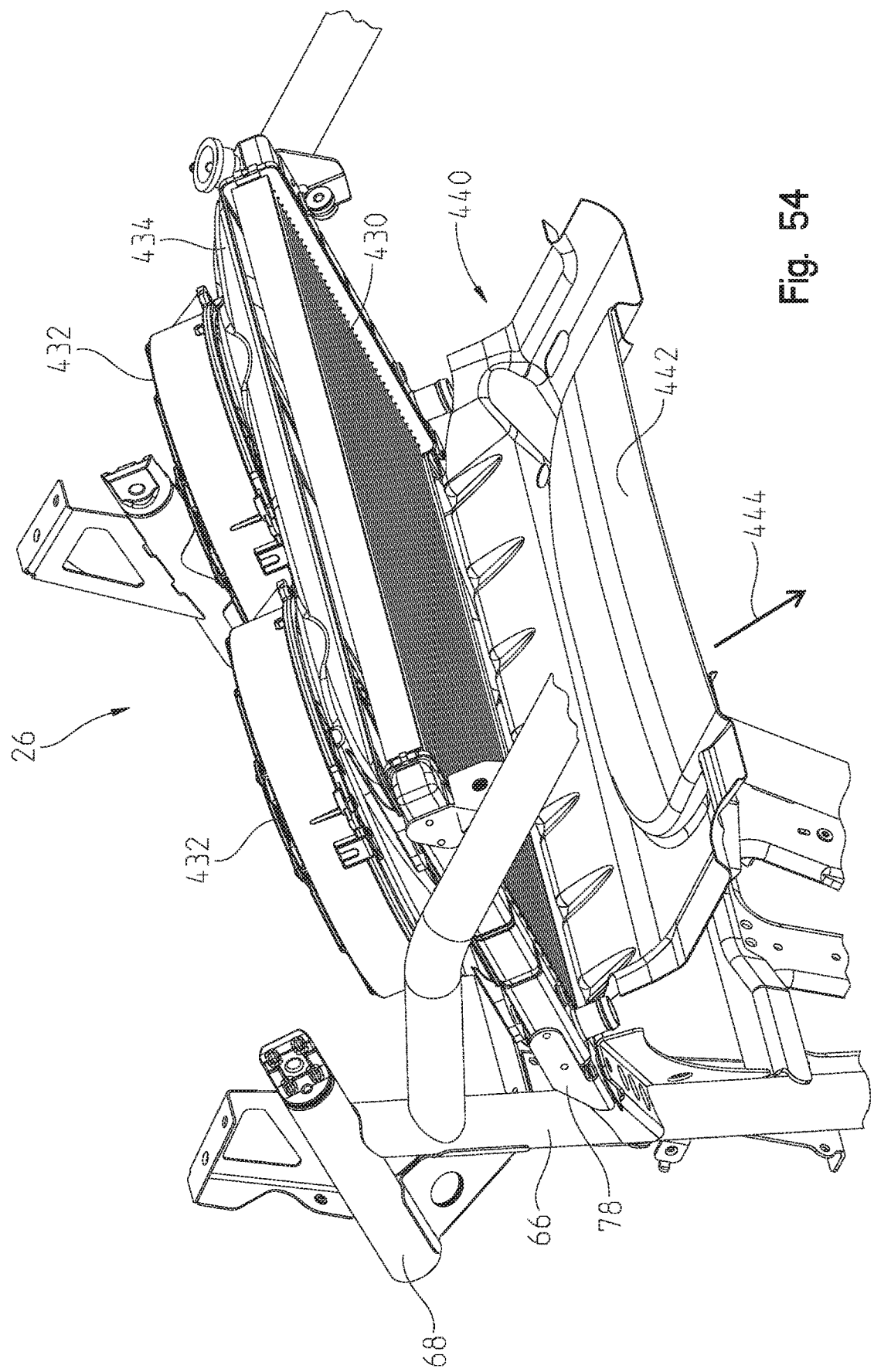
FIG. 54 is a front right perspective view of the cooling assembly of FIG. 52.

As shown in FIGS. 50-54, air volume 440 is at a position above engine 390 and forward of radiator 430. To prevent drawing the warm or hot air surrounding engine 390 into radiator 430 which would decrease the cooling effect provided by radiator 430, cooling assembly 26 includes a first heat shield or baffle plate 442 and a second heat shield or baffle plate 443, both of which extend horizontally above engine 390 to separate an engine compartment 444 containing engine 390 from air volume 440. In one embodiment, first and second heat shields 442, 443 are coupled together with removable fasteners; however, in another embodiment, first and second heat shields 442, 443 may be integrally formed together. Illustratively, as shown in FIG. 51, second heat shield 443 extends above a portion of engine 390 and also extends forwardly of engine 390 to define engine compartment 444 separately from air volume 440. In this way, as the cooler ambient air enter air volume 440 through openings 196 of fenders 190 and along the rear surface of fenders 190, the air flows above engine compartment 444 and into radiator 430 to facilitate cooling of engine 390.

Figure 56:
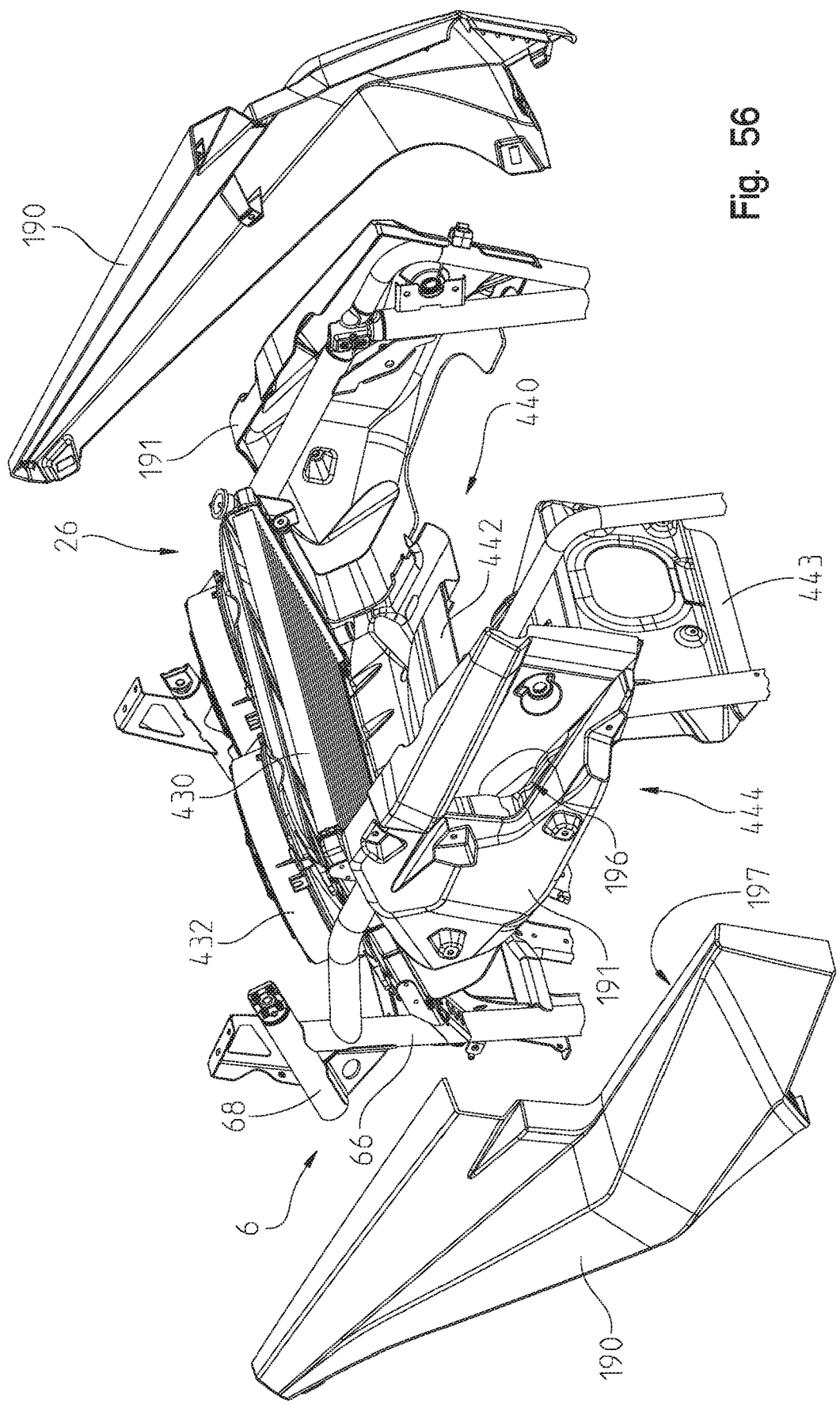
FIG. 56 is a front right perspective view of a rear end of the vehicle of FIG. 1 supporting the cooling assembly of FIG. 50 with rear fenders exploded from the vehicle.
Figure 57:
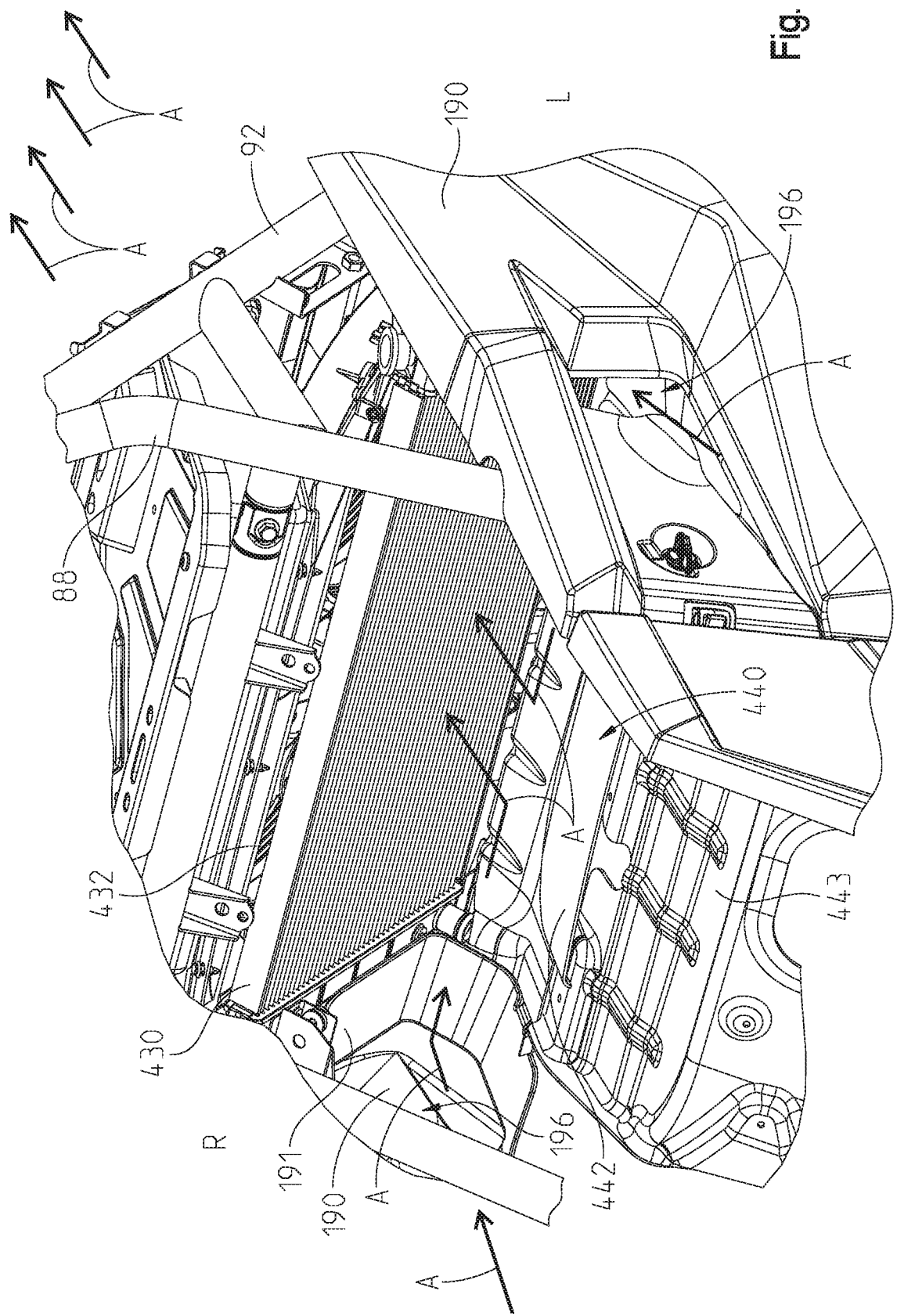
FIG. 57 is a front left perspective view of the cooling assembly of FIG. 50 illustrating the air flow path through portions of the cooling assembly.

Referring to FIGS. 56 and 57, body assembly 14 is used to direct air into air volume 440 for providing ambient air to cooling assembly 26. More particularly, fenders 190 cooperate with an internal body panel 191 to define a fender assembly and, when air flows along a recessed portion 197 of fender 190, the air is directed into opening 196 to flow into air volume 440. Illustratively, fender 190 and internal body panel 191 may cooperate to facilitate air flow along recessed portion 197 and toward opening 196 to draw as much air as possible into air volume 440. Once the air is within air volume 440, the air is directed through radiator 430 rather than out of vehicle 2 because radiator 430 may abut the rearward surfaces of internal body panels 191 to at least partially seal the air within air volume 440.

As shown best in FIG. 57, ambient air A that flows along right side R and left side L of vehicle 2 flows along fenders 190 and is directed into air volume 440 through opening 196 in the fender assembly. Because heat shields 442, 443 separate air volume 440 from engine compartment 444, the air A flowing through openings 196 remains above engine 390 and is directed through radiator 430 without intermixing with warm air within engine compartment 444. More particularly, fans 432 facilitate air flow through radiator 430 by pulling the air A that is forward of radiator 430 and within air volume 440 through radiator 430. By drawing the air A into air volume 440 at a position forward of radiator 430, the air A is able to flow in a direction generally parallel to longitudinal axis L (FIG. 7) when flowing into radiator 430, rather than flowing into radiator 430 from a direction generally perpendicular to longitudinal axis L. This parallel air flow of air A into radiator 430 allows for better air flow through radiator 430 because the air A is flowing in the direction necessary to flow through radiator 430. Once the air A is pulled through radiator 430 and flows rearwardly from fans 432, the air A exits vehicle 2 at rear end 6 thereof. By directing the air A rearwardly from vehicle 2, the air A flows away from vehicle 2 and is not drawn back into air volume 440 through openings 196 of fenders 190.

Furthermore, the configuration and location of opening 196 which draws air A into air volume 440 is illustratively forward of an exhaust assembly 21 (FIG. 2) which avoids drawing warm air from the area of exhaust assembly 21 into radiator 430 which could decrease the cooling efficiency of cooling assembly 26. Also, when the air A flows into air volume 440, the air A may flow around a portion of shock absorbers 34 (FIG. 1) which may provide some cooling thereto.

Vehicle 2 may be configured to be transported using a plurality of tie-downs 471. Illustratively, lower frame assembly includes tie-downs 471 configured as openings in brackets thereon (FIGS. 5 and 51) for connecting transport straps, ropes, bungees, or other components to vehicle 2. Additionally, the angle of radiator 430 at rear end 6 of vehicle 2 may facilitate transport of vehicle 2 by allowing vehicle 2 to be easily crated without the walls of the crate interfering with radiator 430. Cargo area 30 also may include tie-downs 470 (FIG. 50) configured to secure cargo within cargo area 30 during operation of vehicle 2.

Additional details of vehicle 2 may be disclosed in U.S. Patent Application Ser. No. 62/438,267; U.S. patent application Ser. No. 15/388,221; U.S. patent application Ser. No. 15/388,106; U.S. patent application Ser. No. 15/387,662; U.S. Patent Application Ser. No. 62/448,875; U.S. patent application Ser. No. 15/836,223; and U.S. patent application Ser. No. 15/389,147, the complete disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
   a plurality of ground-engaging members;
   a frame assembly supported by the ground-engaging members and including a lower frame portion coupled to an upper frame portion by upstanding members, and the frame assembly extending generally longitudinally from a front end of the utility vehicle to a rear end of the utility vehicle, the upper frame portion including front upstanding members and rear upstanding members;
   an operator area supported by the frame and including seating for a driver, the seating facing forward towards the front end of the utility vehicle;
   a powertrain assembly supported by the frame and including an engine and a drive system operably coupled to the engine; and
   an air intake assembly fluidly coupled to the engine and the drive system and including a housing, a first portion coupled to the housing and the upper frame portion and configured to provide air to the engine, and a second portion coupled to the housing and the upper frame portion and configured to provide air to the drive system, wherein the first and second portions are supported generally rearward of the seating and positioned adjacent and between the rear upstanding members.

2. The utility vehicle of claim 1, wherein the first and second air portions are positioned within an envelope defined by rear upstanding members of the upper frame portion.

3. The utility vehicle of claim 1, wherein the housing defines first and second air inlets and the housing includes a wall positioned intermediate the first and second air inlets.

4. The utility vehicle of claim 3, wherein the first air inlet is fluidly coupled to an airbox having a filter, and the airbox is positioned rearward of a rearwardmost portion of a seat bottom of the seating.

5. The utility vehicle of claim 4, wherein a removable panel is positioned intermediate the seating and the airbox, and the airbox is exposed when the removable panel is removed from the utility vehicle.

6. The utility vehicle of claim 1, wherein the plurality of ground-engaging members includes a plurality of front ground engaging members and a plurality of rear ground engaging members; and the utility vehicle further comprises
   a body assembly comprising a plurality of body panels supported by the frame assembly; and
   a cooling assembly operably coupled to the powertrain assembly and including a radiator supported by the rear frame portion, and an air intake volume for the radiator is positioned forward of the radiator and is partially defined by a rear frame portion.

7. The utility vehicle of claim 6, wherein the plurality of body panels includes a removable panel including an inlet for the air intake volume for the radiator, and the removable panel is positioned at least partially forward of the radiator.

8. The utility vehicle of claim 7, wherein the removable panel includes a fastener configured to move with the removable panel.

9. The utility vehicle of claim 6, wherein the body assembly includes a cargo area supported by the rear frame portion and positioned vertically above the radiator.

10. The utility vehicle of claim 9, wherein the cargo area is removable from the utility vehicle.

11. The utility vehicle of claim 6, wherein the seating includes only a single seat for the driver, and a field of view of the driver when seated in the single seat includes the front ground engaging members.

12. The utility vehicle of claim 6, wherein the cooling assembly includes a plurality of fans fluidly coupled to the radiator.

13. The utility vehicle of claim 6, wherein the cooling assembly is spaced apart from the powertrain assembly by a baffle plate, and the air intake volume for the radiator is positioned above the baffle plate.

14. The utility vehicle of claim 6, wherein an inlet for the air intake volume for the radiator is positioned laterally outward of the radiator.

15. The utility vehicle of claim 14, wherein the inlet for the air intake volume for the radiator is positioned forward of the radiator.

16. The utility vehicle of claim 6, further comprising a baffle plate positioned intermediate an engine of the powertrain assembly and the radiator, and the inlet is positioned to direct air above the baffle plate.

17. The utility vehicle of claim 1, wherein the housing vertically overlaps the upper frame portion from at least a side view of the utility vehicle.

18. The utility vehicle of claim 17, wherein the upper frame portion includes a rearward member angled downwardly in a rearward direction, and the housing vertically overlaps the rearward member from at least the side view of the utility vehicle.

19. The utility vehicle of claim 1, wherein the housing of the air intake assembly is vertically aligned with an upper cross-member of the upper frame portion, and the upper cross-member extends laterally and generally defines a boundary of the operator area.

20. The utility vehicle of claim 1, wherein the air intake assembly defines at least one air inlet configured to receive ambient air, and the at least one air inlet is positioned below an upper portion of the housing.

21. The utility vehicle of claim 1, wherein the housing has a plurality of air openings, and each air opening is configured to provide air to a component of the powertrain assembly.

22. The utility vehicle of claim 1, wherein the first portion and the second portion are external to the frame assembly.

23. The utility vehicle of claim 1, wherein a first air pathway extends from the first portion to the engine, and at least a portion of the first air pathway positioned above at least a portion of the seating is positioned exterior of the frame assembly.

24. The utility vehicle of claim 1, wherein the first and second portions of the air intake assembly are positioned adjacent to the rear upstanding members and extend downward toward the engine and the drive system, respectively, at a lateral position between the rear upstanding members.

25. A utility vehicle, comprising:
a plurality of ground-engaging members;
a frame assembly supported by the ground-engaging members and including a lower frame portion coupled to an upper frame portion, the upper frame portion including rear upstanding members coupling the upper and lower frame members;
an operator area supported by the frame and including seating for a driver, the seating including a seat bottom and a seat back, and the upper frame portion extending above the seating;
a powertrain assembly supported by the frame and including an engine and a drive system operably coupled to the engine;
an air intake assembly fluidly coupled to the engine and the drive system and including a housing, a first air inlet configured to provide air to the engine, and a second air inlet configured to provide air to the drive system, wherein the housing defines both the first and second air inlets and the housing is positioned above the seat bottom and above at least a portion of the seat back, wherein the first air inlet and the second air inlet are rearward-facing; and
an air deflector coupled to the upper frame portion, the air deflector configured to surround a portion of the upper frame portion and operable to direct air flowing toward the air intake assembly.

26. The utility vehicle of claim 25, wherein the air intake assembly further includes a first conduit and a second conduit, both the first conduit and the second conduit extending separately from the housing.

27. The utility vehicle of claim 25, wherein the housing includes an outer wall and an internal wall, the outer wall having a top wall, a bottom wall, a first side wall and a second side wall, the first inlet being defined by the first side wall, a first portion of the top wall, a first portion of the bottom wall, and the internal wall, and the second inlet being defined by the second side wall, a second portion of the top wall, a second portion of the bottom wall, and the internal wall.

28. The utility vehicle of claim 25, wherein the upper frame assembly includes a rearward member angled downwardly in a rearward direction, the first and second air inlets being rearward of an upper portion of the rearward member and forward of a lower portion of the rearward member.

29. The utility vehicle of claim 25, wherein the first and second air inlets are forward of a forward surface of a rearwardmost portion of the upper frame portion.

30. The utility vehicle of claim 25, wherein the first and second air inlets are supported under the air deflector.

31. The utility vehicle of claim 25, wherein the first and second air inlets are angled approximately 45 degrees relative to a vertical plane.

32. The utility vehicle of claim 31, wherein the first and second air inlets include a plurality of louvres having a substantially vertical component and extending into the first and second air inlets.

33. A utility vehicle, comprising:
a plurality of ground-engaging members;
a frame assembly supported by the ground-engaging members and including a lower frame portion coupled to an upper frame portion, the upper frame portion including front upstanding members and rear upstanding members;
an operator area supported by the frame and including seating for a driver, the upper frame portion extending above the seating;
a powertrain assembly supported by the frame and including an engine and a drive system operably coupled to the engine, the drive system comprising a continuously variable transmission; and
an air intake assembly fluidly coupled to the engine and the drive system and including a housing configured to provide air to the engine and to the drive system, wherein the housing is coupled to and supported by the rear upstanding members of the frame assembly at a position rearward of the seating and a portion of the air intake assembly is positioned vertically above an uppermost portion of the continuously variable transmission and vertically higher than an uppermost portion of the seating, the air intake assembly defining a first air pathway and a second air pathway, the air intake assembly including a wall defining a first air inlet to the first air pathway and a second air inlet to the second air pathway within the housing, the wall separating the first air pathway from the second air pathway.

34. The utility vehicle of claim 33, wherein the housing includes a first air opening fluidly coupled to a first conduit to transport air to the powertrain assembly and a second air opening fluidly coupled to a second conduit to transport air to the powertrain assembly, and the first and second air openings are linearly aligned.

35. The utility vehicle of claim 33, wherein a portion of the air intake assembly defines a generally inverted U-shape.

36. The utility vehicle of claim 35, wherein the generally inverted U-shape is defined by a generally horizontal air passage, a first generally vertical air passage, and a second generally vertical air passage.

37. The utility vehicle of claim 33, wherein the wall extends generally vertically intermediate the first air inlet and the second air inlet.

38. The utility vehicle of claim 33, wherein the wall separates the first inlet portion from the second inlet portion.

39. The utility vehicle of claim 38, wherein the wall is operable to reduce scavenging of incoming air by one of the first and second air inlet.

* * * * *